(12) United States Patent
Nakamura et al.

(10) Patent No.: US 7,593,314 B2
(45) Date of Patent: Sep. 22, 2009

(54) OPTICAL DISC AND PHYSICAL ADDRESS FORMAT

(75) Inventors: Atsushi Nakamura, Osaka (JP); Junichi Minamino, Nara (JP); Shigeru Furumiya, Hyogo (JP); Mamoru Shoji, Osaka (JP); Takashi Ishida, Kyoto (JP); Hiromichi Ishibashi, Osaka (JP)

(73) Assignee: Panasonic Corporation, Kadoma (JP)

( * ) Notice: Subject to any disclaimer, the term of this patent is extended or adjusted under 35 U.S.C. 154(b) by 135 days.

(21) Appl. No.: 11/839,010

(22) Filed: Aug. 15, 2007

(65) Prior Publication Data

US 2007/0291626 A1 Dec. 20, 2007

Related U.S. Application Data

(63) Continuation of application No. 11/380,262, filed on Apr. 26, 2006, now Pat. No. 7,327,660, which is a continuation of application No. 11/361,801, filed on Feb. 24, 2006, now Pat. No. 7,257,073, which is a continuation of application No. 10/111,823, filed as application No. PCT/JP01/07449 on Aug. 29, 2001, now Pat. No. 7,116,624.

(30) Foreign Application Priority Data

| Aug. 31, 2000 | (JP) | ............................. 2000-263416 |
| Jun. 14, 2001 | (JP) | ............................. 2001-179728 |
| Aug. 2, 2001 | (JP) | ............................. 2001-235618 |

(51) Int. Cl.
*G11B 7/24* (2006.01)
(52) U.S. Cl. .................................. 369/275.4; 369/44.13
(58) Field of Classification Search ....................... None
See application file for complete search history.

(56) References Cited

U.S. PATENT DOCUMENTS

| 5,508,985 | A | 4/1996 | Fairchild et al. |
| 7,116,624 | B2 | 10/2006 | Nakamura et al. |
| 7,253,473 | B2 | 8/2007 | Nakamura et al. |

FOREIGN PATENT DOCUMENTS

| EP | 0 325 330 A1 | 7/1989 |
| EP | 0 939 398 A2 | 9/1999 |

(Continued)

OTHER PUBLICATIONS

Japanese Office Action for corresponding Application No. 2005-171623 dated Mar. 30, 2006.

(Continued)

*Primary Examiner*—Paul Huber
(74) *Attorney, Agent, or Firm*—Renner, Otto, Boisselle & Sklar, LLP.

(57) ABSTRACT

An optical disc medium comprises a track groove, along which main information is recorded. The track groove is divided into a plurality of blocks. The plurality of blocks each include a plurality of frames. The plurality of frames each include one shape of wobbles indicating sub information, among a plurality of prescribed shapes of wobbles. The plurality of blocks each have address information. The address information is represented by a string of at least one piece of sub information represented by the shape of wobbles of at least one of the plurality of frames.

5 Claims, 35 Drawing Sheets

FOREIGN PATENT DOCUMENTS

| | | |
|---|---|---|
| EP | 0 962 930 A1 | 12/1999 |
| EP | 0 984 435 | 3/2000 |
| EP | 0 997 893 A1 | 3/2000 |
| EP | 1 022 73 A2 | 7/2000 |
| JP | 03-066062 | 3/1991 |
| JP | 03-066063 | 3/1991 |
| JP | 03-083229 | 4/1991 |
| JP | 05-159301 | 6/1993 |
| JP | 05-189934 | 7/1993 |
| JP | 06-309672 | 11/1994 |
| JP | 09-326138 | 12/1997 |
| JP | 10-069646 | 3/1998 |
| JP | 10-208249 | 8/1998 |
| JP | 11-273089 | 10/1999 |
| JP | 11-273090 | 10/1999 |
| JP | 11-283280 | 10/1999 |
| JP | 11-306685 | 11/1999 |
| JP | 11-306686 | 11/1999 |
| JP | 2001-110061 | 4/2001 |

OTHER PUBLICATIONS

Japanese Office Action for corresponding Application No. 2005-171615 dated Mar. 30, 2006.
Co-pending U.S. Appl. No. 11/380,262, filed on Apr. 26, 2006.
Co-pending U.S. Appl. No. 11/380,266, filed on Apr. 26, 2006.
Co-pending U.S. Appl. No. 11/380,269, filed on Apr. 26, 2006.
Co-pending U.S. Appl. No. 11/839,001, filed on Aug. 15, 2007.
Co-pending U.S. Appl. No. 11/839,006, filed on Aug. 15, 2007.
Office Action dated Aug. 27, 2008 issued for the corresponding Polish Patent Application No. P364807 and English translation thereof.

FIG. 10

| Sector number | Frame number | | | |
|---|---|---|---|---|
| | #0~#7 | #8~#15 | #16~#20 | #21~#25 |
| 0 | 1st 1 byte of ECC block address(LSB) | 1st 1 byte of parity | 5-bit sector number | 5-bit parity of sector number |
| 1 | 2nd 1 byte of ECC block address | 2nd 1 byte of parity | 5-bit sector number | 5-bit parity of sector number |
| 2 | 3rd 1 byte of ECC block address | 3rd 1 byte of parity | 5-bit sector number | 5-bit parity of sector number |
| 3 | 4th 1 byte of ECC block address | 4th 1 byte of parity | 5-bit sector number | 5-bit parity of sector number |
| 4 | 1st 1 byte of ECC block address(LSB) | 1st 1 byte of parity | 5-bit sector number | 5-bit parity of sector number |
| 5 | 2nd 1 byte of ECC block address | 2nd 1 byte of parity | 5-bit sector number | 5-bit parity of sector number |
| 6 | 3rd 1 byte of ECC block address | 3rd 1 byte of parity | 5-bit sector number | 5-bit parity of sector number |
| 7 | 4th 1 byte of ECC block address | 4th 1 byte of parity | 5-bit sector number | 5-bit parity of sector number |

| | | | | |
|---|---|---|---|---|
| 28(12) | 1st 1 byte of ECC block address(LSB) | 1st 1 byte of parity | 5-bit sector number | 5-bit parity of sector number |
| 29(13) | 2nd 1 byte of ECC block address | 2nd 1 byte of parity | 5-bit sector number | 5-bit parity of sector number |
| 30(14) | 3rd 1 byte of ECC block address | 3rd 1 byte of parity | 5-bit sector number | 5-bit parity of sector number |
| 31(15) | 4th 1 byte of ECC block address | 4th 1 byte of parity | 5-bit sector number | 5-bit parity of sector number |

Sector group 825'

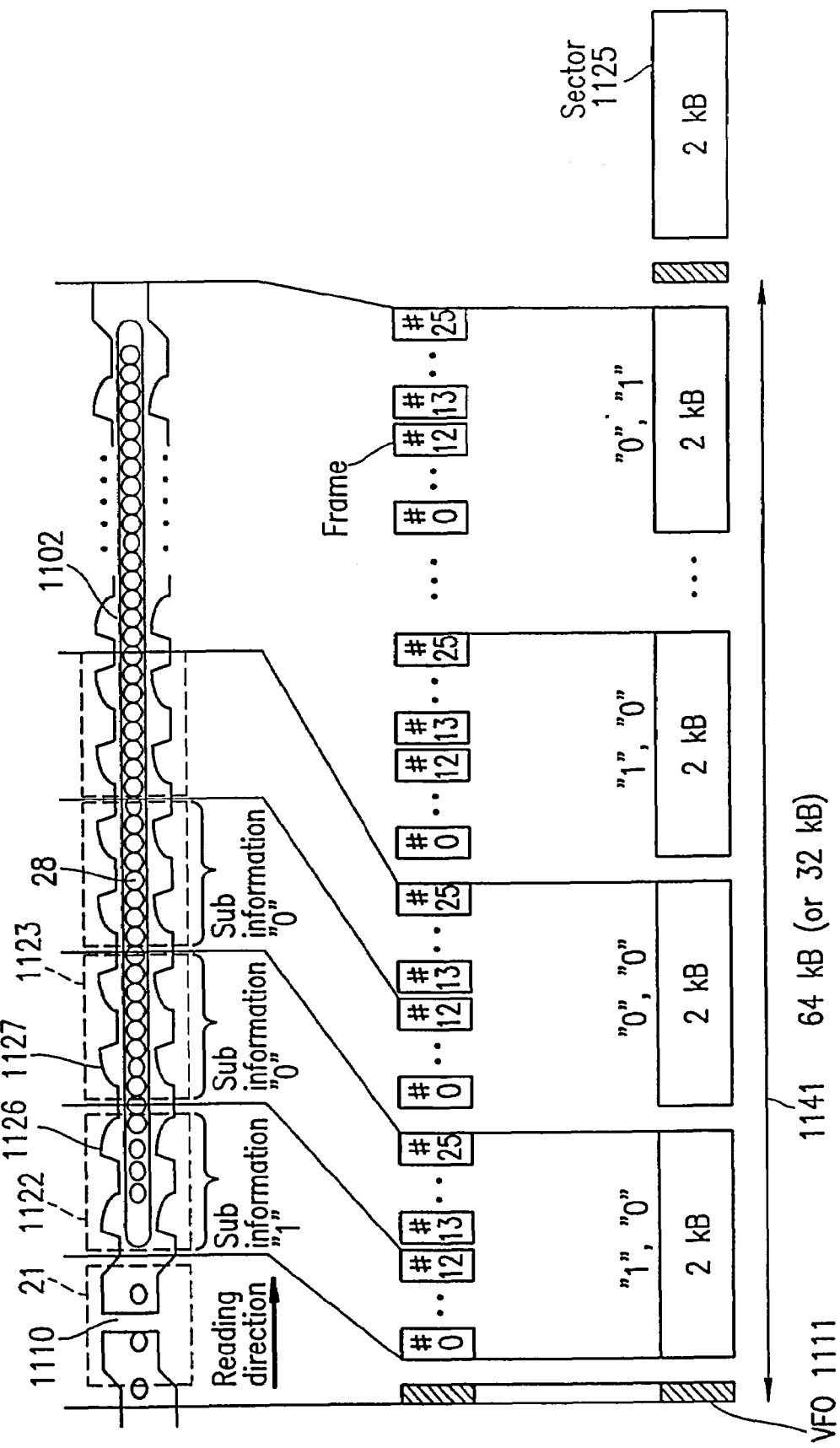

FIG.12

| Sector number | Frame number | | | |
|---|---|---|---|---|
| | #0~#12 | | #13~#25 | |
| 0 | B0 | 1st 1 bit of ECC block address (LSB) | B1 | 2nd 1 bit of ECC block address |
| 1 | B2 | 3rd 1 bit of ECC block address | B3 | 4th 1 bit of ECC block address |
| 2 | B4 | 5th 1 bit of ECC block address | B5 | 6th 1 bit of ECC block address |
| ... | | | | |
| 13 | B26 | 27th 1 bit of ECC block address | B27 | 28th 1 bit of ECC block address |
| 14 | B28 | 29th 1 bit of ECC block address | B29 | 30th 1 bit of ECC block address |
| 15 | B30 | 31st 1 bit of ECC block address | B31 | 32th 1 bit of ECC block address |
| 16 | B0 | 1st 1 bit of ECC block address (LSB) | B1 | 2nd 1 bit of ECC block address |
| 17 | B2 | 3rd 1 bit of ECC block address | B3 | 4th 1 bit of ECC block address |
| 18 | B4 | 5th 1 bit of ECC block address | B5 | 6th 1 bit of ECC block address |
| ... | | | | |
| 29 | B26 | 27th 1 bit of ECC block address | B27 | 28th 1 bit of ECC block address |
| 30 | B28 | 29th 1 bit of ECC block address | B29 | 30th 1 bit of ECC block address |
| 31 | B30 | 31st 1 bit of ECC block address | B31 | 32th 1 bit of ECC block address |

Sector group (sectors 0–15)

Repeated sector group when 1 block is 64 kB (sectors 16–31)

FIG.14

| Sector number | Frame number #0 ~ #25 | | | |
|---|---|---|---|---|
| 0 | B0 | 1st 1 bit ECC block address (LSB) | | |
| 1 | B0 | 1st 1 bit ECC block address (LSB) | | |
| 2 | B1 | 2nd 1 bit ECC block address | | |
| 3 | B1 | 2nd 1 bit ECC block address | | |
| ⋮ | | | | |
| 12 | B6 | 7th 1 bit ECC block address | | |
| 13 | B6 | 7th 1 bit ECC block address | | |
| 14 | B7 | 8th 1 bit ECC block address | | |
| 15 | B8 | 9th 1 bit ECC block address | | |
| ⋮ | | | | |
| 23 | B16 | 17th 1 bit ECC block address | | |
| 24 | B17 | 18th 1 bit ECC block address | | |
| | #0 ~ #12 | | #13 ~ #25 | |
| 25 | B18 | 19th 1 bit | B19 | 20th 1 bit |
| 26 | B20 | 21st 1 bit | B21 | 22nd 1 bit |
| ⋮ | | | | |
| 30 | B28 | 29th 1 bit | B29 | 30th 1 bit |
| 31 | B30 | 31st 1 bit | B31 | 32nd 1 bit |

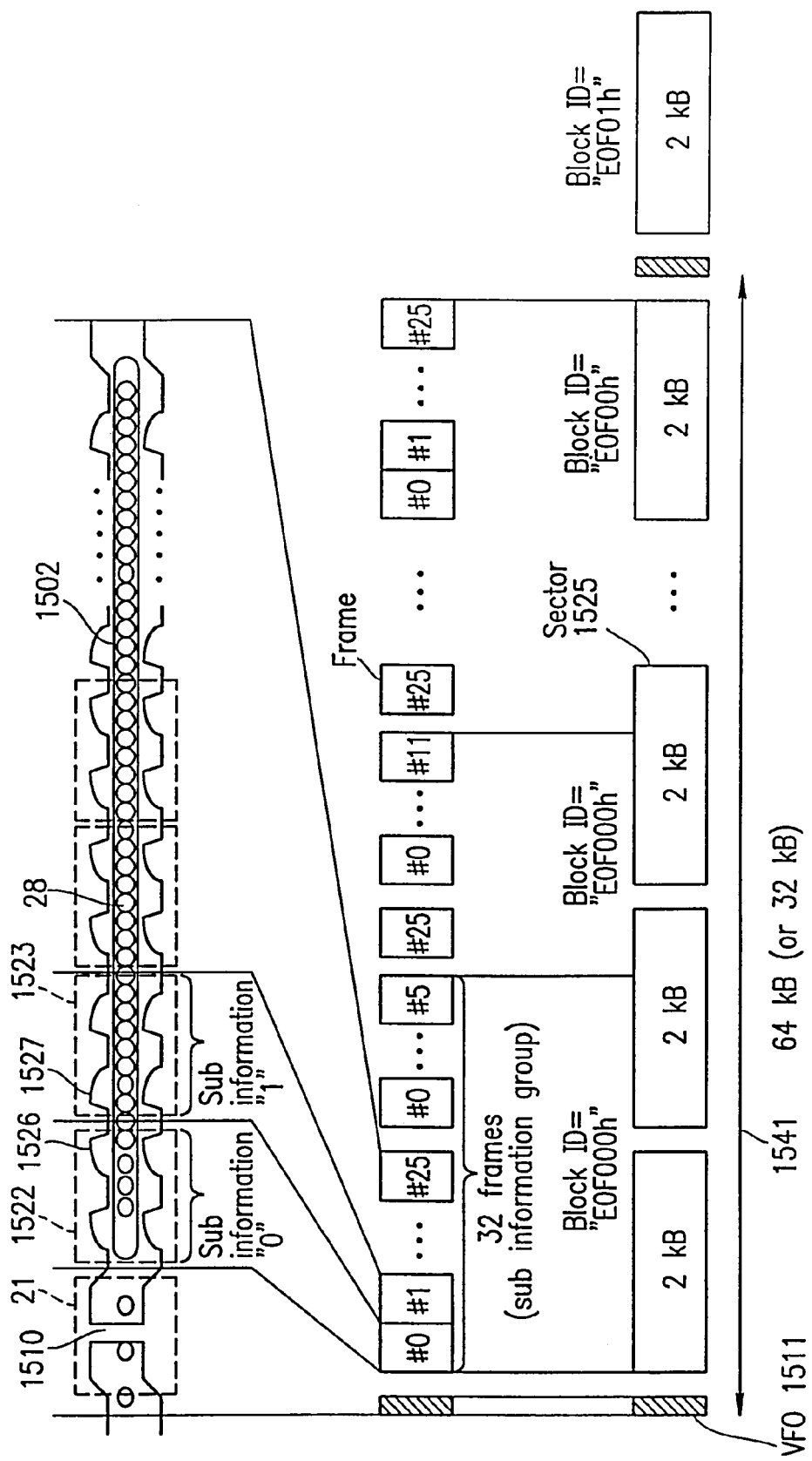

FIG.16

| Sector number | Frame number | | | | | |
|---|---|---|---|---|---|---|
| | #0~#7 | #8~#15 | #16~#17 | #18~#19 | #20~#25 | |
| 0 | 1st 1 byte of block address (LSB) | 1st 1 byte of parity | 2-bit ID number | 2-bit parity of ID number | Order number 1 | |
| 1 | 2nd 1 byte of block address | 2nd 1 byte of parity | 2-bit ID number | 2-bit parity of ID number | Order number 1 | |
| 2 | 3rd 1 byte of block address | 3rd 1 byte of parity | 2-bit ID number | 2-bit parity of ID number | Order number 1 | |
| 3 | 4th 1 byte of block address | 4th 1 byte of parity | 2-bit ID number | 2-bit parity of ID number | Order number 1 | |
| 4 | 1st 1 byte of block address (LSB) | 1st 1 byte of parity | 2-bit ID number | 2-bit parity of ID number | Order number 2 | |
| 5 | 2nd 1 byte of block address | 2nd 1 byte of parity | 2-bit ID number | 2-bit parity of ID number | Order number 2 | |
| 6 | 3rd 1 byte of block address | 3rd 1 byte of parity | 2-bit ID number | 2-bit parity of ID number | Order number 2 | |
| 7 | 4th 1 byte of block address | 4th 1 byte of parity | 2-bit ID number | 2-bit parity of ID number | Order number 2 | |
| ... | | | | | | |
| 28(12) | 1st 1 byte of block address (LSB) | 1st 1 byte of parity | 2-bit ID number | 2-bit parity of ID number | Order number 8(4) | |
| 29(13) | 2nd 1 byte of block address | 2nd 1 byte of parity | 2-bit ID number | 2-bit parity of ID number | Order number 8(4) | |
| 30(14) | 3rd 1 byte of block address | 3rd 1 byte of parity | 2-bit ID number | 2-bit parity of ID number | Order number 8(4) | |
| 31(15) | 4th 1 byte of block address | 4th 1 byte of parity | 2-bit ID number | 2-bit parity of ID number | Order number 8(4) | |

Sector group {0–3}

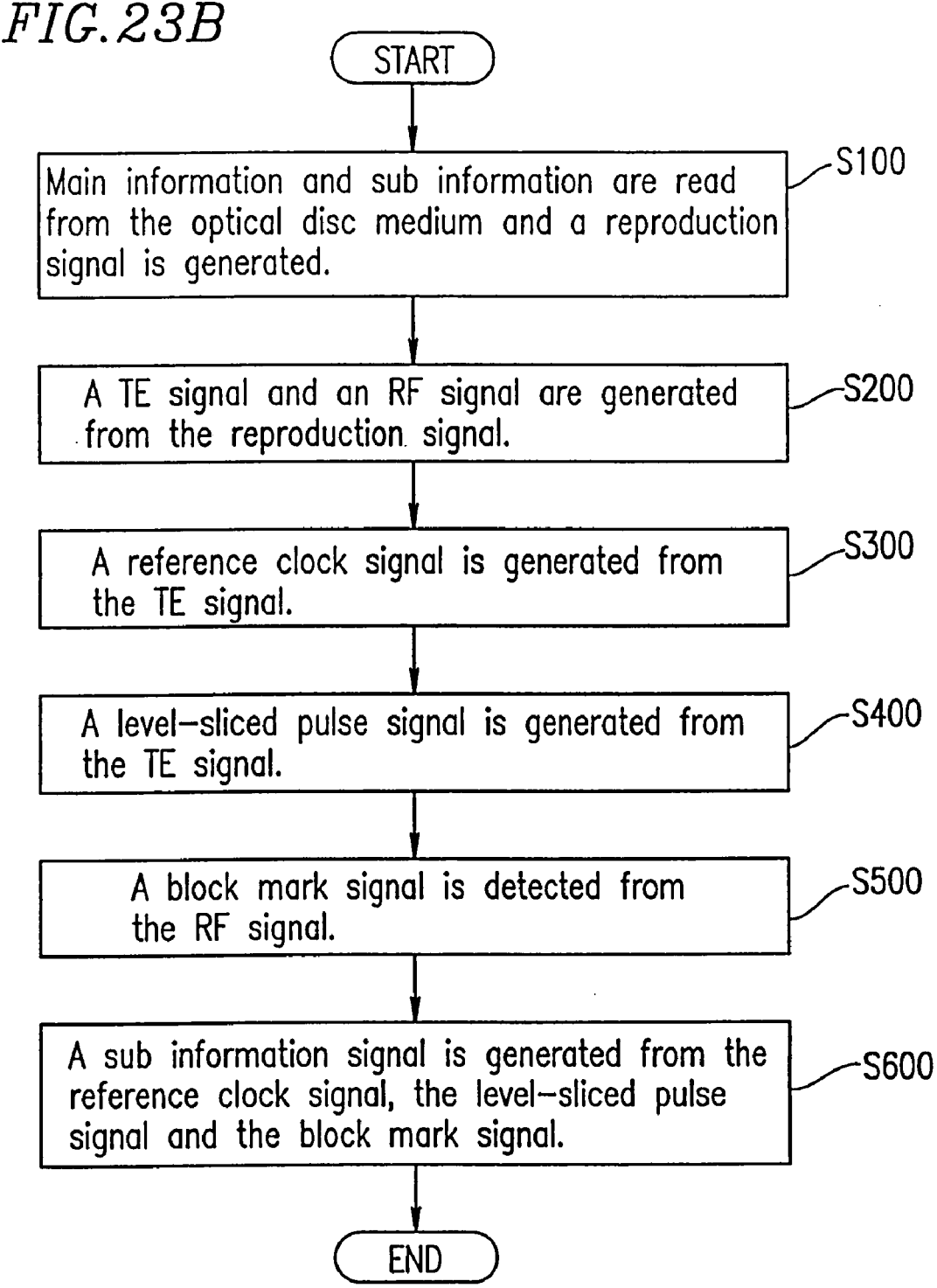

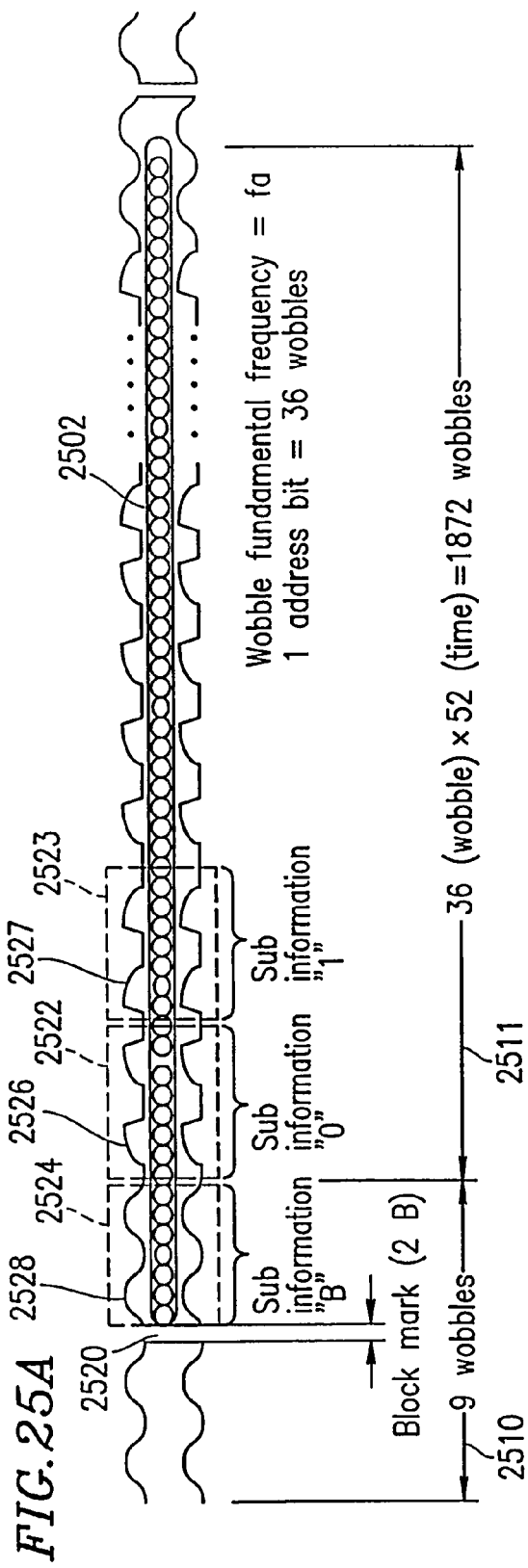
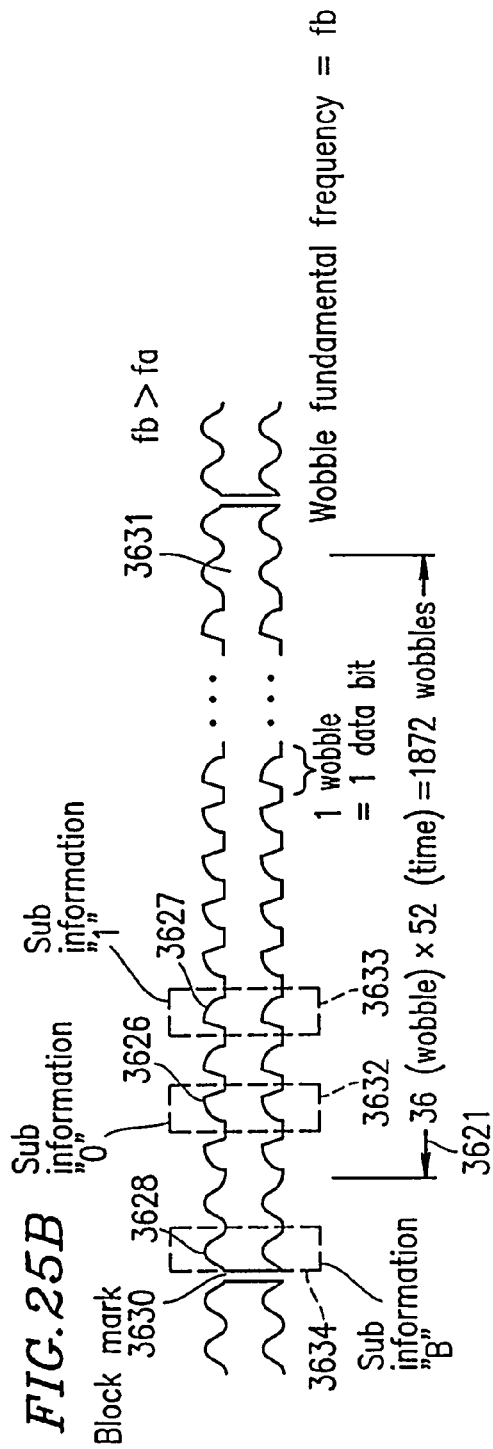
FIG. 25A
FIG. 25B

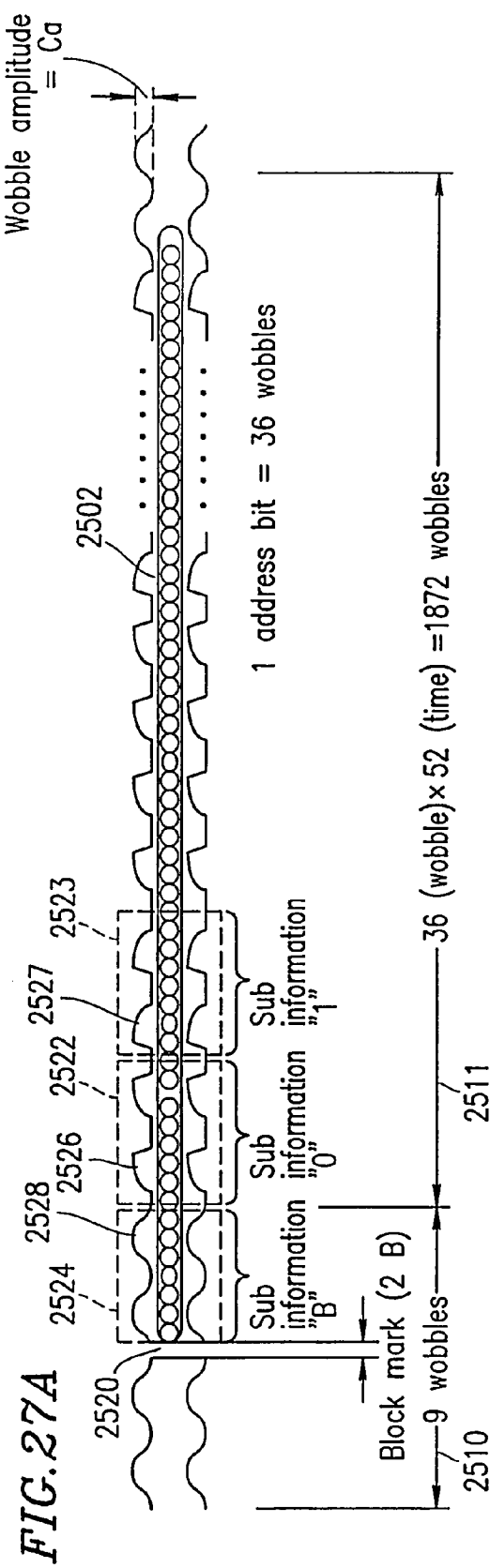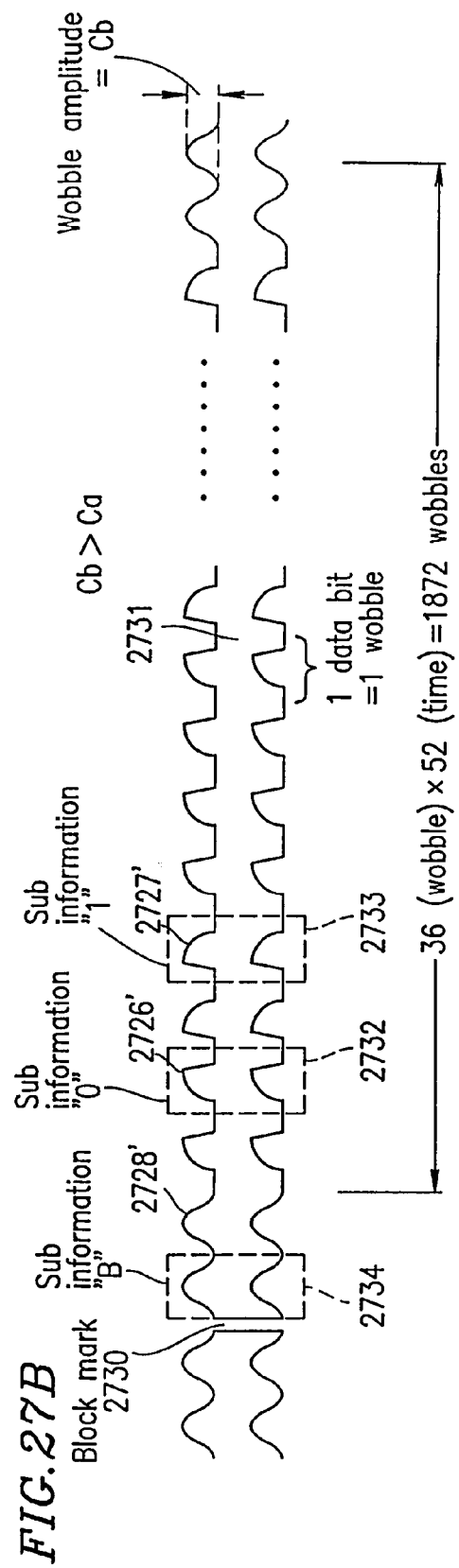
FIG. 27A
FIG. 27B

CLV format

Toward the outer periphery ↑

CAV format

Toward the outer periphery ↑

OPTICAL DISC AND PHYSICAL ADDRESS FORMAT

This application is a continuation of U.S. patent application Ser. No. 11/380,262 filed Apr. 26, 2006 now U.S. Pat. No. 7,327,660, which is a continuation of U.S. application Ser. No. 11/361,801 filed Feb. 24, 2006, now U.S. Pat. No. 7,257,073, which is a continuation of U.S. patent application Ser. No. 10/111,823, filed Apr. 26, 2002, now U.S. Pat. No. 7,116,624, which is a 371 of PCT/JP01/07449, filed Aug. 29, 2001.

TECHNICAL FIELD

The present invention relates to an optical disc medium for recording information (for example, digital video information) at a high density, and an optical disc apparatus and an optical disc reproduction method used for the optical disc medium.

BACKGROUND ART

Recently, the recording density of the optical disc media has become increasingly higher. In general, a recordable optical disc medium has track grooves therein in advance, and information is recorded along the track grooves, i.e., on the track grooves or an area interposed between the track grooves (referred to as a "land"). The track grooves are sine-like wobbles, and the information is recorded in synchronization with clocks generated based on the period of the wobbles. Addresses are provided along the track groove in order to record information at prescribed positions on a recording face of the optical disc medium. Three exemplary structures for providing addresses will be described below.

(1) Japanese Laid-Open Publication No. 6-309672 discloses an optical disc in which wobbled track grooves are formed locally and intermittently and address information can be reproduced as so-called pre-pits. In this case, an address-only area and a data-only area for recording information exist on the track groove.

(2) Japanese Laid-Open Publication No. 5-189934 discloses an optical disc in which frequency-modulated wobbles are provided and address information (sub information) is recorded using the frequency of the wobbles. In this case, data information is overwritten on the address information.

(3) Japanese Laid-Open Publication No. 9-326138 discloses an optical disc in which pre-pits are formed between adjacent track grooves and addresses are formed by the pre-pits.

In consideration of the higher density recording which will be required in the future, all the above-mentioned structures have their own problems.

In the structure of (1), the space for data is reduced by the space required for the addresses (so-called "overhead"). Thus, the memory capacity is inevitably reduced by the space for the addresses.

The structure of (2) has the following problem. The wobbles are originally provided mainly for the purpose of generating clocks for recording information, and thus are preferably formed with a single frequency. When the wobbles are formed with a single frequency, highly precise recording clock signals can be generated merely by multiplying and synchronizing a wobble reproduction signal using a PLL or the like. When the wobbles have a plurality of frequency components, however, the frequency band to which the PLL can adapt itself needs to be reduced relative to the case where the wobbles have a single frequency in order to avoid pseudo lock of the PLL. Then, it may undesirably occur that the PLL cannot sufficiently follow disc motor jitters or jitters generated by, for example, de-centering of the disc. This results in jitters remaining in a recording signal.

In the case where a recording film formed on a recording face of an optical disc is a phase change film, the S/N ratio of the recording film can undesirably be reduced as rewriting is repeated. Even when this occurs, wobbles with a single frequency allow the noise component to be removed using a bandpass filter for a narrow band. However, when the wobbles are frequency-modulated, the band to be passed needs to be enlarged in order to allow for the modulated frequencies. As a result, the noise component is mixed in with a wobble reproduction signal and thus further increases the jitters. Such an increase of jitters is not preferable since the jitter margin is decreased as the recording density is increased.

In the structure of (3), the pre-pits naturally influence reading of the information stored in the adjacent track grooves. Thus, it is difficult to provide a sufficient number of pre-pits each having a sufficient length. Therefore, there is an undesirable possibility that the number of detection errors is increased especially when the recording density is significantly high.

In light of the above-described problems, the present invention has an objective of providing an optical disc medium for minimizing overhead and describing addresses with wobbles having a single frequency, an optical disc apparatus and an optical disc reproduction method for reproducing the optical disc medium.

DISCLOSURE OF THE INVENTION

According to one aspect of the invention, an optical disc medium compares a track groove, along which main information is recorded. The track groove is divided into a plurality of blocks. The plurality of blocks each include a plurality of frames. The plurality of frames each include one shape of wobbles indicating sub information, among a plurality of prescribed shapes of wobbles. The plurality of blocks each have address information. The address information is represented by a string of at least one piece of sub information represented by the shape of wobbles of at least one of the plurality of frames.

In one embodiment of the invention, the plurality of blocks each include a plurality of sectors. The plurality of sectors include the plurality of frames. The address information is represented by a string of at least one piece of sub information represented by the shape of wobbles of at least one of the plurality of frames included in at least one of the sectors.

In one embodiment of the invention, at least one of the plurality of blocks includes a plurality of pieces of address information. The plurality of pieces of address information are identical. The plurality of pieces of address information are each represented by the string of the at least one piece of sub information.

In one embodiment of the invention, the plurality of pieces of address information each include an order number, and the order number indicates an order of the respective piece of address information among the plurality of pieces of address information.

In one embodiment of the invention, the address information is represented by a plurality of bits, and the plurality of bits are represented by the at least one string of sub information from a lower bit to a higher bit.

In one embodiment of the invention, the plurality of blocks each include a plurality of sectors. The plurality of sectors include the plurality of frames. The address information is represented by the at least one string included in the plurality of sectors. Information indicating an order of the sector among the plurality of sectors is represented by a portion of the at least one piece of sub information.

In one embodiment of the invention, information indicating at least one of an error detection code and an error correction code is represented by a portion of the at least one piece of sub information.

In one embodiment of the invention, the track groove has an identification mark provided therein indicating a leading end of each of the plurality of blocks.

In one embodiment of the invention, the identification mark is provided by cutting off the track groove.

In one embodiment of the invention, the identification mark is provided by locally varying a width of the tracking groove.

In one embodiment of the invention, the identification mark is provided by locally varying an amplitude of the shape of wobbles.

In one embodiment of the invention, the plurality of shapes of wobbles include a first shape of wobbles and a second shape of wobbles which are different from each other in at least one of a rising gradient and a falling gradient, and the first shape of wobbles and the second shape of wobbles indicate different pieces of sub information from each other.

In one embodiment of the invention, the plurality of shapes of wobbles include a first shape of wobbles and a second shape of wobbles which are different from each other in a duty ratio, and the first shape of wobbles and the second shape of wobbles indicate different pieces of sub information from each other.

In one embodiment of the invention, the plurality of shapes of wobbles are provided on one edge of the track groove.

In one embodiment of the invention, the track groove includes an identification mark indicating at least one of a leading end and a trailing end of the at least one string of sub information.

In one embodiment of the invention, at least one of the plurality of blocks includes a plurality of the at least one string of sub information. The identification mark indicates a leading end of the at least one string of sub information. The identification mark has an identical shape with another identification mark in the at least one string of sub information in one block.

In one embodiment of the invention, at least one of the plurality of blocks includes a plurality of the at least one string of sub information. The identification mark indicates a leading end of the at least one string of sub information. At least one identification mark has a different shape from the shape of another identification mark in the at least one string of sub information in one block.

In one embodiment of the invention, the identification mark indicates a trailing end of the at least one string of sub information. The identification mark is formed by combining a first shape of wobbles and a second shape of wobbles which are different from each other in at least one of a rising gradient and a falling gradient with a third shape of wobbles which is a sine wave shape.

In one embodiment of the invention, at least one of the plurality of blocks includes a plurality of the at least one string of sub information. The identification mark indicates a trailing end of the at least one string of sub information. The identification mark has an identical shape with another identification mark in the at least one string of sub information in one block.

In one embodiment of the invention, at least one of the plurality of blocks includes a plurality of the at least one string of sub information. The identification mark indicates a trailing end of the at least one string of sub information. At least one identification mark has a different shape from the shape of another identification mark in the at least one string of sub information in one block.

In one embodiment of the invention, the identification mark is provided by cutting off a portion of a land between adjacent portions of the track groove.

In one embodiment of the invention, the identification mark is provided by cutting off a land between adjacent portions of the track groove.

In one embodiment of the invention, single frequency dummy data is recorded on the identification mark.

In one embodiment of the invention, the number of pieces of sub information indicating a lower bit of the address information is larger than the number of pieces of sub information indicating a higher bit of the address information.

According to another aspect of the invention, an optical disc medium compares a recording reproduction area and a disc management area. The recording reproduction area includes a first track groove, along which main information is recorded. The disc management area includes a second track groove provided in at least one of an inner area and an outer area of the optical disc medium. The second track groove includes a plurality of prescribed shapes of wobbles. The management information of the optical disc medium is represented by a combination of the plurality of prescribed shapes of wobbles.

In one embodiment of the invention, the plurality of prescribed shapes of wobbles include a first shape of wobbles and a second shape of wobbles which are different from each other in at least a rising gradient and a falling gradient, and a third shape of wobbles which is a sine wave shape.

In one embodiment of the invention, the first track groove includes the plurality of prescribed shapes of wobbles. The number of shapes of wobbles indicating 1-bit information is different in the disc management area compared to in the recording and reproduction area.

In one embodiment of the invention, the first track groove includes the plurality of prescribed shapes of wobbles. The first track groove and the second track groove are different from each other in the frequency of the shape of wobbles.

In one embodiment of the invention, the first track groove includes the plurality of prescribed shapes of wobbles. The second track groove has a larger amplitude of the shapes of wobbles than that of the first track groove.

In one embodiment of the invention, adjacent portions of the second track groove have a constant phase difference in the shape of wobbles of $\pi/2 \times (2n+1)$, where n is an integer.

In one embodiment of the invention, the second track groove has a larger track pitch than that of the first track groove.

In one embodiment of the invention, the identification mark is provided by varying a phase of at least one shape of wobbles in the track groove.

In one embodiment of the invention, the identification mark is provided by varying a frequency of at least one shape of wobbles in the track groove.

In one embodiment of the invention, the plurality of shapes of wobbles are provided at an identical period.

According to still another aspect of the invention, an optical disc apparatus for reproducing an optical disc medium, which includes a track groove, along which main information is recorded is provided. The track groove is divided into a plurality of blocks. The plurality of blocks each include a plurality of frames. The plurality of frames each include one shape of wobbles indicating sub information, among a plurality of prescribed shapes of wobbles, the plurality of blocks each have address information. The address information is represented by a string of at least one piece of sub information represented by the shape of wobbles of at least one of the plurality of frames. The optical disc apparatus includes a conversion section for reading the main information and the sub information from the optical disc medium and generating a reproduction signal; a reproduction signal calculation section for generating a TE signal and an RF signal from a reproduction signal; a reference clock signal generation section for generating a reference clock signal from the TE signal; a level-sliced pulse signal generation section for generating a level-sliced pulse signal from the TE signal; a block mark signal detection section for detecting a block mark signal from the RF signal; and a sub information generation section for generating a sub information signal from the reference clock signal, the level-sliced pulse signal and the block mark signal.

According to still another aspect of the invention, a method for reproducing an optical disc medium, which includes a track groove, along which main information is recorded is provided. The track groove is divided into a plurality of blocks. The plurality of blocks each include a plurality of frames. The plurality of frames each include one shape of wobbles indicating sub information, among a plurality of prescribed shapes of wobbles. The plurality of blocks each have address information. The address information is represented by a string of at least one piece of sub information represented by the shape of wobbles of at least one of the plurality of frames. The method includes the steps of reading the main information and the sub information from the optical disc medium and generating a reproduction signal; generating a TE signal and an RF signal from a reproduction signal; generating a reference clock signal from the TE signal; generating a level-sliced pulse signal from the TE signal; detecting a block mark signal from the RF signal; and generating a sub information signal from the reference clock signal, the level-sliced pulse signal and the block mark signal.

BRIEF DESCRIPTION OF THE DRAWINGS

FIG. 10 shows an address structure of the optical disc medium in Example 7 according to the present invention;

FIG. 11 shows a track groove in an optical disc medium in Example 8 according to the present invention;

FIG. 12 shows an address structure of the optical disc medium in Example 8 according to the present invention;

FIG. 14 shows an address structure of the optical disc medium in Example 9 according to the present invention;

FIG. 15 shows a track groove in an optical disc medium in Example 10 according to the present invention;

FIG. 16 shows an address structure of the optical disc medium in Example 7 according to the present invention;

FIG. 23B is a flowchart illustrating a method for reproducing information on the optical disc medium in Example 14 according to the present invention;

FIG. 25A shows a track groove in an optical disc medium in Example 15 according to the present invention;

FIG. 25B shows a track groove in an optical disc medium in Example 15 according to the present invention;

FIG. 27A shows a track groove in an optical disc medium in Example 16 according to the present invention;

FIG. 27B shows a track groove in an optical disc medium in Example 16 according to the present invention;

BEST MODE FOR CARRYING OUT THE INVENTION

Hereinafter, the present invention will be described by way of illustrative examples with reference to the attached drawings.

Example 1

Figure 1:
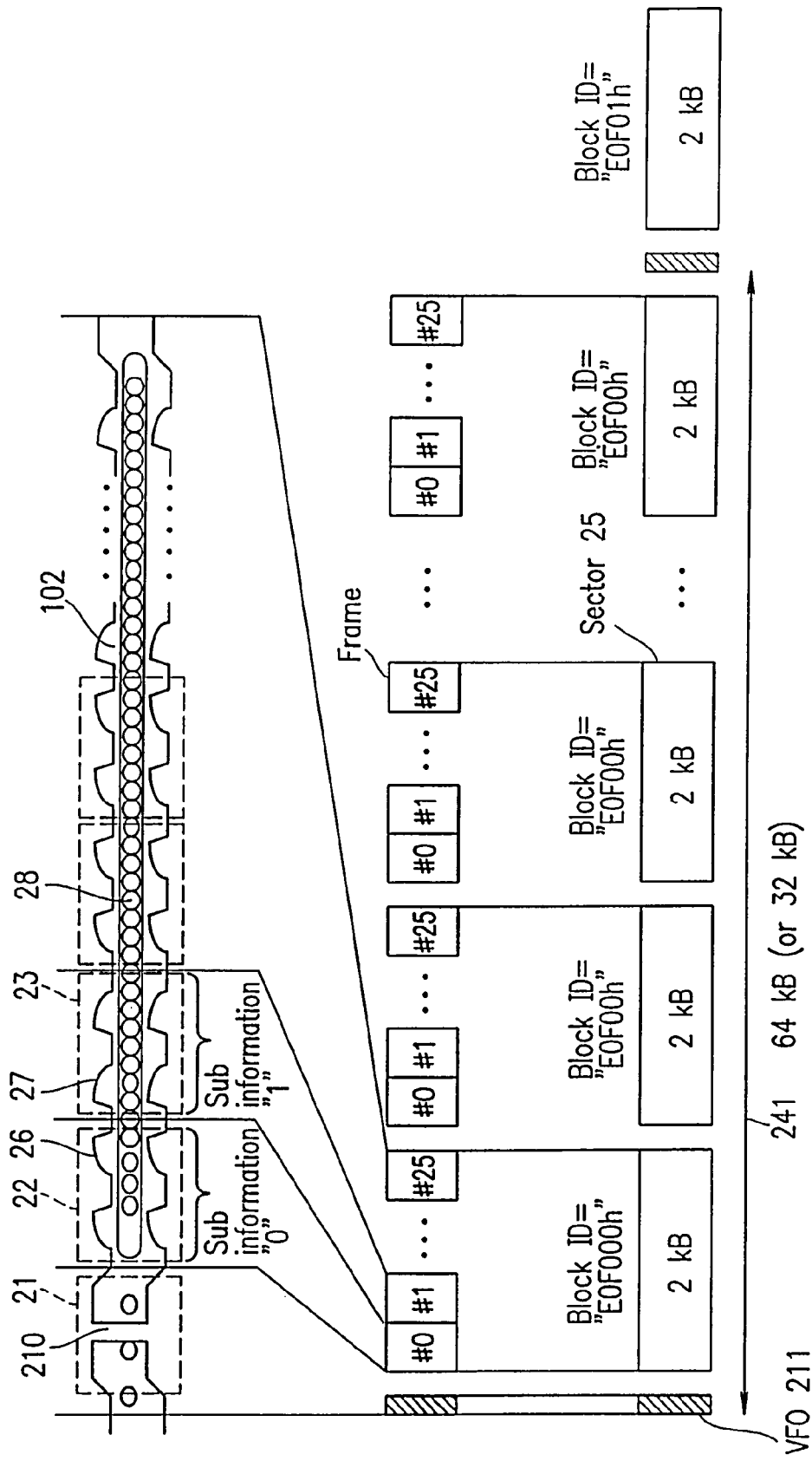
FIG. 1 shows a track groove in an optical disc medium in Example 1 according to the present invention.
Figure 2:
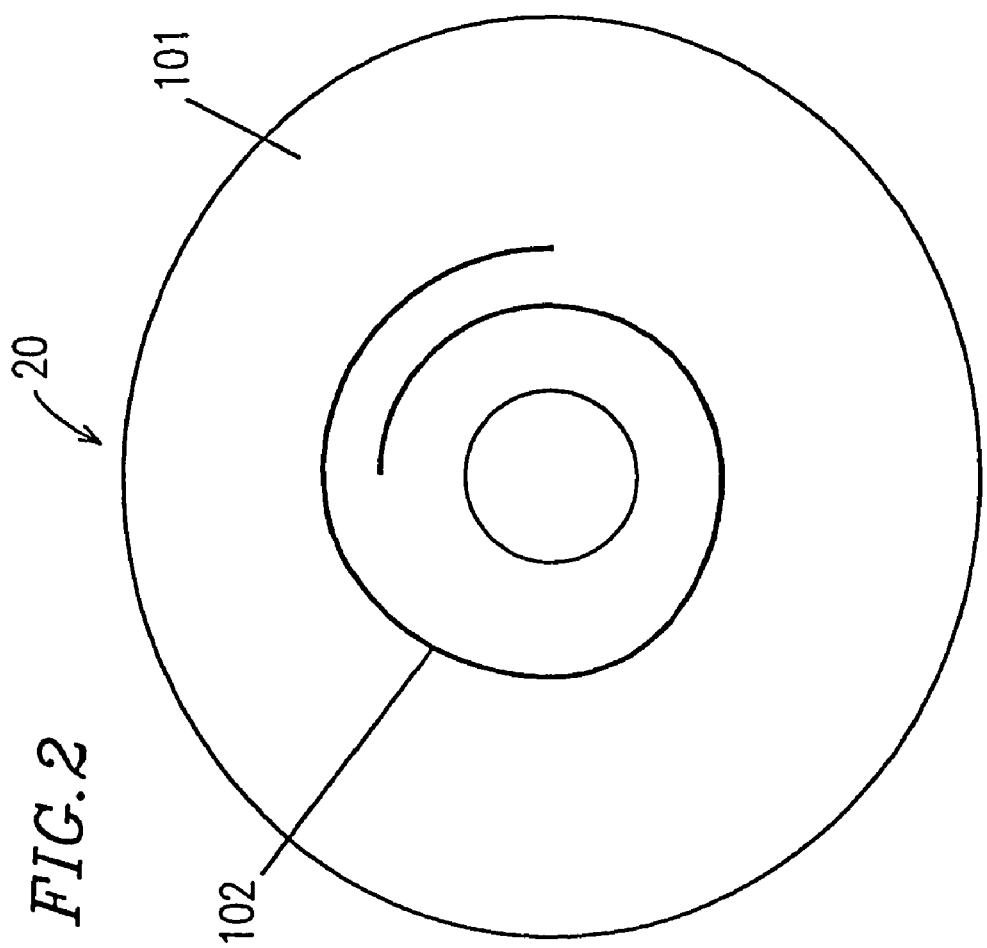
FIG. 2 shows an optical disc medium in Example 1 according to the present invention.

FIG. 2 shows an optical disc medium 20 according to Example 1 of the present invention. The optical disc medium 20 has a recording face 101, which has a spiral track groove 102 formed therein. As shown in FIG. 1, the track groove 102 has shapes which are different on a block-by-block basis. In FIG. 1, a block mark (identification mark) 210 is a cut-off portion in the track groove 102 and shows an index indicating a leading end of each block.

Each block is divided into N number of sectors 25 (N=32 or 16), and each sector 25 (sub block) is divided into M number of frames #0 through #25 (M=26). Each frame (fundamental unit) has a prescribed number of wobbles 26 or 27 in a periodical manner. The wobbles 26 and 27 have different prescribed shapes from each other, and represent sub information ("0", "1" or "S"). One type of sub information ("0", "1" or "S") is represented by one shape of wobbles 26 or 27. The type of sub information and the shape of wobbles (wobbles 26 or 27) are in a one-to-one relationship. More specifically, the wobbles 26 and 27 both have a generally sawtooth shape, and have different rising shapes (or rising gradient) and falling shapes (falling gradients). The wobbles 26 or 27 are formed in accordance with the type of sub information ("0" or "1"). A string of sub information is represented by a combination of the wobbles 26 and 27.

The difference in the rising gradient and the falling gradient between the wobbles 26 and 27 can be easily detected by a differential push-pull detection signal as follows. A scanning laser beam is directed to the track groove 102, and a differential signal indicating the difference between the light amounts received by detection areas of a light receiving element divided along a direction perpendicular to the track groove 102 (a radial direction) of the optical disc medium 20 (i.e., a push-pull signal) is generated. Thus, a detection signal having a rising gradient and a falling gradient which vary in accordance with whether the sub information is "0" or "1" is obtained. This difference in the rising gradient and the falling gradient can be easily identified by, for example, differentiating the detection signal.

Thus, the type of the sub information can be detected by the size of the value obtained as a result of differentiation. When differentiation is used, however, a noise component is naturally increased. In an optical disc medium having an inferior S/N ratio, a detection error is reasonably expected. In this example, each pattern of the wobbles 26 and 27 is repeated a plurality of times in order to enhance the reliability of detection.

Main information (for example, rewritable user data) is recorded in a block unit 241 along the track groove 102 from the block mark 210. The block unit 241 has a prescribed length, for example, 64 kB (or 32 kB). The main information can be recorded as recording marks 28. The recording mark 28 is recorded by performing a phase change of a recording layer. A block unit is a unit for information processing, and is, for example, an ECC block. The block unit 241 is divided into 32 sectors 25 when N=32 (or 16 sectors 25 when N=16). Each sector 25 is a sub block having a length of 2 kB. Each sector 25 is divided into 26 frames #0 through #25 when M=26.

A frame is a fundamental unit of information recorded on the track groove 102. In FIG. 1, frame #0 is represented by reference numeral 22 and frame #1 is represented by reference numeral 23. As exemplified by the frames 22 and 23, each frame includes one type of wobbles formed in a periodical manner in advance. In this way, 1-bit sub information "0", "1" or "S" is described in each of the frames 22 and 23. A 26-bit (M=26) sub information group included in each sector 25 indicates a block ID (address information) of the corresponding block unit 241. At a leading end of each of frames #0 through #25, a SYNC mark is recorded. A SYNC mark is a synchronization signal recorded to represent a leading end of each frame of the main information when recording the main information as a recording mark 28. A period of wobbles acts as a reference clock for synchronizing the rotation of the optical disc medium 20 and recording signals and is also used as a synchronization signal when reproducing the address information.

The block ID can include an error correction code, an error detection code, or a parity code or the like for correcting or detecting detection signals, in addition to the information indicating the address.

The frame 22 includes only the wobbles 26 having a gentle rising gradient and a steep falling gradient. The frame 23 includes only the wobbles 27 having a steep rising gradient and a gentle falling gradient. When, for example, one frame includes 8 wobbles, one sector 25 includes 8×26=208 wobbles (including the wobbles 26 and 27).

The sub information group recorded in the sector 25 can be correctly identified so long as the difference in the rising gradient and the falling gradient between the 208 wobbles 26 and 27 can be detected as a whole despite some detection errors caused by the noise. The reading reliability is further enhanced by repeating the same block ID 32 times (when N=32) or 16 times (when N=16). According to an exemplary specific technique for identifying the sub information group, a differential waveform of the push-pull signal is sampled and held at each rise and each fall, and a logical product of the rising gradients and a logical product of the falling gradients are compared to each other. In this way, the noise component is cancelled and only the sub information component can be extracted.

In this example, the block mark 210 is a cut-off portion in the track groove 102, and thus it is not preferable to overwrite the main information in the block mark 210. The reason is because the reflected light amount significantly varies in accordance with whether there is a groove or not, and this significant difference acts as an external disturbance to a reproduction signal. In this example, an area including the block mark 210 is assigned as a VFO recording area 21. The VFO recording area 21 is used for recording a VFO 211, which is a single frequency signal for adjusting the frequency of a PLL for reproduction of the main information which is recorded after the VFO recording area 21. Even when there is a slight external fluctuation, the VFO 211 merely acts as a local jitter and does not directly cause any error. Additionally, the VFO 211 has a single frequency and thus can frequency-separate the external disturbance caused by the block mark 210.

In this example, one block unit 241 (one block) is divided into 32 (or 16) sectors 25, and each sector 25 is divided into 26 frames (frames #0 through #25). In each of frames #0 through #25, wobbles 26 or 27 having a shape corresponding to the sub information are formed in advance. Since the sub information group recorded in one sector 25 represents a block ID, the same block ID (address information) can be formed in repetition in the 32 (or 16) sector 25 included in the block unit 241.

In this case, the sub information group can include an order number indicating the order of the repeated block ID (address information), i.e., whether each block ID is the fifth, tenth, etc.. Such number is usable for finally determining the address number based on a majority. In addition, such a number provides useful information for signal processing, for example, which sector 25 in the block is now read or which sub information group in the block is incorrect.

In the case of an optical disc medium having a plurality of recording faces or layers, an order number of the recording layer can be included in the sub information group. In this way, the recording face can be easily identified.

As described above, in this example, one information block is divided into 32 (N=32) or 16 (N=16) sectors, and each sector is divided into 26 (M=26) frames. In each of the 26 frames, wobbles of a shape corresponding to the sub information are formed in advance. One block ID (address information) is formed in repetition in 32 (or 16) sectors in the block. Thus, an address is formed without any overhead or without requiring pre-pits to be required between the grooves.

The wobbles used in this example have a constant single frequency although the wobbles have different rising gradients and falling gradients in accordance with the type of sub information. Therefore, a clock signal for recording having reduced jitters can be extracted by first using a bandpass filter for allowing only the frequency of the wobbles to pass so as to remove a noise component and then synchronizing and multiplying the resultant frequency using a PLL.

The reading reliability of the block ID can be enhanced by repeating the same block ID.

In this example, the block ID has 26 bits like the number of the frames. The number of bits of the address information is not limited to 26, but can be any necessary number in accordance with, for example, the data amount to be recorded on the optical disc medium or the type and system of the error correction code.

In this example, the block unit is divided into 32 sectors with N=32 (or 16 sectors with N=16). The present invention is not limited to such a number of sectors.

In this example, the sub information is recorded in 26 frames included in each sector with M=26. The present invention is not limited to such a number of frames.

In this example, the sub information is recorded after being modulated into sawtooth-shaped wobbles. The present invention is not limited to such a shape of wobbles. The sub information can be recorded after being modulated into wobbles having a shape, for example, shown in FIG. 4 or 7 as described below.

In this example, the block mark is a cut-off portion of the track groove. The present invention is not limited to such a form of block mark. For example, the block mark can be modulated into wobbles having a shape, for example, shown in FIG. 5 or 6 as described below.

Example 2

Figure 3:
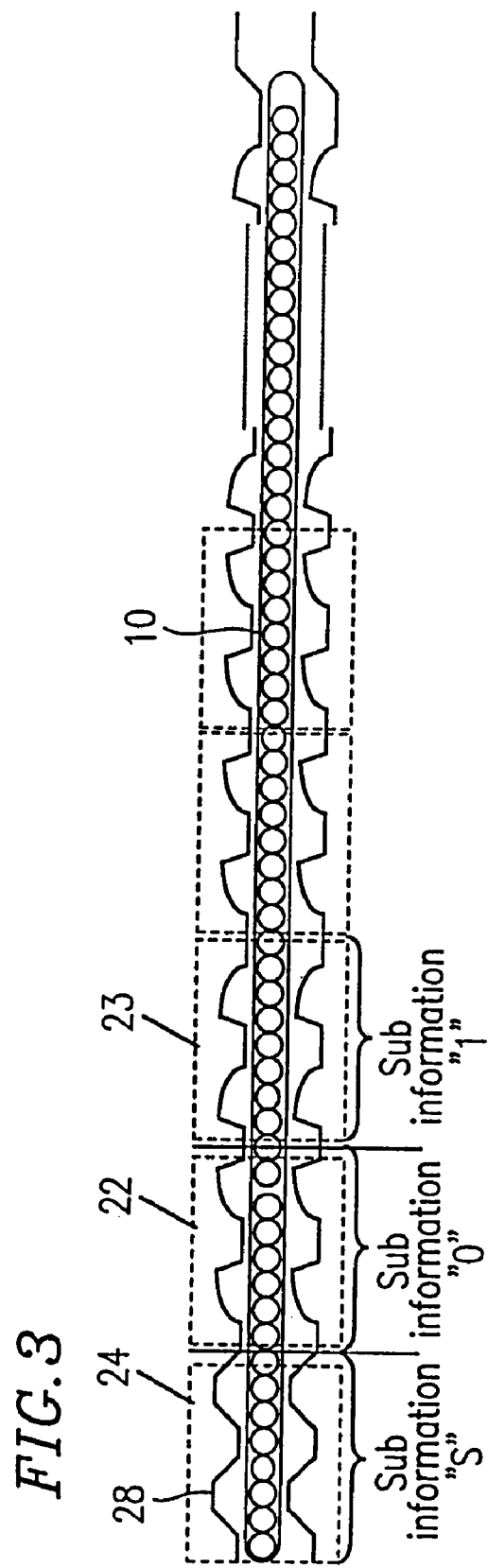
FIG. 3 shows a track groove in an optical disc medium in Example 2 according to the present invention.

FIG. 3 shows a track groove 10 according to Example 2 of the present invention. The track groove 10 can be formed in the optical disc medium 20 shown in FIG. 2 instead of the track groove 102 shown in FIG. 1. In this example, the track groove 10 has wobbles 28 indicating sub information "S" recorded in a frame 24 in addition to the wobbles 26 in the frame 22 indicating the sub information "0" and wobbles 27 in the frame 23 indicating the sub information "1". As in Example 1, address information is represented by a combination of sub information "0" and sub information "1". The sub information "S" is provided at a leading end of the block, and used for indicating the leading end of the block instead of the block mark 210 shown in FIG. 1. In this way, the overhead required for the block mark 210 can be eliminated. In this example, the wobbles 28 representing the sub information "S" have a steep rising gradient and a steep falling gradient.

Example 3

Figure 4:
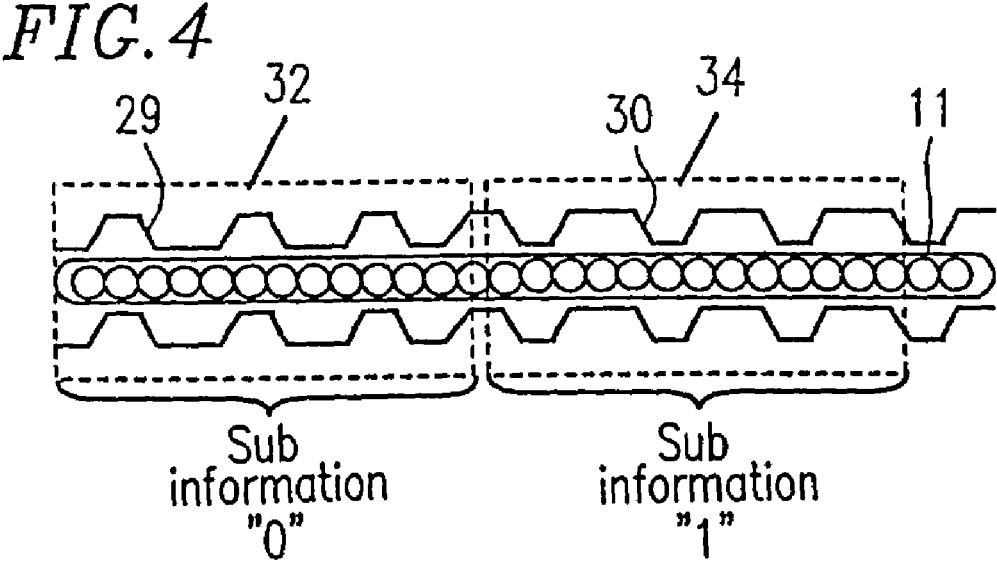
FIG. 4 shows a track groove in an optical disc medium in Example 3 according to the present invention.

FIG. 4 shows a track groove 11 according to Example 3 of the present invention. The track groove 11 can be formed in the optical disc medium 20 shown in FIG. 2 instead of the track groove 102 shown in FIG. 1. In the first and second examples, one shape of wobbles is repeated periodically in correspondence with one type of sub information, and wobbles having different rising gradients and different falling gradients are used for different types of sub information. In this example, wobbles 29 and 30 are formed so as to have different duty ratios in accordance with the type of sub information. More specifically, as shown in FIG. 4, the wobbles 29 indicating sub information "0" recorded in a frame 32 is wider in one of a ridge or a trough (in the trough in the example of FIG. 4), and the wobbles 30 indicating sub information "1" recorded in a frame 34 is wider in the other of the ridge or the trough (in the ridge in the example of FIG. 4). Such a feature eliminates the necessity of differentiating the reproduction signal for identifying the type of sub information. The reproduction signal can be identified simply by measuring the duty ratio using a clock timer or the like. Thus, the influence of the noise can be alleviated.

Example 4

Figure 5:
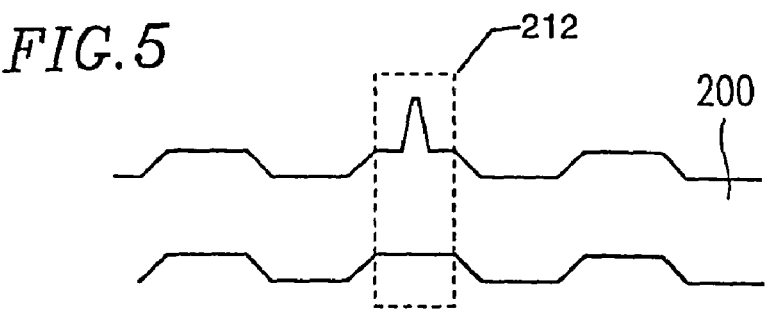
FIG. 5 shows a track groove in an optical disc medium in Example 4 according to the present invention.

FIG. 5 shows a track groove 200 according to Example 4 of the present invention. The track groove 200 can be formed in the optical disc medium 20 shown in FIG. 2 instead of the track groove 102 shown in FIG. 1. In Example 1, a portion of the track groove 102 is cut off in order to form the block mark 210. In this example, a block mark 212 formed by locally increasing the width of the track groove 200 is used instead of the block mark 210. For recording or reproducing main information, a leading end of the block can be identified by detecting the block mark 212. Use of the block mark 212 avoids the track groove 200 from being cut off, and thus the main information can also be recorded in the block mark 212. As a result, overhead can be reduced.

Example 5

Figure 6:
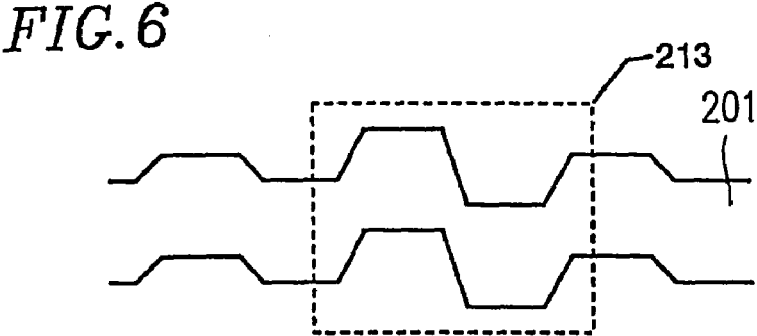
FIG. 6 shows a track groove in an optical disc medium in Example 5 according to the present invention.

FIG. 6 shows a track groove 201 according to Example 5 of the present invention. The track groove 201 can be formed in the optical disc medium 20 shown in FIG. 2 instead of the track groove 102 shown in FIG. 1. In Example 1, a portion of the track groove 102 is cut off in order to form the block mark 210. In this example, a block mark 213 formed by locally increasing the amplitude of the wobble is used instead of the block mark 210. For recording or reproducing main information, a leading end of the block can be identified by detecting the block mark 213. As in Example 4, use of the block mark 213 avoids the track groove 201 from being cut off, and thus the main information can also be recorded in the block mark 213.

Example 6

Figure 7:
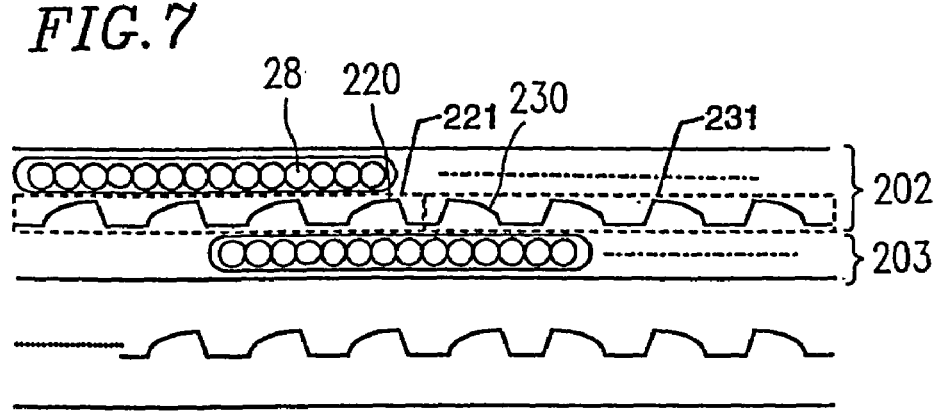
FIG. 7 shows a track groove in an optical disc medium in Example 6 according to the present invention.

FIG. 7 shows a track groove 202 and a land 203 according to Example 6 of the present invention. An optical disc medium in this example has wobbles 220 and 230 which are formed only along one edge of the track groove 202. Examples 1 through 5 concern a groove recording type optical disc medium, in which main information is recorded in the track groove. Another type of optical disc medium, which is of a so-called land-groove type, is available. In this type of optical disc medium, main information is recorded both in the grooves and lands (areas interposed between two adjacent grooves) along the track groove 202. Example 1 through 5 can be combined with the groove-land type of optical disc medium described in this example.

In FIG. 7, sub information "0" and sub information "1" are recorded along one edge of the track groove 202. The wobbles 220 formed in a frame 221 indicate the sub information "0", and the wobbles 230 formed in a frame 231 indicate the sub information "1". In this way, the track groove 202 and the land 203 adjacent to the track groove 202 are represented by the same address. Main information is recorded both in the track groove 202 and the land 203. By recording the main information in this manner, the track pitch can be narrowed, and thus higher density recording is realized.

Example 7

Figure 8:
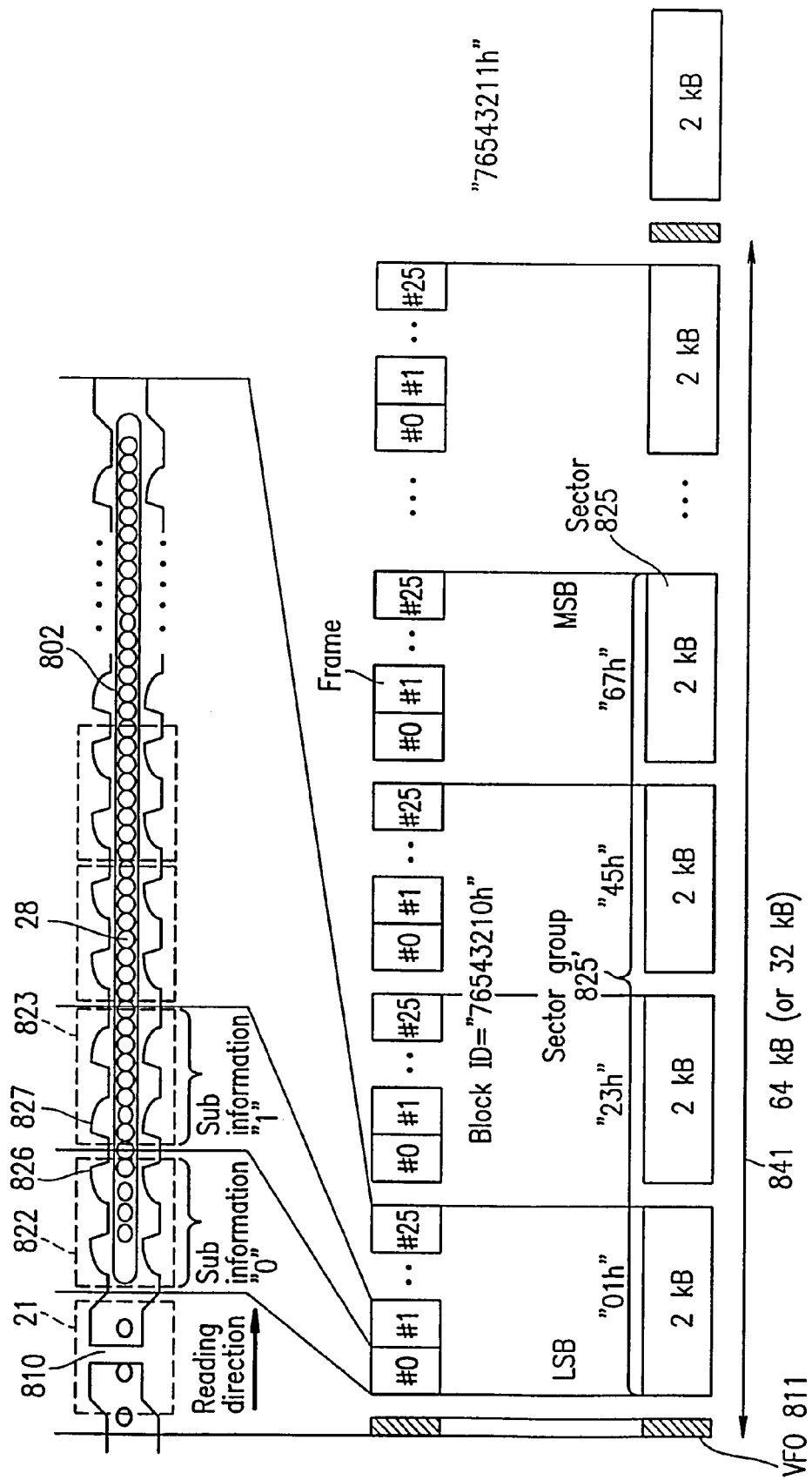
FIG. 8 shows a track groove in an optical disc medium in Example 7 according to the present invention.
Figure 9:
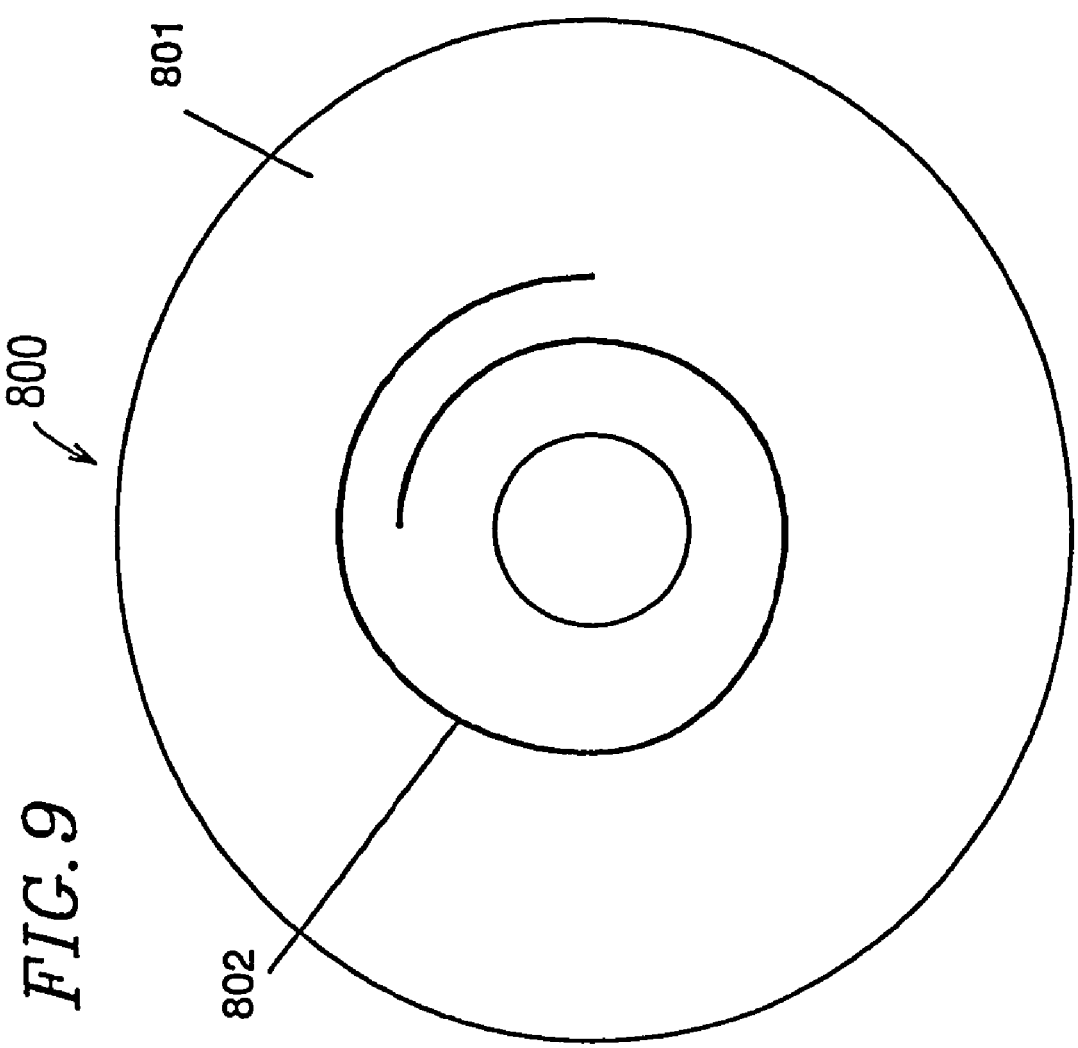
FIG. 9 shows an optical disc medium in Example 7 according to the present invention.

FIG. 9 shows an optical disc medium 800 according to Example 7 of the present invention. The optical disc medium 800 has a recording face 801, which has a spiral track groove 802 formed therein. As shown in FIG. 8, the track groove 802 has shapes which are different on a block-by-block basis. In FIG. 8, a block mark (identification mark) 810 is a cut-off portion in the track groove 802 and shows an index indicating a leading end of each block.

Each block is divided into N number of sectors 825 (N=32 or 16), and each sector 825 is divided into M number of frames #0 through #25 (M=26). Each frame has a prescribed number of wobbles 826 or 827 in a periodical manner. The wobbles 826 and 827 have different prescribed shapes from each other, and represent sub information ("0", "1" or "S"). One type of sub information ("0", "1" or "S") is represented by one shape of wobbles 826 or 827. The type of sub information and the shape of wobbles (wobbles 826 or 827) are in a one-to-one relationship. More specifically, the wobbles 826 and 827 both have a generally sawtooth shape, and have different rising shapes (or rising gradient) and falling shapes (falling gradients). The wobbles 826 or 827 are formed in accordance with the type of sub information ("0" or "1") A string of sub information is represented by a combination of the wobbles 826 and 827. A string of sub information is represented by a combination of the wobbles 826 and 827.

The difference in the rising gradient and the falling gradient between the wobbles 826 and 827 can be easily detected by a differential push-pull detection signal as follows. A scanning laser beam is directed to the track groove 802, and a differential signal indicating the difference between the light amounts received by detection areas of a light receiving element divided along a direction perpendicular to the track groove 802 (a radial direction) of the optical disc medium 800 (i.e., a push-pull signal) is generated. Thus, a detection signal having a rising gradient and a falling gradient which vary in accordance with whether the sub information is "0" or "1" is obtained. This difference in the rising gradient and the falling gradient can be easily identified by, for example, differentiating the detection signal.

Thus, the type of the sub information can be detected by the size of the value obtained as a result of differentiation. When differentiation is used, however, a noise component is naturally increased. In an optical disc medium having an inferior S/N ratio, a detection error is reasonably expected. In this example, each pattern of the wobbles 826 and 827 is repeated a plurality of times in order to enhance the reliability of detection.

Main information is recorded in a block unit 841 along the track groove 802 from the block mark 810. The block unit 841 has a prescribed length, for example, 64 kB (or 32 kB). The main information can be recorded as recording marks 28. A block unit is a unit for information processing, and is, for example, an ECC block. The block unit 841 is divided into 32 sectors 825 when N=32 (or 16 sectors 825 when N=16). Each sector 25 is a sub block having a length of 2 kB. Each sector 25 is divided into 26 frames #0 through #25 when M=26. At a leading end of each of frames #0 through #25, a SYNC mark is recorded as a synchronization signal used for reproducing data.

A frame is a fundamental unit of information recorded on the track groove 802. In FIG. 8, frame #0 is represented by reference numeral 822 and frame #1 is represented by reference numeral 823. As exemplified by the frames 822 and 823, each frame includes one type of wobbles formed in a periodical manner in advance. In this way, 1-bit sub information "0", "1" or "S" is described in each of the frames 822 and 823. A 26-bit (M=26) sub information group included in each sector 825 indicates at least a portion of a block ID (address information) of the corresponding block unit 841.

One bit information is assigned to each of frames #0 through #25. For example, 8 frames (i.e., 8 bits) are assigned as a 1-byte portion of the block ID. The following 8 frames are assigned as a 1-byte parity of the block ID. The following 5 frames are assigned as a 5-bit byte sector number. The remaining 5 frames are assigned as a 5-bit parity of the sector number. The sector number indicates the order of the sector among the plurality of sectors (i.e., the fifth sector, tenth sector or the like). Each parity indicates at least one of an error detection code or an error correction code.

The sub information for one sector assigned as described above is arranged, for example, over 4 sectors 825 (i.e., a sector group 825'). By arranging a portion of the block ID, i.e., 1 bytes for each of the 4 sectors, a 32-bit block ID (8 bits×4=32 bits) can be represented.

FIG. 10 shows an exemplary format of the sub information recorded in the sectors 825 in the block unit 841 and frames #0 through #25. In FIG. 10, the leftmost section shows the sector numbers. To the right thereof, the sub information recorded in the frames of each sector is shown. It is assumed that the block unit 841 includes 32 sectors. The sector numbers in parentheses "( )" are the sector numbers in the case where the block unit 841 includes 16 sectors. Each of frames #0 through #25 includes 1-bit sub information. In this example, the block unit 841 is an ECC block.

The contents of sector 0 will be described. Among frames #0 through #25 of sector 0, in frames #0 through #7, the first 1 byte among the 4 bytes (32 bits) of the ECC block address is buried sequentially from the LSB. In frames #8 through #15, the sub information of the first 1 byte among the 4 bytes of the parity of the ECC block address is buried. In frames #16 through #20, 5-bit sub information representing the sector number is buried. In frames #21 through #25, 5-bit sub information representing the parity of the sector number is buried. As shown in FIG. 8, in sector 0, 1-byte "01h" is buried as a portion of the block ID.

The contents of sector 1 will be described. Among frames #0 through #25 of sector 1, in frames #0 through #7, the second 1 byte among the 4 bytes (32 bits) of the ECC block address is buried sequentially from the lowest bit. In frames #8 through #15, the sub information of the second 1 byte among the 4 bytes of the parity of the ECC block address is buried. In frames #16 through #20, 5-bit sub information representing the sector number is buried. In frames #21 through #25, 5-bit sub information representing the parity of the sector number is buried. As shown in FIG. 8, in sector 1, 1-byte "23h" is buried as a portion of the block ID.

The contents of sector 2 will be described. Among frames #0 through #25 of sector 2, in frames #0 through #7, the third 1 byte among the 4 bytes (32 bits) of the ECC block address is buried sequentially from the lowest bit. In frames #8 through #15, the sub information of the third 1 byte among the 4 bytes of the parity of the ECC block address is buried. In frames #16 through #20, 5-bit sub information representing the sector number is buried. In frames #21 through #25, 5-bit sub information representing the parity of the sector number is buried. As shown in FIG. 8, in sector 2, 1-byte "45h" is buried as a portion of the block ID.

The contents of sector 3 will be described. Among frames #0 through #25 of sector 3, in frames #0 through #7, the fourth 1 byte among the 4 bytes (32 bits) of the ECC block address is buried sequentially from the lowest bit. In frames #8 through #15, the sub information of the fourth 1 byte among the 4 bytes of the parity of the ECC block address is buried. In frames #16 through #20, 5-bit sub information representing the sector number is buried. In frames #21 through #25, 5-bit sub information representing the parity of the sector number is buried. As shown in FIG. 8, in sector 3, 1-byte "67h" is buried as a portion of the block ID.

In this manner, a 32-bit block ID "76543210h" is represented by combining 1-byte information from each of the 4 sectors 825.

The 4 byte block ID in the sectors 825 is preferably arranged in a reading order, i.e., sequentially from the first sector 825 to be read to the last sector 825 to be read, and from the lowest bit to the highest bit of the block ID.

The contents of sectors 4 et seq. will be described. In sectors 4 through 7, the contents of sectors 0 through 3 are described in repetition. Similarly, in sectors 8 through 11, 12 through 15, 16 through 19, 20 through 23, 24 through 27, and 28 through 31, the contents of sectors 0 through 3 are described in repetition.

In this manner, the information in 4 sectors is described 8 times (4 times when the block unit 841 includes 16 sectors). Thus, parity information for realizing error correction can be added to each block unit 841. The reading reliability of the block ID can be enhanced.

Since the sector numbers are described, even when 1 byte of the block ID is missing, the 1 byte which is missing can be identified easily by reading the sector number. Thus, the reading reliability of the block ID can be enhanced.

Since the sector numbers are described, the following advantage is provided. When the data is not continuously read, for example, after a seek operation, the sector number of the sector 825 immediately after the seek operation can be read, instead of reading the block unit 841 from the block mark 810 at the leading end. Due to such an operation, the block ID can be finally determined by reading the sub information of the 4 sectors 825 starting from an arbitrary sector 825.

Since the block ID is finally determined by reading only any one of sector groups 825' each including 4 sectors (8 kB=2 kB×4), post-processing (data read, data recording, etc.) can be performed quickly.

Even when about 4 sectors of the block ID are incorrectly read due to a disc scratch (defect), the correct block ID can be read by the sector group with no defect. Thus, a significantly high level of reliability of reading the block ID is guaranteed.

Instead of the sector number, an ID number indicating the order of the sector among the 4 sector 825 (i.e., the first sector, second sector, or the like) in one sector group 825' can be described. Whereas FIG. 10 shows the 5-bit sector number and the 5-bit parity of the sector number in frames #16 through #25, FIG. 16 shows a 2-bit ID number, a 2-bit parity of the ID number, and a 6-bit order number of the repeated block ID, indicating the order of the repeated block ID, in frames #16 through #25.

When the ID numbers are used, 5-bit sub information required for each sector number can be reduced to 2-bits. Using the remaining 8 bits (frames #18 through #25), the error correction ability for the ID numbers can be improved, or the order number of the block ID can be described.

Since the ID numbers are described, the following advantage is provided. When the data is not continuously read, for example, after a seek operation, the ID number of the sector 825 immediately after the seek operation can be read, instead of reading the block unit 841 from the block mark 810 at the leading end. Due to such an operation, the block ID can be finally determined by reading the sub information of the 4 sectors 825 starting from an arbitrary sector 825.

In the case where the sub information includes the order number of the block ID, the order number can be used for finally determining the address number based on a majority. In addition, such a number provides useful information for signal processing, for example, which sector 825 in the block is now read or which sub information group in the block is incorrect.

In the case of an optical disc medium having a plurality of recording faces or layers, an order number of the recording layer can be included in the sub information group. In this way, the recording face can be easily identified. For example, one of the four same order numbers in FIG. 16 can be replaced with the order number of the recording layer. Thus, the recording face can be easily identified.

In this example, the block ID has 32 bits. The number of bits of the address information is not limited to 32, but can be any necessary number in accordance with, for example, the data amount to be recorded on the optical disc medium or the type and system of the error correction code.

In this example, the block unit is divided into 32 sectors with N=32 (or 16 sectors with N=16). The present invention is not limited to such a number of sectors.

In this example, the sub information is recorded in 26 frames included in each sector with M=26. The present invention is not limited to such a number of frames.

In this example, the sub information is recorded after being modulated into sawtooth-shaped wobbles. The present invention is not limited to such a shape of wobbles. The sub information can be recorded after being modulated into wobbles having a shape, for example, shown in FIG. 4 or 7.

In this example, the block mark is a cut-off portion of the track groove. The present invention is not limited to such a form of block mark. For example, the block mark can be modulated into wobbles having a shape, for example, shown in FIG. 5 or 6.

Example 8

FIG. 11 shows a track groove 1102 according to Example 8 of the present invention. The track groove 1102 can be formed in the optical disc medium 20 shown in FIG. 2 instead of the track groove 102 shown in FIG. 1. As shown in FIG. 11, the track groove 1102 has shapes which are different on a block-by-block basis. In FIG. 11, a block mark (identification mark) 1110 is a cut-off portion in the track groove 1102 and shows an index indicating a leading end of each block.

Each block is divided into N number of sectors 1125 (N=32 or 16), and each sector 1125 is divided into M number of frames #0 through #25 (M=26). Each frame has a prescribed number of wobbles 1126 or 1127 in a periodical manner. The wobbles 1126 and 1127 have different prescribed shapes from each other, and represent sub information ("0", "1" or "S"). One type of sub information ("0", "1" or "S") is represented by one shape of wobbles 1126 or 1127. The type of sub information and the shape of wobbles (wobbles 1126 or 1127) are in a one-to-one relationship. More specifically, the wobbles 1126 and 1127 both have a generally sawtooth shape, and have different rising shapes (or rising gradient) and falling shapes (falling gradients). The wobbles 1126 or 1127 are formed in accordance with the type of sub information ("0" or "1"). A string of sub information is represented by a combination of the wobbles 1126 and 1127.

The difference in the rising gradient and the falling gradient between the wobbles 1126 and 1127 can be easily detected by a differential push-pull detection signal as follows. A scanning laser beam is directed to the track groove 1102, and a differential signal indicating the difference between the light amounts received by detection areas of a light receiving element divided along a direction perpendicular to the track groove 1102 (a radial direction) of the optical disc medium 20 (i.e., a push-pull signal) is generated. Thus, a detection signal having a rising gradient and a falling gradient which vary in accordance with whether the sub information is "0" or "1" is obtained. This difference in the rising gradient and the falling gradient can be easily identified by, for example, differentiating the detection signal.

Thus, the type of the sub information can be detected by the size of the value obtained as a result of differentiation. When differentiation is used, however, a noise component is naturally increased. In an optical disc medium having an inferior S/N ratio, a detection error is reasonably expected. In this example, each pattern of the wobbles 1126 and 1127 is repeated a plurality of times in order to enhance the reliability of detection.

Main information is recorded in a block unit 1141 along the track groove 1102 from the block mark 1110. The block unit 1141 has a prescribed length, for example, 64 kB (or 32 kB). The main information can be recorded as recording marks 28. A block unit is a unit for information processing, and is, for example, an ECC block. The block unit 1141 is divided into 32 sectors 1125 when N=32 (or 16 sectors 1125 when N=16). Each sector 1125 is a sub block having a length of 2 kB. Each sector 1125 is divided into 26 frames #0 through #25 when M=26. At a leading end of each of frames #0 through #25, a SYNC mark is recorded as a synchronization signal used for reproducing data.

A frame is a fundamental unit of information recorded on the track groove 1102. In FIG. 11, frame #0 is represented by reference numeral 1122 and frame #1 is represented by reference numeral 1123. As exemplified by the frames 1122 and 1123, each frame includes one type of wobbles formed in a periodical manner in advance. In this way, 1-bit sub information "0", "1" or "S" is described in each of the frames 1122 and 1123. A 26-bit (M=26) sub information group included in each sector 1125 indicates at least a portion of a block ID (address information) of the corresponding block unit 1141.

The block ID can include an error correction code, an error detection code, or a parity code or the like for correcting or detecting detection signals, in addition to the information indicating the address.

The 26 frames in each sector 1125 are divided into, for example, first 13 frames (frames #0 through #12; first frame group) and second 13 frames (frames #13 through 25; second frame group). 1-bit sub information is recorded in every 13 frames as a portion of the block ID. Thus, 2-bit sub information is recorded in each sector 1125 as a portion of the block ID.

FIG. 12 shows an exemplary format of the sub information recorded in the sectors 1125 in the block unit 1141 and frames #0 through #25. In FIG. 12, the leftmost section shows the sector numbers. To the right thereof, the sub information recorded in the frames of each sector is shown. 1-bit sub information is recorded in the first 13 frames, and 1-bit sub information is recorded in the second 13 frames (frame group). In this example, the block unit 1141 is an ECC block. B0 through B31 each indicate the order number of the bit (i.e., whether the corresponding bit is the first bit, the second bit, etc.) in the ECC block address.

The contents of sector 0 will be described. Among frames #0 through #25 of sector 0, in frames #0 through #12 (first frames), the first 1 bit among the 32 bits of the ECC block address (LSB) is buried. In frames #13 through #25 (second frames), the sub information of the second 1 bit among the 32 bits of the ECC block address is buried. As shown in FIG. 11, in sector 0, 2-bit information ("0" and "1") is buried as a portion of the block ID.

In the first frames of sector 0, a SYNC code "S" indicating the start of the ECC block address can be buried instead of the first 1 bit of the ECC block address (LSB). The SYNC code "S" can be used as a synchronization signal for reproducing the ECC block address or as a detection mark for detecting the start of the ECC block address.

The contents of sector 1 will be described. Among frames #0 through #25 of sector 1, in frames #0 through #12, the third 1 bit among the 32 bits of the ECC block address is buried. In frames #13 through #25, the sub information of the fourth 1 byte among the 32 bits of the ECC block address is buried. As shown in FIG. 11, in sector 1, 2-bit information ("0" and "1") is buried as a portion of the block ID.

In this manner, a 32-bit block ID is represented by combining 2-bit information from each of the 16 sectors 1125.

In the case where the ECC block has a length of 32 kB and the one block unit 1141 is divided into 16 sectors 1125, a 32-bit block can be obtained by recording 2-bit sub information in each sector 1125.

In the case where the ECC block has a length of 32 kB, one block ID is represented by 16 sectors as described above. In the case where the ECC block has a length of 64 kB, one block unit 1141 has 32 sectors 1125. In sectors 16 through 31, the contents of sectors 0 through 15 are described in repetition. Namely, the information in 16 sectors (sub information group) is described twice.

Since the sub information is recorded in repetition in the block unit 1141, the block ID is finally determined by reading only 16 sectors, i.e., 32 kB (2 kB×16). Therefore, post-processing (data read, data recording, etc.) can be performed quickly. Since the block ID is repeated twice in the block unit 1141, the reading reliability of the block ID can be enhanced.

Instead of recording the block ID in the block unit 1141 twice, information other than the block ID can be included. For example, the order number of the block ID can be included in the sub information group. The order number can be used for finally determining the address number based on a majority. In addition, such a number provides useful information for signal processing, for example, which sector 1125 in the block is now read or which sub information group in the block is incorrect.

In the case of an optical disc medium having a plurality of recording faces or layers, an order number of the recording layer can be included in the sub information group. In this way, the recording face can be easily identified as described above with reference to FIG. 16.

In this example, the block ID has 32 bits. The number of bits of the address information is not limited to 32, but can be any necessary number in accordance with, for example, the data amount to be recorded on the optical disc medium or the type and system of the error correction code.

In this example, the block unit is divided into 32 sectors with N=32 (or 16 sectors with N=16). The present invention is not limited to such a number of sectors.

In this example, the sub information is recorded in 26 frames included in each sector with M=26. The present invention is not limited to such a number of frames.

In this example, the sub information is recorded after being modulated into sawtooth-shaped wobbles. The present invention is not limited to such a shape of wobbles. The sub information can be recorded after being modulated into wobbles having a shape, for example, shown in FIG. 4 or 7.

In this example, the block mark is a cut-off portion of the track groove. The present invention is not limited to such a form of block mark. For example, the block mark can be modulated into wobbles having a shape, for example, shown in FIG. 5 or 6.

Example 9

Figure 13:
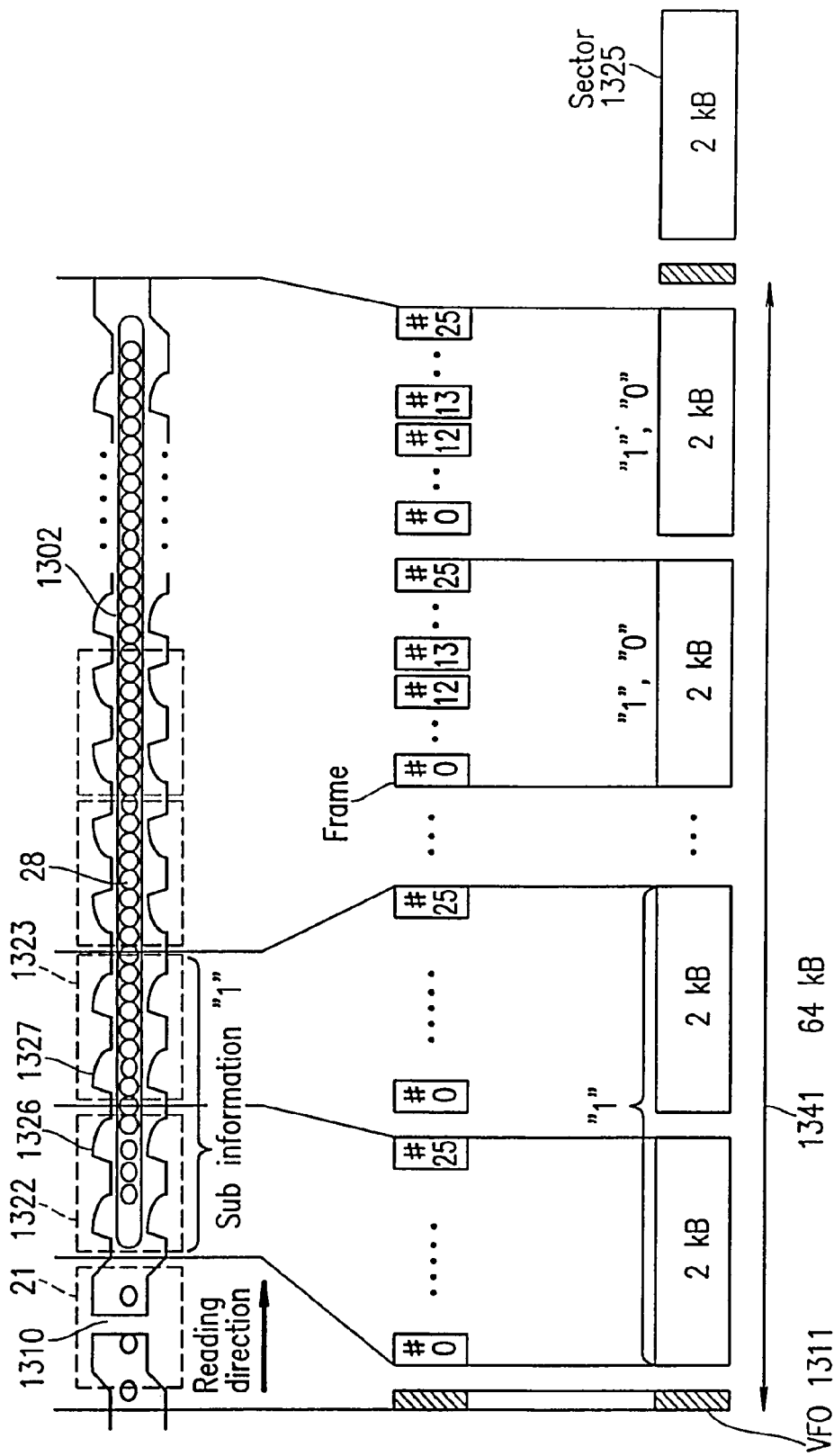
FIG. 13 shows a track groove in an optical disc medium in Example 9 according to the present invention.

FIG. 13 shows a track groove 1302 according to Example 9 of the present invention. The track groove 1302 can be formed in the optical disc medium 20 shown in FIG. 2 instead of the track groove 102 shown in FIG. 1. As shown in FIG. 13, the track groove 1302 has shapes which are different on a block-by-block basis. In FIG. 13, a block mark (identification mark) 1310 is a cut-off portion in the track groove 1302 and shows an index indicating a leading end of each block.

Each block is divided into N number of sectors 1325 (N=32 or 16), and each sector 1325 is divided into M number of frames #0 through #25 (M=26). Each frame has a prescribed number of wobbles 1326 or 1327 in a periodical manner. The wobbles 1326 and 1327 have different prescribed shapes from each other, and represent sub information ("0", "1" or "S"). One type of sub information ("0", "1" or "S") is represented by one shape of wobbles 1326 or 1327. The type of sub information and the shape of wobbles (wobbles 1326 or 1327) are in a one-to-one relationship. More specifically, the wobbles 1326 and 1327 both have a generally sawtooth shape, and have different rising shapes (or rising gradient) and falling shapes (falling gradients). The wobbles 1326 or 1327 are formed in accordance with the type of sub information ("0" or "1"). A string of sub information is represented by a combination of the wobbles 1326 and 1327.

The difference in the rising gradient and the falling gradient between the wobbles 1326 and 1327 can be easily detected by a differential push-pull detection signal as follows. A scanning laser beam is directed to the track groove 1302, and a differential signal indicating the difference between the light amounts received by detection areas of a light receiving element divided along a direction perpendicular to the track groove 1302 (a radial direction) of the optical disc medium 20 (i.e., a push-pull signal) is generated. Thus, a detection signal having a rising gradient and a falling gradient which vary in accordance with whether the sub information is "0" or "1" is obtained. This difference in the rising gradient and the falling gradient can be easily identified by, for example, differentiating the detection signal.

Thus, the type of the sub information can be detected by the size of the value obtained as a result of differentiation. When differentiation is used, however, a noise component is naturally increased. In an optical disc medium having an inferior S/N ratio, a detection error is reasonably expected. In this example, each pattern of the wobbles 1326 and 1327 is repeated a plurality of times in order to enhance the reliability of detection.

Main information is recorded in a block unit 1341 along the track groove 1302 from the block mark 1310. The block unit 1341 has a prescribed length, for example, 64 kB (or 32 kB). The main information can be recorded as recording marks 28. A block unit is a unit for information processing, and is, for example, an ECC block. The block unit 1341 is divided into 32 sectors 1325 when N=32 (or 16 sectors 1325 when N=16). Each sector 1325 is a sub block having a length of 2 kB. Each sector 1325 is divided into 26 frames #0 through #25 when M=26. At a leading end of each of frames #0 through #25, a SYNC mark is recorded as a synchronization signal used for reproducing data.

A frame is a fundamental unit of information recorded on the track groove 1302. In FIG. 13, frame #0 is represented by reference numeral 1322 and frame #1 is represented by reference numeral 1323. As exemplified by the frames 1322 and 1323, each frame includes one type of wobbles formed in a periodical manner in advance. In this way, 1-bit sub information "0", "1" or "S" is described in each of the frames 1322 and 1323. A 26-bit (M=26) sub information group included in each sector 1325 indicates at least a portion of a block ID (address information) of the corresponding block unit 1341.

The 26 frames in each sector 1325 are divided into, for example, first 13 frames (frames #0 through #12; first frame group) and second 13 frames (frames #13 through #25; second frame group). In the 13 frames in the first frames, the same shape of wobbles are formed in a periodical manner in advance. In the 13 frames in the second frames, the same shape of wobbles are formed in a periodical manner in advance. Thus, 2-bit sub information "0", "1" or "S" is described in each sector 1325. 32-bit sub information in each sector 1325 indicates at least a portion of a block ID (address information) of the corresponding block unit 1341.

The block ID can include an error correction code, an error detection code, or a parity code or the like for correcting or detecting detection signals, in addition to the information indicating the address.

FIG. 14 shows an exemplary format of the sub information recorded in the sectors 1325 in the block unit 1341 and frames #0 through #25. In FIG. 14, the leftmost section shows the sector numbers. To the right thereof, the sub information recorded in the frames of each sector is shown.

The contents of sector 0 will be described. In all frames #0 through #25 of sector 0, the first 1 bit among the 32 bits of the ECC block address (LSB) is buried. As shown in FIG. 14, in sector 0, 1-bit sub information B0 ("0" or "1") is buried.

The contents of sector 1 will be described. In all frames #0 through #25 of sector 1, the first 1 bit among the 32 bits of the ECC block address (LSB) is buried. As shown in FIG. 14, in sector 1, 1-bit sub information B0 ("0" or "1") is buried.

In sector 1, the sub information B0 buried in sector 0 is described in repetition.

The contents of sector 2 will be described. In all frames #0 through #25 of sector 2, the second 1 bit among the 32 bits of the ECC block address is buried. As shown in FIG. 14, in sector 2, 1-bit sub information B1 ("0" or "1") is buried.

The contents of sector 3 will be described. In all frames #0 through #25 of sector 3, the second 1 bit among the 32 bits of the ECC block address is buried. As shown in FIG. 14, in sector 3, 1-bit sub information B1 ("0" or "1") is buried.

In sector 3, the sub information B1 buried in sector 2 is described in repetition.

In this manner, in even number sectors up to sector 12, third, fourth, fifth, sixth and seventh 1 bit among the 32 bits of the ECC block address are respectively buried. In the odd number (N) sectors up to sector 13, the same sub information as in the even-number (N−1) sectors is buried.

The contents of sectors 14 through 24 will be described.

The contents of sector 14 will be described. In all frames #0 through #25 of sector 14, the eighth 1 bit among the 32 bits of the ECC block address is buried. As shown in FIG. 14, in sector 14, 1-bit sub information B7 ("0" or "1") is buried.

The contents of sector 15 will be described. In all frames #0 through #25 of sector 15, the ninth 1 bit among the 32 bits of the ECC block address is buried. As shown in FIG. 14, in sector 15, 1-bit sub information B8 ("0" or "1") is buried.

1-bit sub information is described up to sector 24 similarly.

The contents of sectors 25 through 31 will be described.

The contents of sector 25 will be described. Among frames #0 through #25 of sector 25, in frames #0 through #12 (first frame group), the 19th 1 bit among the 32 bits of the ECC block address is buried. As shown in FIG. 14, in the first frame group of sector 25, 1-bit sub information B18 ("0" or "1") is buried.

Among frames #0 through #25 of sector 25, in frames #13 through #25 (second frame group), the 20th 1 bit among the 32 bits of the ECC block address is buried. As shown in FIG. 14, in the second frame group of sector 25, 1-bit sub information B19 ("0" or "1") is buried.

The contents of sector 26 will be described. Among frames #0 through #25 of sector 26, in frames #0 through #12 (first frame group), the 21st 1 bit among the 32 bits of the ECC block address is buried. As shown in FIG. 14, in the first frame group of sector 26, 1-bit sub information B20 ("0" or "1") is buried.

Among frames #0 through #25 of sector 26, in frames #13 through #25 (second frame group), the 22nd 1 bit among the 32 bits of the ECC block address is buried. As shown in FIG. 14, in the second frame group of sector 26, 1-bit sub information B21 ("0" or "1") is buried.

1-bit sub information is described up to sector 31 similarly.

As described above, in this example, the number of sectors and the number of frames in which the sub information is described are varied in accordance with the position of the bit of the block ID (i.e., lower bit or higher bit). In this example, sub information B0 is the LSB and the sub information B31 is the HSB.

In a system for reading continuous data stored in, for example, an optical disc, the block ID of data which is being continuously read increases from a lower bit sequentially. Between two adjacent block IDs, the block ID value is different only by "1". Therefore, the block ID can be determined merely by reading several lower bits of the block ID which is being read, since the remaining higher bits can be estimated from the value which is read from the immediately previous block ID or from the value which is read from the block ID previous to the current block ID by a certain number. In this case, the reading reliability of the several lower bits of the block ID is important. In this example, the lower bits of the block ID is arranged over a plurality of sectors, i.e., by a larger number than the other higher bits as shown in FIG. 14. Therefore, the reading reliability of the lower bits of the block ID, and thus the reading efficiency of the block ID can be enhanced.

In this example, the block ID has 32 bits. The number of bits of the address information is not limited to 32, but can be any necessary number in accordance with, for example, the data amount to be recorded on the optical disc medium or the type and system of the error correction code.

In this example, the block unit is divided into 32 sectors with N=32 (or 16 sectors with N=16). The present invention is not limited to such a number of sectors.

In this example, the sub information is recorded in 26 frames included in each sector with M=26. The present invention is not limited to such a number of frames.

In this example, the sub information is recorded after being modulated into sawtooth-shaped wobbles. The present invention is not limited to such a shape of wobbles. The sub information can be recorded after being modulated into wobbles having a shape, for example, shown in FIG. 4 or 7.

In this example, the block mark is a cut-off portion of the track groove. The present invention is not limited to such a form of block mark. For example, the block mark can be modulated into wobbles having a shape, for example, shown in FIG. 5 or 6.

Example 10

FIG. 15 shows a track groove 1502 according to Example 10 of the present invention. The track groove 1502 can be formed in the optical disc medium 20 shown in FIG. 2 instead of the track groove 102 shown in FIG. 1. As shown in FIG. 15, the track groove 1502 has shapes which are different on a block-by-block basis. In FIG. 15, a block mark (identification mark) 1510 is a cut-off portion in the track groove 1502 and shows an index indicating a leading end of each block.

Each block is divided into N number of sectors 1525 (N=32 or 16), and each sector 1525 is divided into M number of frames #0 through #25 (M=26). Each frame has a prescribed number of wobbles 1526 or 1527 in a periodical manner. The wobbles 1526 and 1527 have different prescribed shapes from each other, and represent sub information ("0", "1" or "S"). One type of sub information ("0", "1" or "S") is represented by one shape of wobbles 1526 or 1527. The type of sub information and the shape of wobbles (wobbles 1526 or 1527) are in a one-to-one relationship. More specifically, the wobbles 1526 and 1527 both have a generally sawtooth shape, and have different rising shapes (or rising gradient) and falling shapes (falling gradients). The wobbles 1526 or 1527 are formed in accordance with the type of sub information ("0" or "1"). A string of sub information is represented by a combination of the wobbles 1526 and 1527.

The difference in the rising gradient and the falling gradient between the wobbles 1526 and 1527 can be easily detected by a differential push-pull detection signal as follows. A scanning laser beam is directed to the track groove 1502, and a differential signal indicating the difference between the light amounts received by detection areas of a light receiving element divided along a direction perpendicular to the track groove 102 (a radial direction) of the optical disc medium 20 (i.e., a push-pull signal) is generated. Thus, a detection signal having a rising gradient and a falling gradient which vary in accordance with whether the sub information is "0" or "1" is obtained. This difference in the rising gradient and the falling gradient can be easily identified by, for example, differentiating the detection signal.

Thus, the type of the sub information can be detected by the size of the value obtained as a result of differentiation. When differentiation is used, however, a noise component is naturally increased. In an optical disc medium having an inferior S/N ratio, a detection error is reasonably expected. In this example, each pattern of the wobbles 1526 and 1527 is repeated a plurality of times in order to enhance the reliability of detection.

Main information is recorded in a block unit 1541 along the track groove 1502 from the block mark 1510. The block unit

1541 has a prescribed length of, for example, 64 kB (or 32 kB). The main information can be recorded as recording marks 28. A block unit is a unit for information processing, and is, for example, an ECC block. The block unit 1541 is divided into 32 sectors 1525 when N=32 (or 16 sectors 1525 when N=16). Each sector 1525 is a sub block having a length of 2 kB. Each sector 1525 is divided into 26 frames #0 through #25 when M=26. At a leading end of each of frames #0 through #25, a SYNC mark is recorded as a synchronization signal used for reproducing data.

A frame is a fundamental unit of information recorded on the track groove 1502. In FIG. 15, frame #0 is represented by reference numeral 1522 and frame #1 is represented by reference numeral 1523. As exemplified by the frames 1522 and 1523, each frame includes one type of wobbles formed in a periodical manner in advance. In this way, 1-bit sub information "0", "1" or "S" is described in each of the frames 1522 and 1523. The sub information is described as SYNC information. A 26-bit (M=26) sub information group included in each sector 1525 indicates at least a portion of a block ID (address information) of the corresponding block unit 1541.

1-bit sub information is assigned to one frame, and thus a 32-bit block ID is buried in the continuous 32 frames (sub information group).

The block ID can include an error correction code, an error detection code, or a parity code or the like for correcting or detecting detection signals, in addition to the information indicating the address.

As described above, a block ID is represented by combining 1-bit information, which is assigned to each of the 32 frames. Namely, the entire block ID is represented by the 32-bit sub information group.

When the ECC block has a length of 64 kB, each block includes 32 sectors. Accordingly, one block includes 832 frames (=32×26). When the block ID is represented by 32 frames (one frame group), the block ID can be repeated 26 times (i.e., the same block ID is described in 26 frame groups) in the block unit 1541.

When the ECC block has a length of 32 kB, each block includes 16 sectors. Accordingly, one block includes 416 frames (=16×26). When the block ID is represented by 32 frames (one frame group), the block ID can be repeated 13 times (i.e., the same block ID is described in 13 frame groups) in the block unit 1541.

In this manner, the block ID is represented by 32 frames (one frame group), and the ID block is described a plurality of times in the block unit 1541.

Thus, the block ID is finally determined by reading only 32 frames. Therefore, post-processing (data read, data recording, etc.) can be performed quickly.

Since the block ID is repeated a plurality of times in the block unit 1541, the reading reliability of the block ID can be enhanced.

Information other than the block ID can be included as described above with reference to FIG. 16 although the times of repeating the block ID in the block unit 1541 is reduced in this case. For example, the order number of the block ID can be included in the sub information group. The order number can be used for finally determining the address number based on a majority. In addition, such a number provides useful information for signal processing, for example, which sector 1525 in the block is now read or which sub information group in the block is incorrect.

In the case of an optical disc medium having a plurality of recording faces or layers, an order number of the recording layer can be included in the sub information group. In this way, the recording face can be easily identified. For example, one of the four same order numbers in FIG. 16 can be replaced with the order number of the recording layer. Thus, the recording face can be easily identified.

In this example, the block ID has 32 bits. The number of bits of the address information is not limited to 32, but can be any necessary number in accordance with, for example, the data amount to be recorded on the optical disc medium or the type and system of the error correction code.

In this example, the block unit is divided into 32 sectors with N=32 (or 16 sectors with N=16). The present invention is not limited to such a number of sectors.

In this example, the sub information is recorded in 26 frames included in each sector with M=26. The present invention is not limited to such a number of frames.

In this example, the sub information is recorded after being modulated into sawtooth-shaped wobbles. The present invention is not limited to such a shape of wobbles. The sub information can be recorded after being modulated into wobbles having a shape, for example, shown in FIG. 4 or 7.

In this example, the block mark is a cut-off portion of the track groove. The present invention is not limited to such a form of block mark. For example, the block mark can be modulated into wobbles having a shape, for example, shown in FIG. 5 or 6.

Example 11

Figure 22:
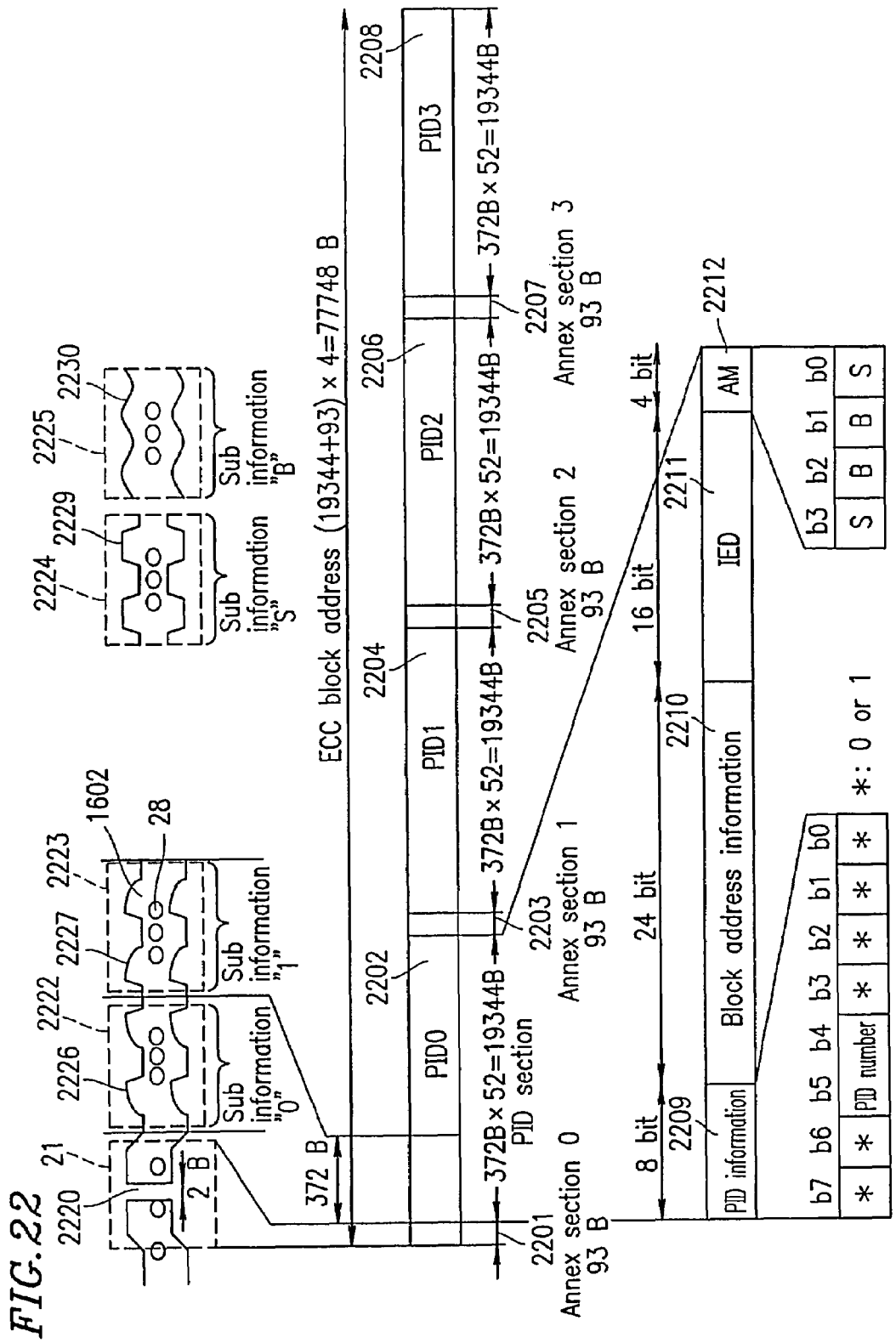
FIG. 22 shows an address structure of the optical disc medium in Example 11 according to the present invention.

FIG. 22 shows a track groove 1602 according to Example 11 of the present invention. The track groove 1602 can be formed in the optical disc medium 20 shown in FIG. 2 instead of the track groove 102 shown in FIG. 1. As shown in FIG. 22, the track groove 1602 has shapes which are different on a block-by-block basis.

Referring to FIG. 22, an ECC block which is a unit of forming a block address is divided into four PID sections PID0 through PID3. The PID sections PID0, PID1, PID2 and PID3 are respectively indicated by reference numerals 2202, 2204, 2206 and 2208. The PID section 2202, 2204, 2206 and 2208 are respectively preceded by annex sections 0 through 3. The annex sections 0, 1, 2 and 3 are respectively indicated by reference numerals 2201, 2203, 2205 and 2207. The annex sections 2201, 2203, 2205 and 2207 each include a block mark (identification mark) 2220. In FIG. 22, a block mark (identification mark) 2220 is a cut-off portion in the track groove 1602 and shows an index indicating a leading end of each PID section.

As described above, the block is divided into four PID sections (N=4), and each PID section is further divided into M number of frames (M=52). Each frame (e.g., each of frames 2222, 2223, 2224 and 2225) has a prescribed number of wobbles 2226, 2227, 2229 or 2230 along the track groove 1602 from the block mark 2220. The wobbles 2226, 2227, 2229 and 2230 have different prescribed shapes from each other, and represent sub information ("0", "1", "S" or "B"). One type of sub information ("0", "1", "S" or "B") is represented by one shape of wobbles 2226, 2227, 2229 or 2230. The type of sub information and the shape of wobbles (wobbles 2226, 2227, 2229 or 2230) are in a one-to-one relationship. More specifically, the wobbles 2226, 2227 and 2228 all have a generally sawtooth shape, and the wobble 2230 has a sine wave shape. The wobbles 2226, 2227, 2228 and 2230 have different rising shapes (or rising gradient) and falling shapes (falling gradients). The wobbles 2226, 2227, 2229 or 2230 are formed in accordance with the type of sub information ("0", "1", "S" or "B").

The difference in the rising gradient and the falling gradient among the wobbles 2226, 2227, 2229 and 2230 can be easily detected by a differential push-pull detection signal as follows. A scanning laser beam is directed to the track groove 1602, and a differential signal indicating the difference between the light amounts received by detection areas of a light receiving element divided along a direction perpendicular to the track groove 1602 (a radial direction) of the optical disc medium 20 (i.e., a push-pull signal) is generated. Thus, a detection signal having a rising gradient and a falling gradient which vary in accordance with whether the sub information is "0", "1", "S" or "B" is obtained. This difference in the rising gradient and the falling gradient can be easily identified by, for example, differentiating the detection signal.

Thus, the type of the sub information can be detected by the size of the value obtained as a result of differentiation. When differentiation is used, however, a noise component is naturally increased. In an optical disc medium having an inferior S/N ratio, a detection error is reasonably expected. In this example, each pattern of the wobbles 2226, 2227, 2229 and 2230 is repeated a plurality of times in order to enhance the reliability of detection.

The contents of the PID sections will be described. Each PID section includes 52 frames each having 372 bytes, and thus has a length of 19344 bytes (=372 bytes×52). The PID section 2202 (PID0) includes 8-bit PID information 2209, 24-bit block address information 2210, 16-bit IED information 2211, and a 4-bit address mark (AM) 2212.

The PID information 2209 represents the number of the corresponding PID section (i.e., whether the PID section is PID0, PID1, PID2 or PID3). The block address information 2210 is address information assigned to each block, and is common among PID0 through PID3 of the same ECC block. The IED information 2211 is an ID error detection code generated from the PID information 2209 and the block address information 2210.

The address mark 2212 is located at a trailing end of the PID section 2202 (trailing end) and is used for detecting a leading end of the PID section 2204, which is immediately subsequent to the PID section 2202. The address mark 2211 includes sub information "B" using sine wave-shaped wobbles such as, for example the wobbles 2230 in the frame 2225 in addition to the sub information "1", "0", or "S". The address mark 2212 is represented by combining the sub information "S" recorded by the wobbles 2229 in the frame 2224 and the sub information "B". For example, the address mark 2212 has 4-bit information "SBBS". When this pattern is detected, detection of the following annex section or PID section is prepared for.

Since the sub information "B" is used only for the address mark, the address mark is easily be distinguishable from the sections having other information. Thus, the detection precision of the address mark can be enhanced.

Figure 17:
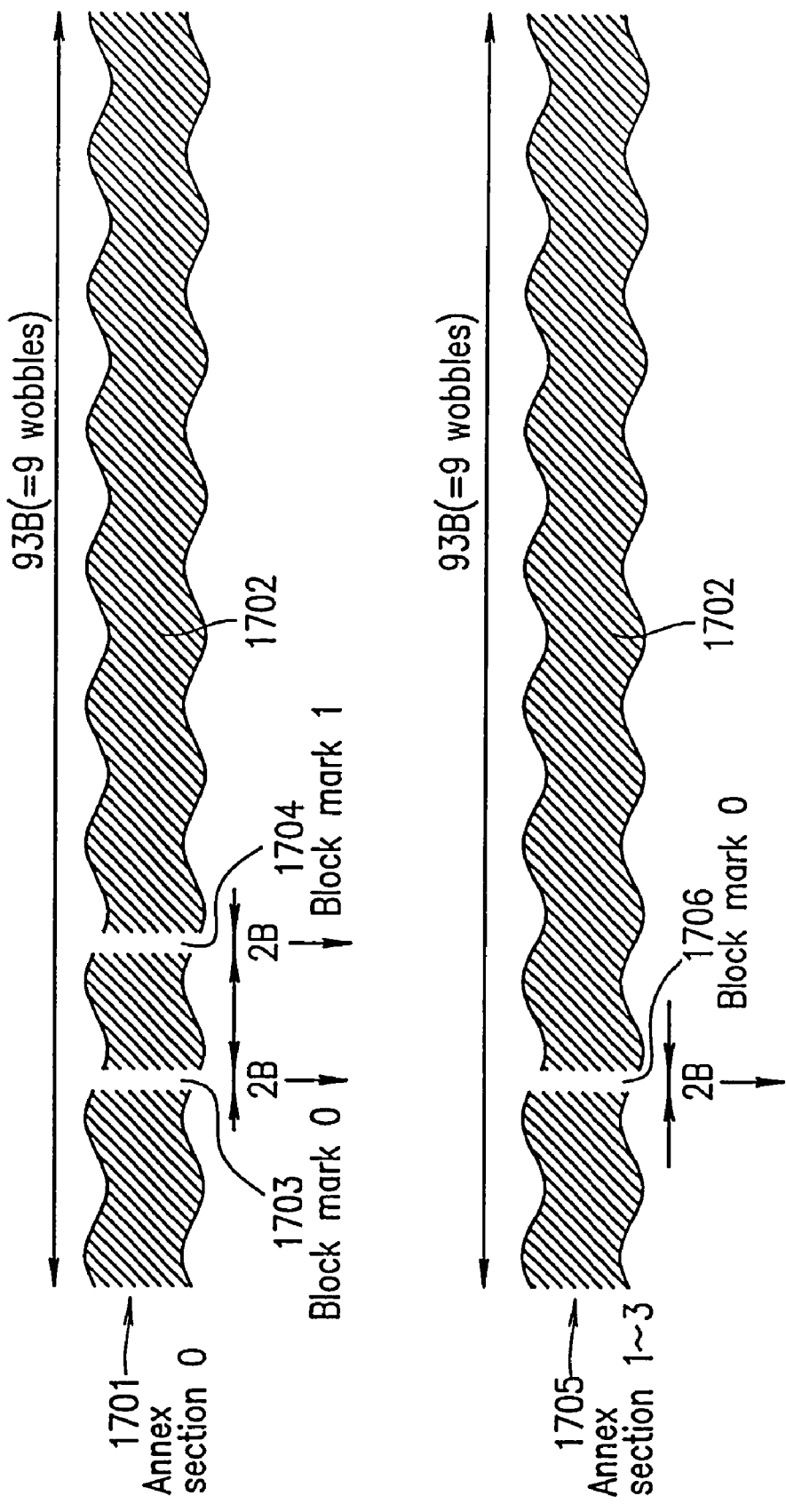
FIG. 17 shows a track groove in an optical disc medium in Example 12 according to the present invention.

The contents of the annex sections will be described. Unlike the PID sections, each annex section has the block mark 2220 recorded on the disc in advance. The block mark 2220 is, for example, a mirror mark which is a cut-off portion in the track groove 1602 as shown in FIG. 17 described below. The annex section 2201 precedes the PID section 2202 (PID0) and is also a leading end of the ECC block.

Annex sections 0 through 3 are provided in advance before PID0 through PID3, respectively, and each have a length of 93 bytes. The block mark (mirror mark) 2220 has a length of about 2 bytes. In each annex section, dummy data can be recorded in order to enhance the detecting precision of the block mark 2220.

Usable dummy data can be, for example, information including 4T marks and 4T spaces simply in repetition. Thus, the recording mark of the single frequency component and the block mark can be frequency-separated for easier detection. Thus, the block mark can be more easily detected.

As described above, one ECC block is divided into four PID sections, and each PID section is preceded by an annex section. In each annex section, a block mark indicating a leading end of the PID section is formed. Such PID sections are repeated in the ECC block. Since the block ID is finally determined by reading only ¼ of the ECC block, post-processing (data read, data recording, etc.) can be performed quickly.

Since the block ID is repeated a plurality of times in the ECC block, the reading reliability of the block ID can be enhanced.

In this example, one ECC block is divided into four PID sections. The present invention is not limited to such a number of PID sections. One ECC block can be divided into an arbitrary integral number of PID sections.

In this example, the sub information is recorded after being modulated into sawtooth-shaped wobbles. The present invention is not limited to such a shape of wobbles. The sub information can be recorded after being modulated into wobbles having a shape, for example, shown in FIG. 4 or 7.

In this example, the block mark is a cut-off portion of the track groove. The present invention is not limited to such a form of block mark. For example, the block mark can be modulated into wobbles having a shape, for example, shown in FIG. 5 or 6. Alternatively, the block mark can be modulated into wobbles having a shape, for example, shown in FIG. 17, 18 or 19.

Example 12

FIG. 17 shows a track groove 1702 according to Example 12 of the present invention. The track groove 1702 is obtained by modifying the annex section of the track groove 1602 shown in FIG. 22.

In FIG. 17, reference numeral 1701 represents annex section 0, and 1705 represents each of annex sections 1 through 3. The track groove 1702 having a shape of a continuous plurality of sine wave-like wobbles is formed in the disc in advance, and each annex section has a length of 93 bytes. The annex section includes nine wobbles. Annex section 0 has block marks 1703 and 1704 each as a cut-off portion of the track groove 1702, and annex sections 1 through 3 each have a block mark 1706 as a cut-off portion of the track groove 1702.

As described in Example 11, annex sections 0 through 3 precede respective PID sections and can be a leading end of the address information. Therefore, it is demanded to provide a satisfactorily high level of reading reliability of annex sections 0 through 3. In the case where the block mark is repeated a plurality of times (for example, twice) in the annex section; i.e., in the case where a plurality of same block marks are provided in the annex section; the block mark can be detected with a high level of reliability even when one of the block marks cannot be detected by an external disturbance such as, for example, noise or a defect. In the case where the block mark is repeated a plurality of times with a certain interval, the correct block mark can be easily distinguishable from a pseudo block mark which is generated by noise, a defect or the like.

The number and shape of the block marks formed in annex sections 0 through 3 can be the same. For example, one block mark 1703 can be provided in each of annex sections 0 through 3. Alternatively, as shown in FIG. 17, the number and shape of the block marks formed in annex sections 0 through 3 can be different among annex sections 0 through 3. For example, the number of the block marks in annex section 0 can be different from that in annex sections 1 through 3. In this case, a larger number of block marks are provided in annex section 0 than in the other annex sections in order to enhance the reading reliability of annex section 0 acting as the leading end of the ECC block. In FIG. 17, two block marks 1703 and 1704 are provided in annex section 0, whereas one block mark 1706 is provided in each of annex sections 1 through 3. When the number or shape of the block marks formed in annex section 0 is different from that of annex sections 1 through 3, the block mark in annex section 0 can be easily distinguishable from the block mark of the other annex sections. Thus, the leading address of the ECC block can be finally determined without reading the entirety of the PID sections.

Figure 18:
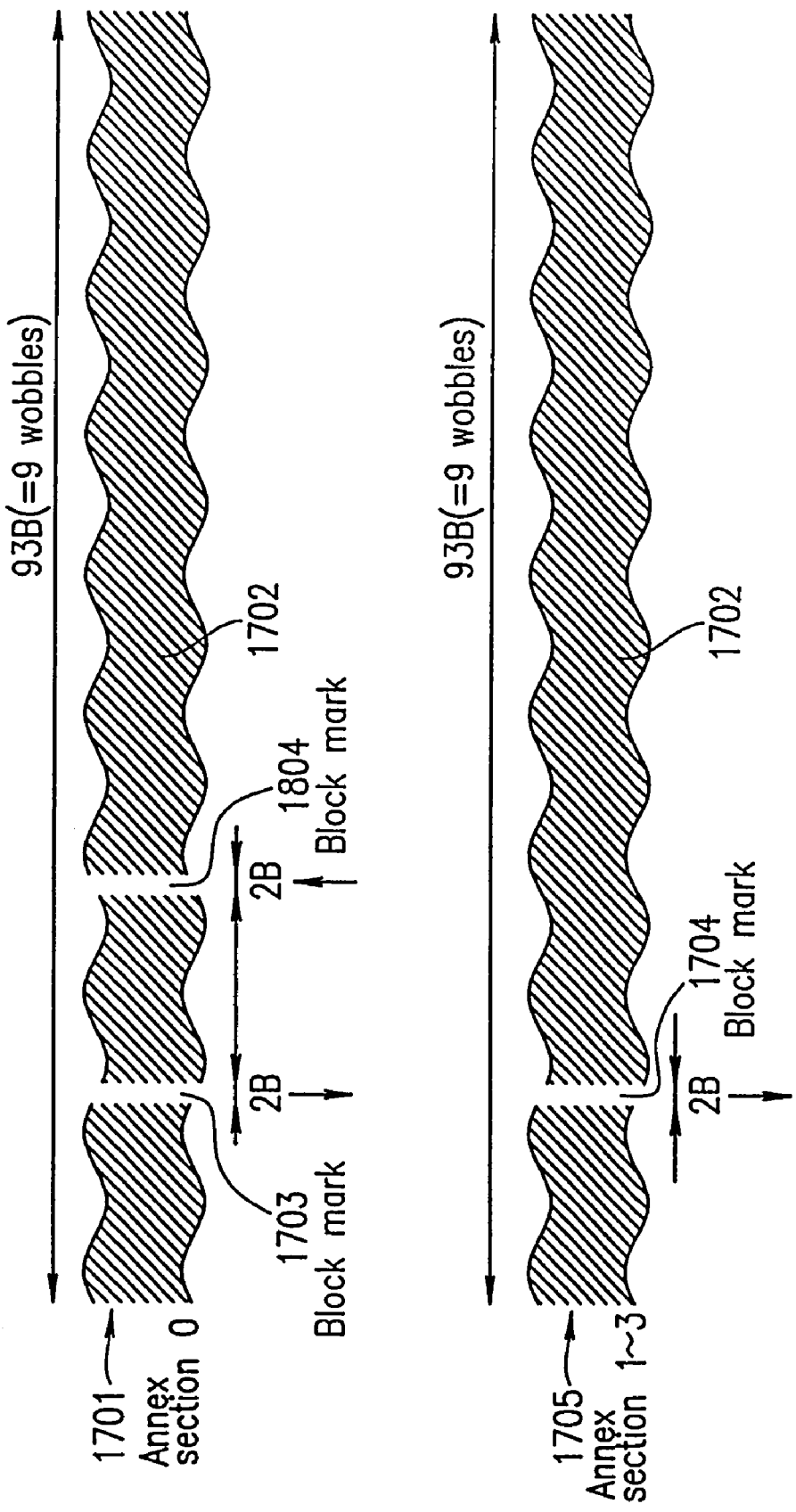
FIG. 18 shows a track groove in an optical disc medium in Example 12 according to the present invention.

In FIG. 17, the plurality of block marks are provided at the same position in terms of the phase of the wobbles. Alternatively, as shown in FIG. 18, the block marks can be provided at positions having a 180 degree phase difference of the wobbles (block marks 1703 and 1804).

In this example, each block mark has a physical length of 2 bytes, but the present invention is not limited to such a length. An optimum design length which is determined based on the diameter of the optical spot can be selected. For example, as shown in FIG. 19, the block mark can have a physical length of 4 bytes.

Figure 19:
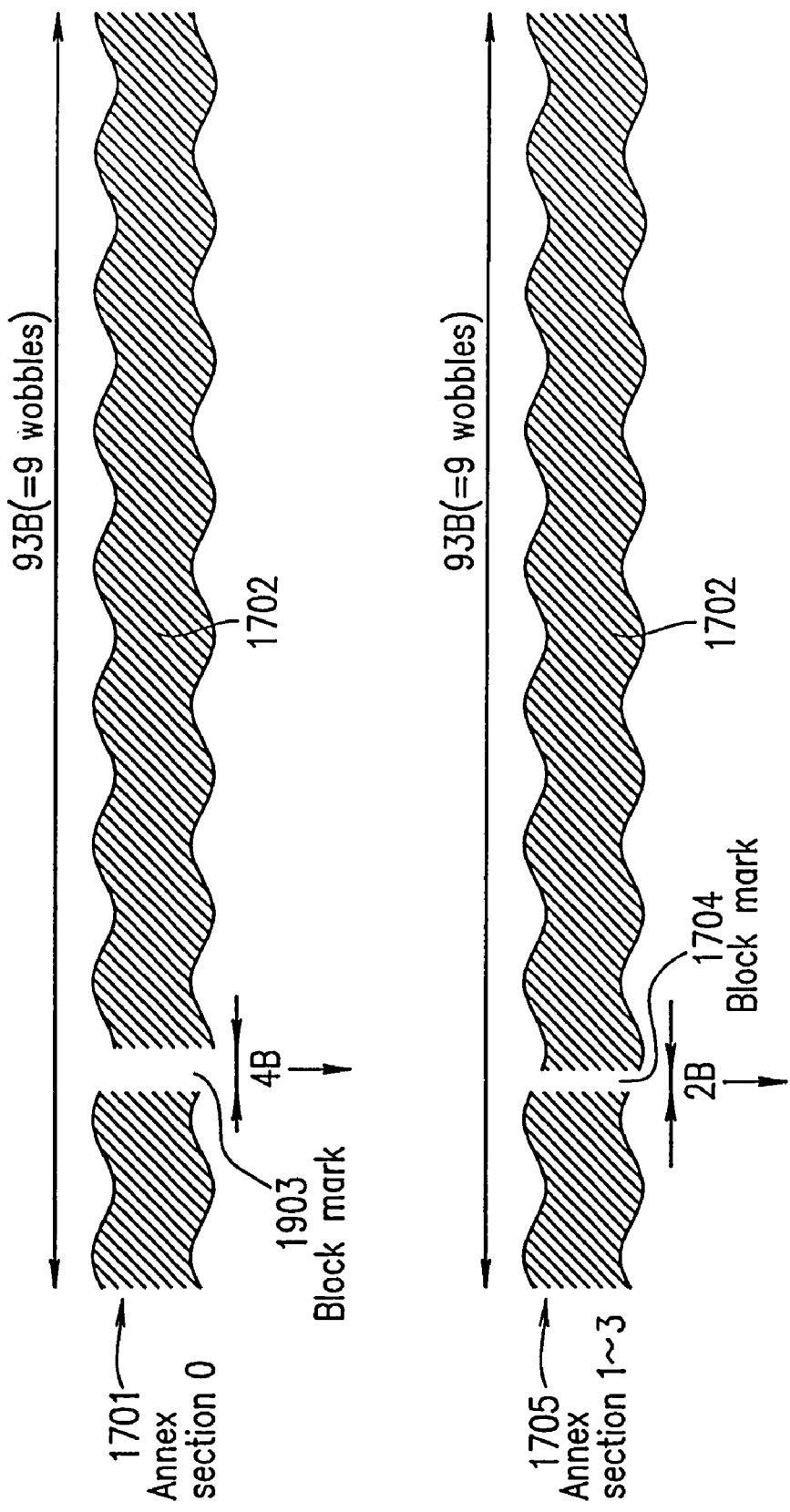
FIG. 19 shows a track groove in an optical disc medium in Example 12 according to the present invention.

When the block mark can have a physical length of 4 bytes as shown in FIG. 19, the physical length of the block mark in annex section 0 can be different from that in annex sections 1 through 3. Thus, the reading reliability of the block mark in annex section 0 can be enhanced. When the length of the block mark formed in annex section 0 is different from that of annex sections 1 through 3, the block mark in annex section 0 can be easily distinguishable from the block mark of the other annex sections.

Figure 20:
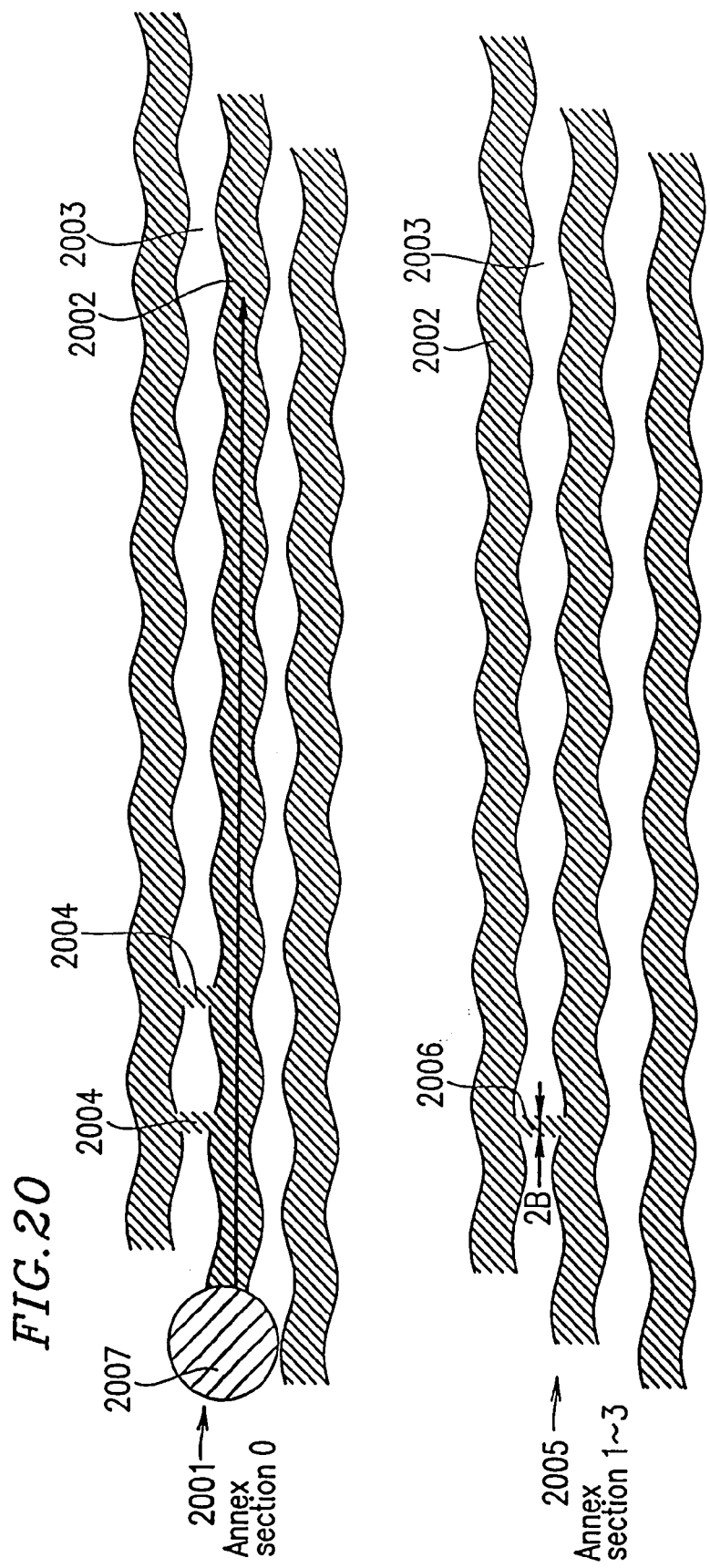
FIG. 20 shows a track groove in an optical disc medium in Example 12 according to the present invention.

With reference to FIG. 20, an optical disc medium in which block marks are pre-pits formed in a land will be described. FIG. 20 shows a track groove 2002 in such an optical disc medium. The track groove 2002 is obtained by modifying the annex section of the track groove 1602 shown in FIG. 22. In FIG. 20, reference numeral 2001 represents annex section 0, and 2005 represents each of annex sections 1 through 3. Block marks 2004 are formed in a land 2003 between adjacent portions of the track groove 2002 of annex section 0. The block marks 2004 are cut-off portions in the land 2003. When the track groove 2002 is scanned by an optical spot 2007, the block marks 2004 are scanned in the state of being offset from the center of the optical spot 2007 by a half track.

The block marks 2004 formed on the land 2003 as shown in FIG. 20 can be detected using a differential signal indicating the difference between the light amounts received by two divided detection areas of a light receiving element (e.g., a push-pull signal). The PID sections described above are detected using such a differential signal. The block address can be detected using a similar differential signal. Therefore, the block address and the PID sections can be detected without switching the differential signal into a sum signal. Thus, a signal detection section can have a simpler circuit configuration.

In the case where a plurality of same block marks are provided in one annex section like the block marks 2004 in FIG. 20, the number of block marks can be different between in annex section 0 and in annex sections 1 through 3.

For example, when annex section 0 includes two block marks 2204 and annex sections 1 through 3 each have one block mark 2204, the reading reliability of the block mark in annex section 0 can be enhanced. When the number of the block marks formed in annex section 0 is different from that of annex sections 1 through 3, the block mark in annex section 0 can be easily distinguishable from the block mark of the other annex sections.

In each annex section, dummy data can be recorded in order to enhance the detecting precision of the block mark.

Usable dummy data can be, for example, information including 4T marks and 4T spaces simply in repetition. Thus, the recording mark of the single frequency component and the block mark can be frequency-separated for easier detection. Thus, the block mark can be more easily detected.

Example 13

Figure 21:
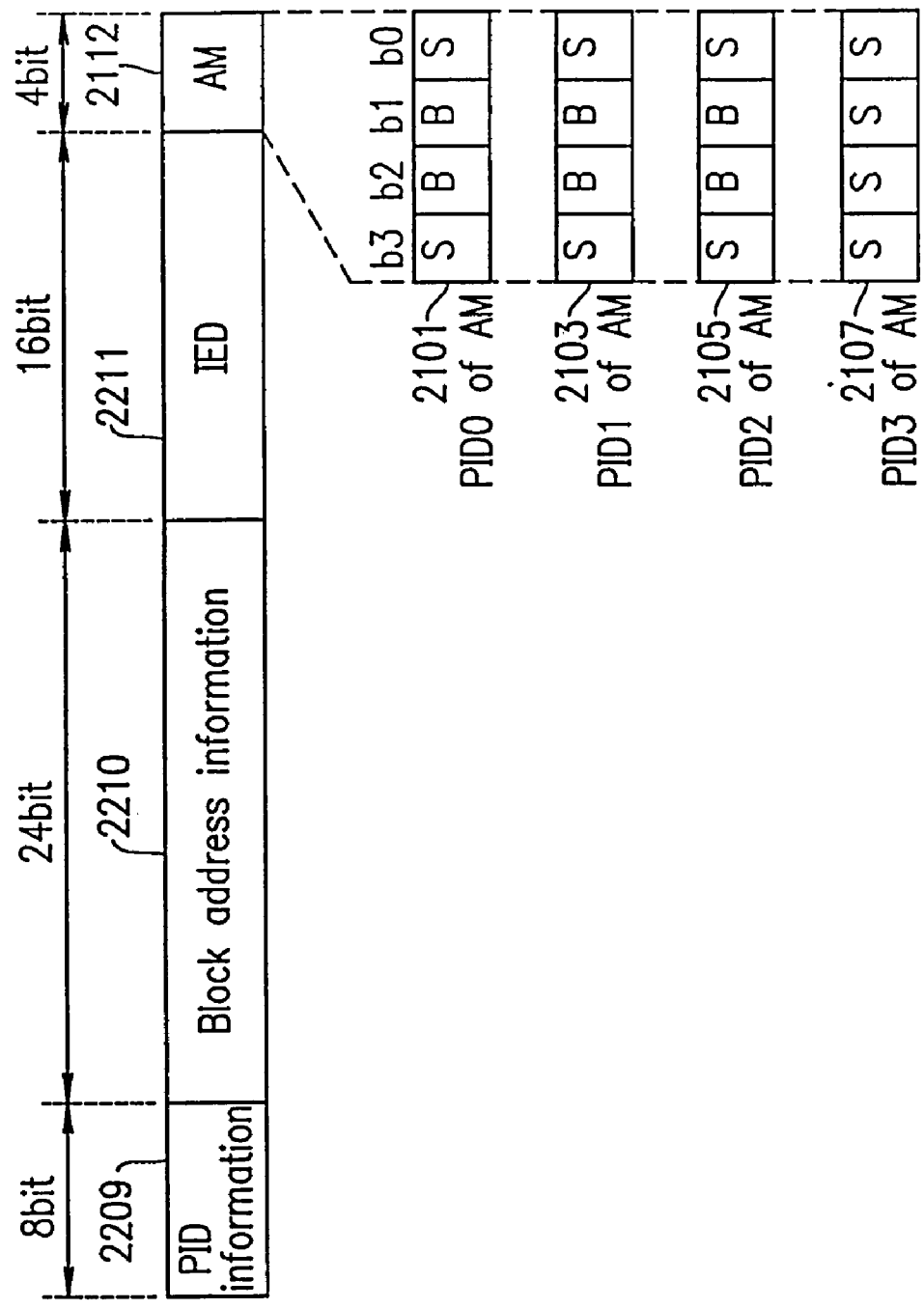
FIG. 21 shows an address structure of the optical disc medium in Example 13 according to the present invention.

FIG. 21 shows a PID section 2100 of an optical disc medium according to Example 13 of the present invention. The PID section 2100 is obtained by modifying the PID0 through PID3 shown in FIG. 22. The PID section 2100 includes 52 frames each having 372 bytes, and thus has a length of 19344 bytes (=372 bytes×52). The PID section 2100 includes 8-bit PID information 2209, 24-bit block address information 2210, 16-bit IED information 2211, and a 4-bit address mark (AM) 2212 as an identification mark. The PID information 2209, the block address information 2210 and the IED information 2211 are similar to those of Example 11.

The address mark 2211 is located at a trailing end of the PID section 2100 and is used for detecting a leading end of the PID section which is immediately subsequent to the PID section 2100. The address mark 2211 is a 4 information unit including sub information "B" in addition to the sub information "1", "0", or "S". The address mark 2211 is represented by combining the sub information "S" and the sub information "B". The address mark can be a different combination of sub information in each PID section 2100. For example, as shown in FIG. 21, an address mark 2107 of PID3 includes 4-bit information "SSSS". When this combination is detected, it is identified that this is the address mark 2107 of PID3. Thus, detection of the identification mark in the annex section preceding the immediately subsequent PID0 or the address of PID0 can be prepared for.

An address mark 2101 of PID0, an address mark 2103 of PID1, and address mark 2105 of PID2 each include "SBBS", which is different from that of the address mark 2107 of PID3. Since the contents of the address mark of PID3 are different from those of the address marks of PID0 through PID2, the address mark of PID3 is easily distinguishable from the address mark of the other PID sections. Thus, the detection precision of the address mark of PID3 can be enhanced. Namely, the leading end of the block can be more easily detected by such a different combination of sub information.

The address marks of PID0 through PID2 can be formed of the same shape of wobbles (i.e., the same combination of sub information). For example, the address marks of PID0 through PID2 can all include "SBBS".

The address marks 2101, 2103, 2105 and 2107 shown in FIG. 21, which have information represented by the wobbles of the track groove, can be detected using a differential signal indicating the difference between the light amounts received by two divided detection areas of a light receiving element (e.g., a push-pull signal). The PID information 2209, the block address information 2210, and the IED information 2211 are detected using such a differential signal. The block address or the identification mark preceding each PID section can be detected using a similar differential signal. Therefore, the leading end of each PID section, the leading end of the block, and the block address can be detected without switching the differential signal into a sum signal and a differential signal. Thus, a signal detection section can have a simpler circuit configuration.

In order to enhance the detection precision of the address marks 2101, 2103, 2105 and 2107, dummy data can be recorded in portions of the track groove corresponding to the address marks.

Usable dummy data can be, for example, information including 4T marks and 4T spaces simply in repetition. Thus, the recording mark of the single frequency component and the block mark can be frequency-separated for easier detection. Thus, the block mark can be more easily detected. The address marks shown in FIG. 21 can be detected using the differential signal mentioned above. Therefore, the address marks can be detected by recording proper user data, instead of dummy data, in portions of the track groove corresponding to the address marks.

The identification mark in the annex section and the address mark can be used in combination. The identification mark in the annex section is, for example, a 2-byte mirror mark, and thus is provided at a significantly high level of positioning precision. Therefore, such a combined use can enhance the precision of the position at which recording is started at the time of linking for additional write or rewrite.

Example 14

Figure 23A:
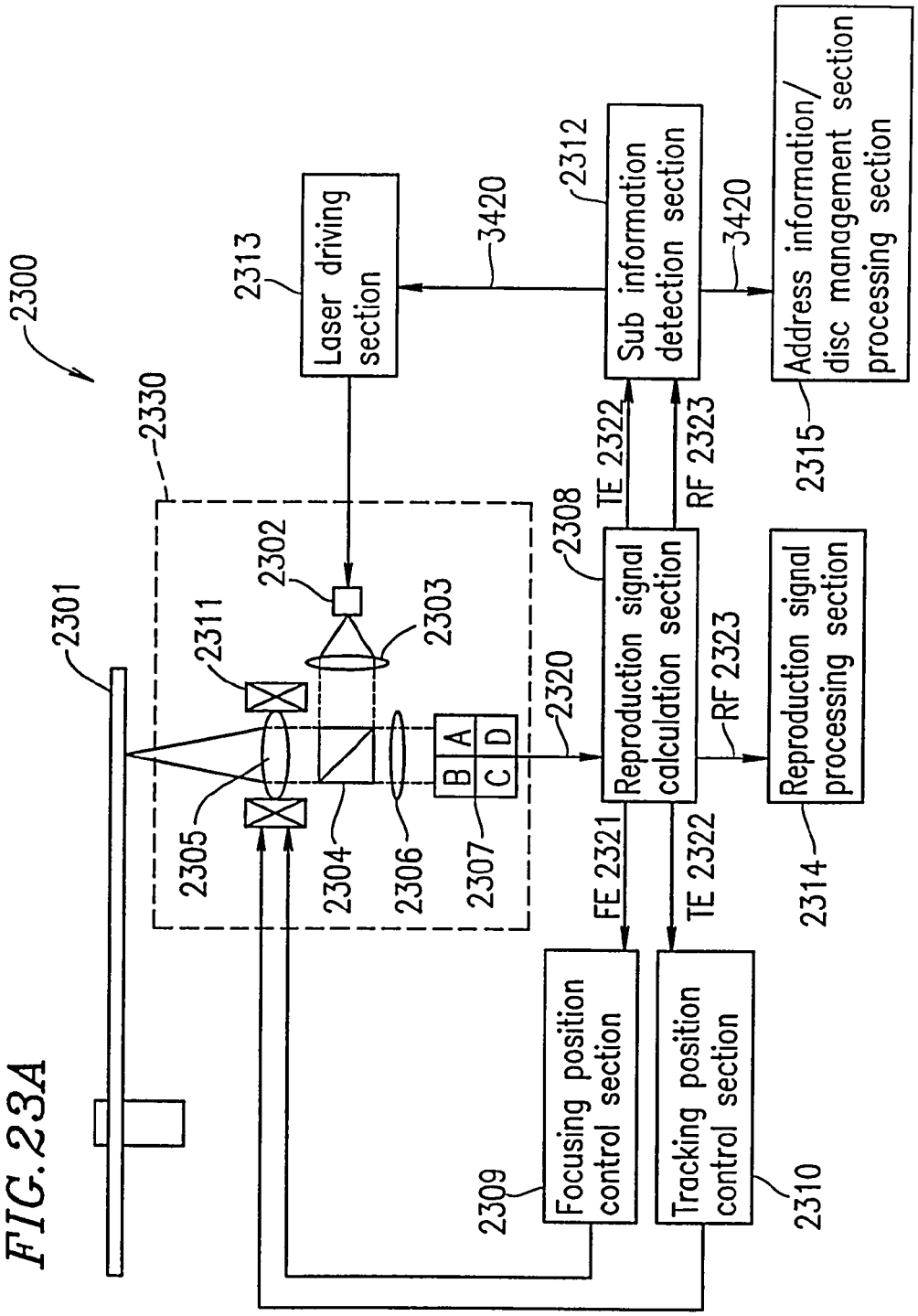
FIG. 23A shows a structure of an optical disc apparatus in Example 14 according to the present invention.

FIG. 23A shows an optical disc apparatus 2300 according to Example 14 of the present invention. The optical disc apparatus 2300 reproduces sub information which is recorded on the optical disc medium by a combination of a plurality of shapes of wobbles described in the preceding examples, so as to record and reproduce main information. FIG. 23 is a flowchart illustrating an operation of the optical disc apparatus 2300 shown in FIG. 23A.

The optical disc apparatus 2300 includes a conversion section 2330, a reproduction signal calculation section 2308, a focusing position control section 2309, a tracking position control section 2310, a sub information detection section 2312, a laser driving section 2313, a reproduction signal processing section 2314, and an address information/disc management information processing section 2315. The conversion section 2330 includes a semiconductor laser 2302, a collimator lens 2303, a beam splitter 2304, a converging section 2305, a light collection lens 2306, a light detection section 2307, and an actuator 2311. The optical disc apparatus 2300 directs a light beam toward an optical disc medium 2301 so as to read the main information and the sub information recorded on the optical disc medium 2301 and convert the main information and the sub information into a reproduction signal.

With reference to FIGS. 23A and 23B, the light beam emitted by the semiconductor laser 2302 is collected on an information face of the optical disc medium 2301 through the collimator lens 2303, the beam splitter 2304 and the light converging section 2305. The collected light is then reflected and diffracted by the optical disc medium 2301 and is collected on the light detection section 2307 through the light converging section 2305, the beam splitter 2304 and the light collection lens 2306. Light receiving elements A, B, C and D of the light detection section 2307 each output a voltage signal in accordance with an amount of received light as a reproduction signal 2320 (step S100).

The reproduction signal calculation section 2308 processes the reproduction signal 2320 with addition, subtraction, multiplication or division. An FE (focusing error) signal 2321 which is output from the reproduction signal calculation section 2308 as a result of such a calculation is sent to the focusing position control section 2309. A TE (tracking error) signal 2322 which is output from the reproduction signal calculation section 2308 as a result of such a calculation is sent to the tracking position control section 2310. An RF (radio frequency) signal 2323 which is output from the reproduction signal calculation section 2308 as a result of such a calculation is sent to the sub information detection section 2312 and the reproduction signal processing section 2314 (step S200).

The focusing position control section 2309 drives the actuator 2311 by a voltage output in accordance with the FE signal 2321 so as to control the focusing position of an optical spot on the information face of the optical disc medium 2301. The tracking position control section 2310 drives the actuator 2311 by a voltage output in accordance with the TE signal 2322 so as to control the tracking position of the optical spot on the information face of the optical disc medium 2301. The optical spot controlled in terms of the focusing position and the tracking position is used to read the pre-pits, or marks and spaces on the optical disc medium 2301. The marks and spaces in the optical disc medium 2301, which is of a phase difference type, reflect light at different reflectances. Thus, the information recorded on the optical disc medium 2301 is read. In the case of a push-pull system, the TE signal 2322 is an output of a difference between the amounts of light received by two light receiving sections of the light detection section 2307. The two light receiving sections each including two of the four light receiving elements A, B, C and D and are defined by a line parallel to the tracking direction. Here, the difference is (A+D)−(B+C). The RF signal 2323 is an output of a sum of the amounts of light received by the four light receiving elements A, B, C and D. Here, the sum is (A+B+C+D). In the case of an astigmatism system, the FE signal 2321 is an output of (A+C)−(B+D).

The sub information is reproduced in the following manner.

The TE signal 2322 and the RF signal 2323 generated by the reproduction signal calculation section 2308 are output to the sub information detection section 2312 and used for decoding the sub information. The sub information detected by the sub information detection section 2312 is output to the address information/disc management information processing section 2315 and the laser driving section 2313.

Figure 34:
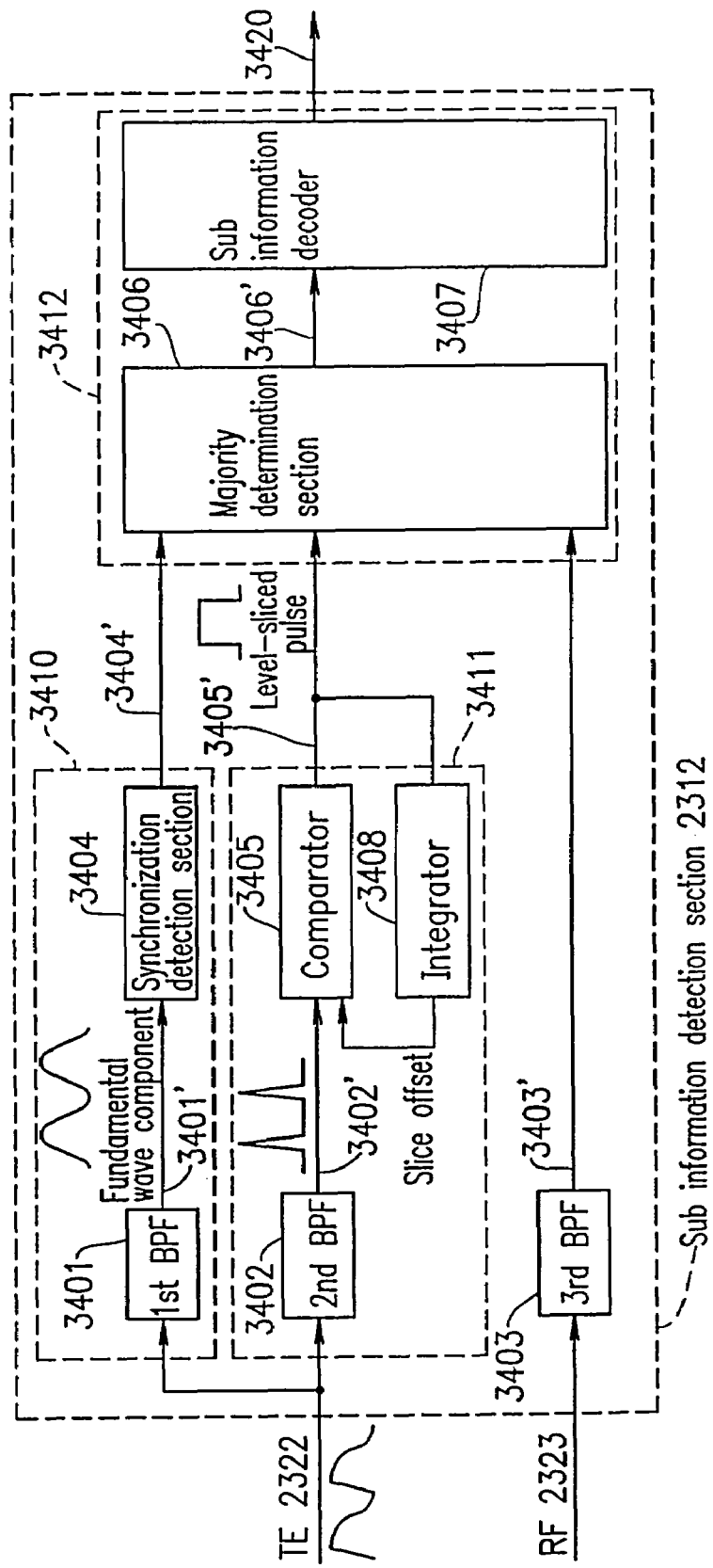
FIG. 34 shows an optical disc apparatus in Example 14 according to the present invention.

As shown in FIG. 34, the sub information detection section 2312 includes a reference clock generation section 3410, a level-sliced pulse signal generation section 3411, a third BPF (bandpass filter) 3403 as a block mark signal detection section, and a sub information generation section 3412.

The reference clock generation section 3410 includes a first BPF 3401 and a synchronization detection section 3404. The level-sliced pulse signal generation section 3411 includes a second BPF 3402, a comparator 3405 and an integrator 3408. The sub information generation section 3412 includes a majority determination section 3406 and a sub information decoder 3407.

The first BPF 3401 is designed to have such a filtering constant as to extract a wobble signal modulated into the TE signal 2322. Based on the TE signal 2322, the first BPF 3401 generates an output signal 3401' containing a fundamental wave component having a sine waveform synchronized with the wobbles in the track groove. The synchronization detection section 3404 receives the output signal 3401' and generates a reference clock signal 3404' in synchronization with the signal read from the optical disc medium 2301 (FIG. 23A) (step S300). The reference clock signal 3404' is used to synchronize the sub information signal.

The second BPF 3402 is a differential filter for detecting a steep edge of a sawtooth waveform which is modulated into the TE signal 2322. In accordance with the phase (or direction) of the steep edge, the second BPF 3402 generates an upward or downward differential pulse signal 3402'. The differential pulse signal 3402' is output to the comparator 3405. The comparator 3405 compares a regulated slice voltage fed-back through the integrator 3408 with the differential pulse signal 3402' and generates a level-sliced pulse signal 3405' with an upward state and a downward state of the differential pulse signal 3402' being "0" and "1" (step S400). The level-sliced pulse signal 3405' is output to the majority determination section 3406.

The third BPF 3403 filters the RF signal 2323 so as to detect a block mark signal 3403' and finally determine the leading end of the sub information group (step S500). The detected block mark signal 3403' is output to the majority determination section 3406, where the detected block mark signal 3403' is used for timing synchronization.

The majority determination section 3406 compares the number of "0" pulses and "1" pulses of the level-sliced pulse signal 3405' during a specified time interval, based on the synchronization signal generated from the reference clock signal 3404' and the block mark signal 3403'. Then, the majority determination section 3406 outputs the pulses which occupy the majority of all the pulses during the specified time interval to the sub information decoder 3407 as a level-sliced data signal 3406'. The sub information decoder 3407 checks whether there is an error in the level-sliced data signal 3406'. When there is no error in the level-sliced data signal 3406', the sub information decoder 3407 outputs the level-sliced data signal 3406' as a sub information signal 3420 (for example, address information) (step S600).

By the above procedure, the sub information signal 3420 recorded on the optical disc medium 2301 is reproduced. The optical disc apparatus 2300 can determine which block of information in the track groove is now being reproduced, based on the address information included in the reproduced sub information signal 3420. When recording the main information on the optical disc medium 2301, the address of the block which is immediately previous to the block in which the main information is to be recorded is determined, and then it is predicted that the next block is the block in which the main information is to be recorded. In this manner, the main information can be recorded from the leading end of the block of the targeted block.

Example 15

A lead-in area and a lead-out area of an optical disc medium according to Example 15 of the present invention will be described.

Figure 30:
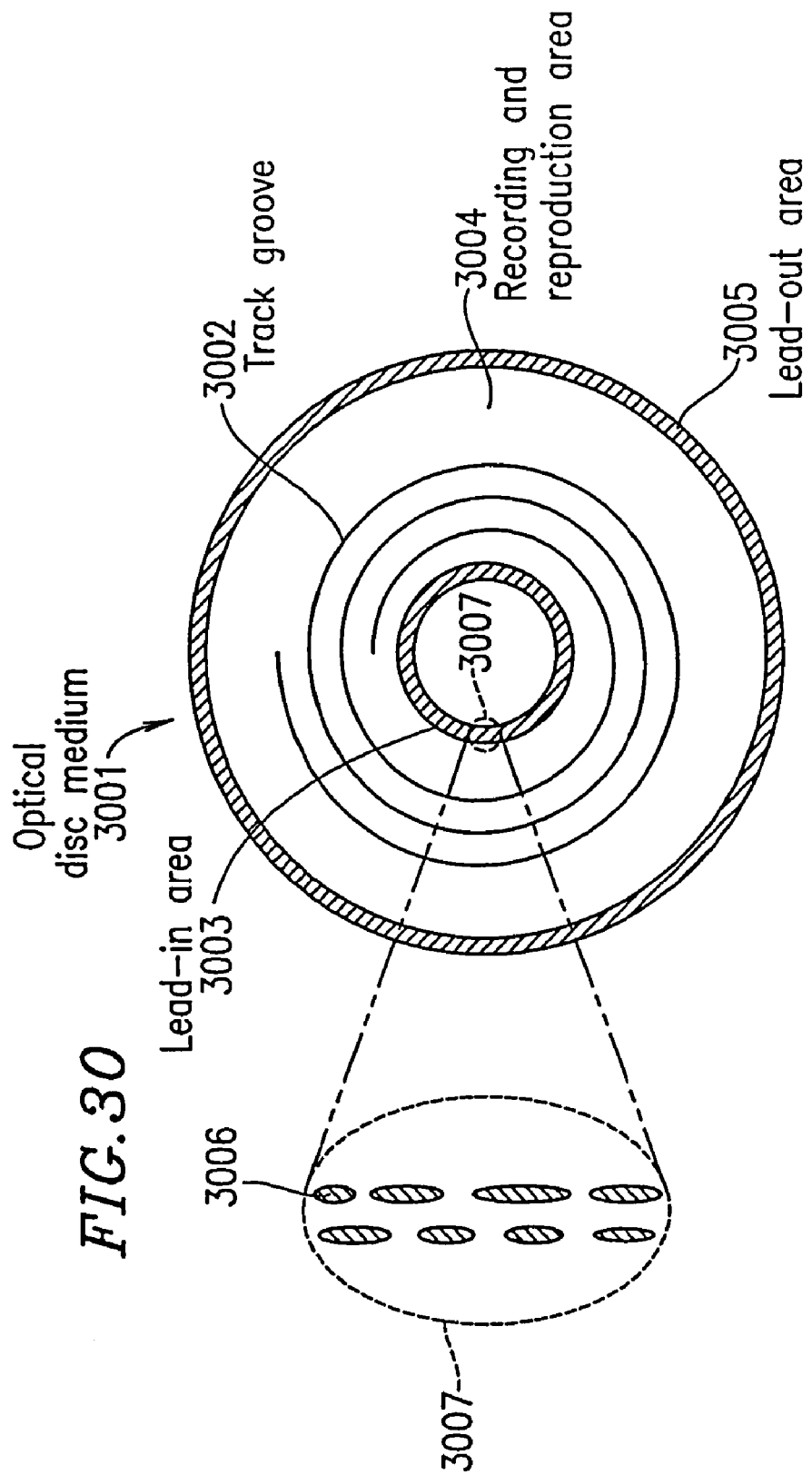
FIG. 30 shows a conventional optical disc medium.

With reference to FIG. 30, a lead-in area and a lead-out area of a conventional optical disc medium 3001 will be described. The optical disc medium 3001 includes a lead-in area 3003 provided in an inner peripheral area, a lead-out area 3004 provided in an outer peripheral area, and a recording and reproduction area provided between the lead-in area 3003 and the lead-out area 3004. In FIG. 30, a portion 3007 is enlarged. The lead-in area 3003 has pre-pits 3006 formed in advance. By reading the difference in the reflectance between the pre-pits and the remaining area, the information of "0" or "1" is read. The lead-in area 3003 has disc management information recorded in advance. The disc management information contains, for example, information on the disc reproduction power, servo information, information on the optimum recording power. The recording and reproduction area 3004 has a track groove 3002 formed in advance. By performing tracking control along the track groove 3002, rewritable data is recorded in the track groove 3002 or data recorded in the track groove 3002 is erased.

In the conventional optical disc medium 3001, the lead-in area 3003 and the lead-out area 3005 are different from the recording and reproduction area 3004 in terms of the shape of the pre-pits 3006 and the shape of the track groove 3002. Therefore, two tracking systems have to be used in a switching manner. More specifically, tracking of the differential phase system (DPD) is used for the lead-in area 3003 and the lead-out area 3005, and tracking of the push-pull system utilizing diffraction by the track groove 3002 is used for the recording and reproduction area 3004.

In Example 15 of the present invention, an optical disc medium for allowing the same tracking system to be used for the lead-in area, lead-out area, and the recording and reproduction area is provided. Such an optical disc medium can simplify the tracking operation.

Hereinafter, an optical disc medium according to Example 15 will be described.

Figure 24:
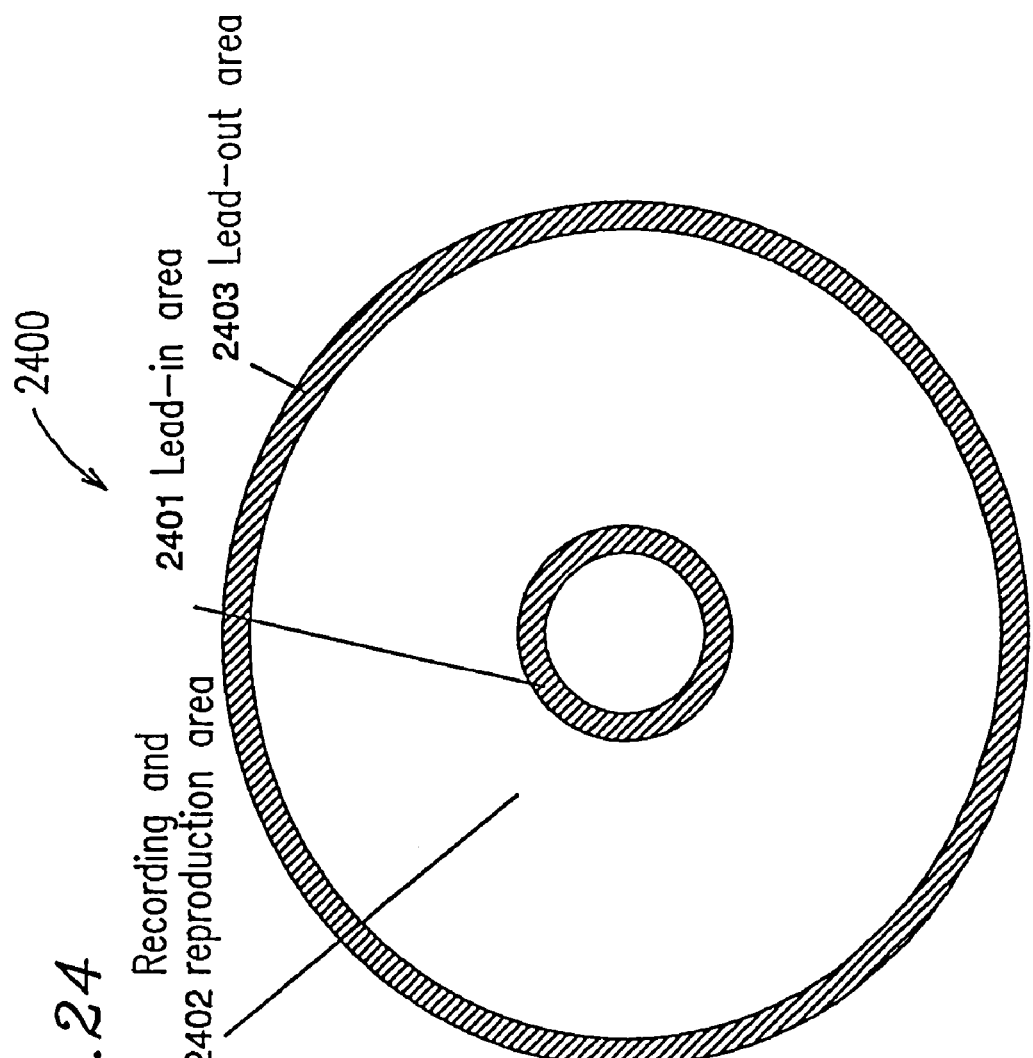
FIG. 24 shows an optical disc medium in Example 15 according to the present invention.

FIG. 24 shows an optical disc medium 2400 according to Example 15. The optical disc medium 2400 includes a lead-in area 2401, a recording and reproduction area 2402, and a lead-out area 2403. The lead-in area 2401 and the lead-out area 2403 have disc management information recorded in advance. Each of the lead-in area 2401 and the lead-out area 2403 can further have an area other than an area for recording the user data, i.e., an area for trial recording. In FIG. 24, the lead-in area 2401 can be provided in an area from an edge of a circle having a radius of 22.59 mm from the center of the optical disc medium 2400 to an edge of a circle having a radius of 24.02 mm from the center of the optical disc medium 2400. The lead-in area 2401 includes a disc management area (an area from an edge of a circle having a radius of 22.59 mm from the center to an edge of a circle having a radius of 24.000 mm from the center) having disc management information recorded in advance. The lead-in area 2401 can also include a rewritable area for trial recording on the optical disc medium or drive. The information in the disc management area is prohibited from being rewritten on principle. In this example, the lead-in area 2401 and the lead-out area 2403 mean the disc management area.

Figure 36:
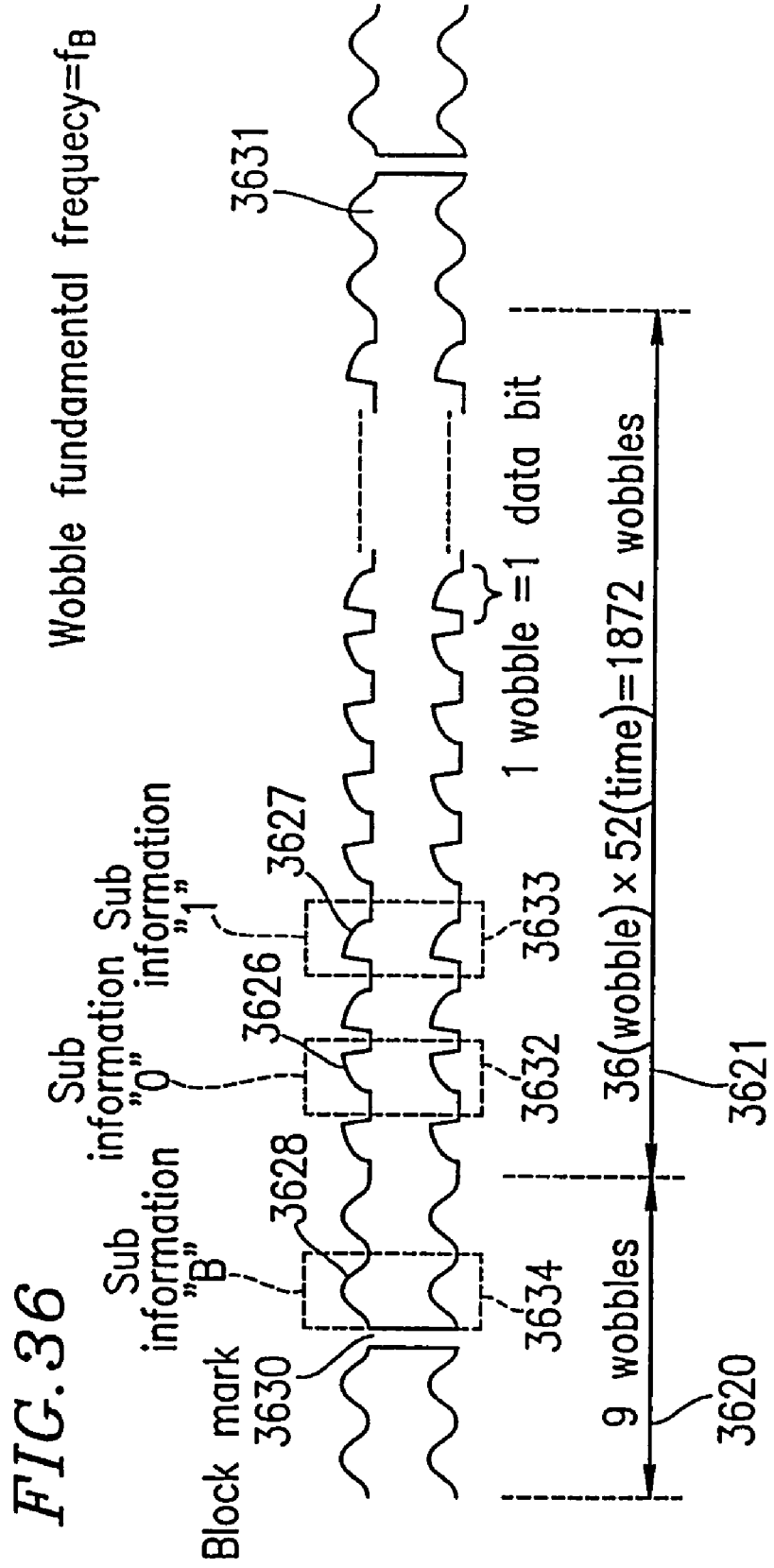
FIG. 36 shows a track groove in an optical disc medium in Example 15 according to the present invention.

With reference to FIG. 36, a track groove 3631 formed in a spiral manner in a recording face of the optical disc medium 2400 will be described. The track groove 3631 is formed in the lead-in area 2401 and the lead-out area 2403. The track groove 3631 is provided with prescribed shape of wobbles 3626, 3627 and 3628 in a periodical manner. The wobbles 3626, 3627 and 3628 have different prescribed shapes from each other, and represent sub information ("0", "1", "S" or "B"). One type of sub information ("0", "1", "S" or "B") is represented by one shape of wobbles 3626, 3627 or 3628. The type of sub information and the shape of wobbles (wobbles 3626, 3627 or 3628) are in a one-to-one relationship. More specifically, the wobbles 3626 and 3627 having a generally sawtooth shape and the wobbles 3628 having a generally sine wave shape have different rising shapes (or rising gradient) and falling shapes (falling gradients) as shown in FIG. 36. The disc management information is represented by a string of sub information shown by the combination of the wobbles 3626, 3627 and 3628.

The difference in the rising gradient and the falling gradient among the wobbles 3626, 3627 and 3628 can be easily detected by a differential push-pull detection signal as follows. A scanning laser beam is directed to the track groove 3631, and a differential signal indicating the difference between the light amounts received by detection areas of a light receiving element divided along a direction perpendicular to the track groove 3631 (a radial direction) of the optical disc medium 3400 (i.e., a push-pull signal) is generated. Thus, a detection signal having a rising gradient and a falling gradient which vary in accordance with whether the sub information is "0" or "1" is obtained. This difference in the rising gradient and the falling gradient can be easily identified by, for example, differentiating the detection signal. The type of the sub information can be detected by the size of the value obtained as a result of differentiation. In the lead-in area 2401 and the lead-out area 2403, the sub information is used as the disc management information for the recording and reproduction area 2402.

In FIG. 36, a frame 3620 including a block mark 3630 has nine wobbles 3628 formed in advance so as to indicate sub information "B". 52 frames 3621 following the block mark 3630 each have a total of 36 wobbles 3626 and 3627 so as to indicate sub information "0" and sub information "1". In the case of the optical disc medium 2400 in this example of the CLV format, the physical frequency at which the wobbles 3626 and 3627 are formed is constant at fb from the innermost track to the outermost track.

With reference to FIGS. 25A and 25B, the lead-in area 2401 and the lead-out area 2403 will be compared with the recording and reproduction area 2402.

FIG. 25A shows a track groove 2502 in the recording and reproduction area 2402. A frame 2510 including a block mark 2520 has nine wobbles 2528 (sine wave shape) formed in advance so as to indicate sub information "B". 52 frames 2511 following the block mark 2520 each have a total of 36 wobbles 2526 and 2527 (sawtooth shape) so as to indicate sub information "0" and sub information "1". In the case of the optical disc medium 2400 in this example of the CLV format, the physical frequency at which the wobbles 2526, 2527 and 2528 are formed is constant at fa from the innermost track to the outermost track (1 wobble: 124 channel bit). The wobbling amount of the wobble is constant at 22.5 nmpp.

In the recording and reproduction area 2402, the recording mark is recorded after being modulated. In this example, a 46D-modulated signal which is run-length restricted to be 2T (minimum length) is recorded in the track groove 2502. The channel bit length at this point is 0.0771 μm. The laser light used for recording and reproducing the signal has a mean value of the wavelength of 405 nm (+10 nm, −5 nm), and a numerical aperture (NA) of 0.85±0.01.

FIG. 25B shows the track groove 3631 in the lead-in area 2401 and the lead-out area 2403. The details of the track groove 3631 are as described above with reference to FIG. 36. The physical frequency fb at which the wobbles 3626, 3627 and 3628 in the lead-in area 2401 and the lead-out area 2403 are formed is ten times higher than the frequency fa at which the wobbles 2526, 2527 and 2528 in the recording and reproduction area 2402 are formed. By setting the frequency of the wobbles higher, the amount of information included in a unit area can be increased.

In the lead-in area 2401 and the lead-out area 2403, a plurality of wobbles indicate 1-bit sub information. Between the lead-in area 2401 and the lead-out area 2403, and the recording and reproduction area 2402, the number of wobbles indicating 1-bit information which is the minimum unit of sub information can be different. By reducing the number of wobbles indicating 1-bit information in the lead-in area 2401 and the lead-out area 2403 as compared to that of the recording and reproduction area 2402, the wobbles indicating the disc management information can be efficiently formed in relatively small areas of the lead-in area 2401 and the lead-out area 2403.

As described above, the lead-in area 2401 and the lead-out area 2403 includes the track groove 3631 having prescribed shapes of wobbles formed in a periodical manner, and each shape of the wobbles in the track groove 3631 represents the disc management information. Since the wobbles are also formed in a periodical manner in the track groove 2502 included in the recording and reproduction area 2402, tracking of the same system can be used for the entirety of the optical disc medium 2400. Since the frequency of the wobbles in the lead-in area 2401 and the lead-out area 2403 is ten times higher than that of the recording and reproduction area 2402 and one wobble indicates 1-bit sub information, the amount of information recorded in a unit area is increased. Thus, the wobbles indicating the disc management information can be efficiently recorded in the limited areas of the lead-in area 2401 and the lead-out area 2403.

In this example, the frequency of the wobbles in the lead-in area 2401 and the lead-out area 2403 is ten times higher than that of the recording and reproduction area 2402, the present invention is not limited to such a numerical value.

In this example, sawtooth-shaped wobbles are described. The wobbles are not limited to such a shape according to the present invention.

In this example, one wobble indicates 1-bit information. A plurality of wobbles can indicate 1-bit information.

Figure 26A:
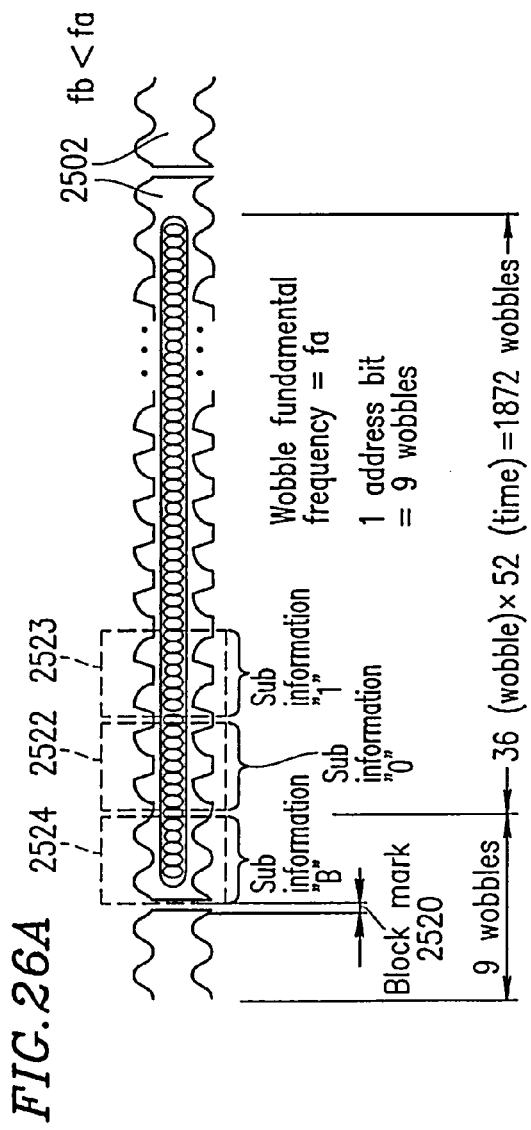
FIG. 26A shows a track groove in an optical disc medium in Example 15 according to the present invention.
Figure 26B:
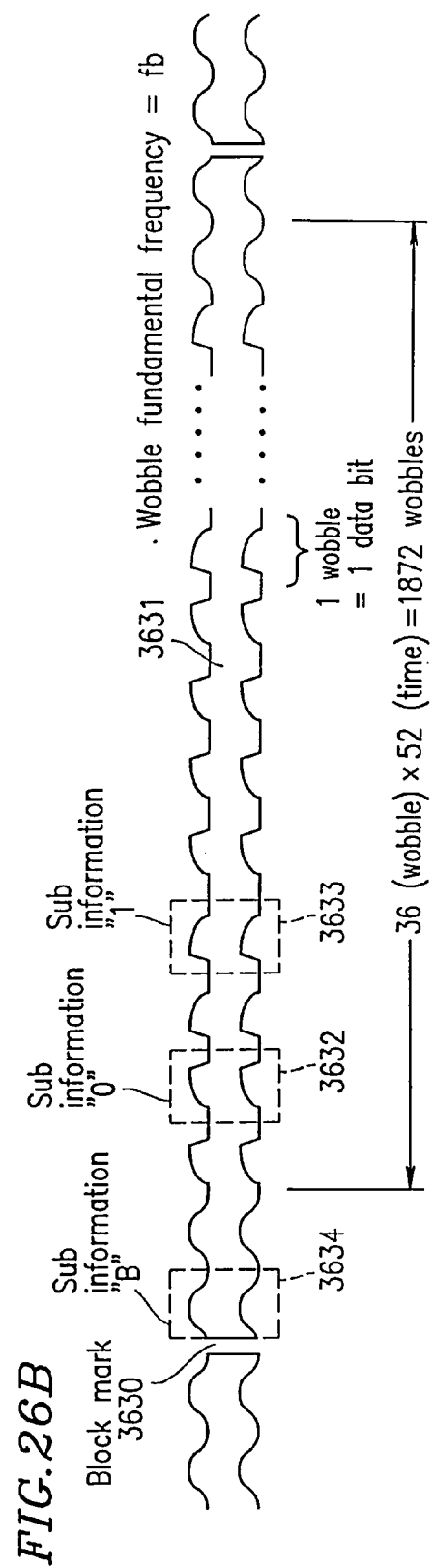
FIG. 26B shows a track groove in an optical disc medium in Example 15 according to the present invention.

Alternatively, as shown in FIGS. 26A and 26B, the frequency fb of the wobbles in the lead-in area 2401 and the lead-out area 2403 can be lower than the frequency fa of the wobbles in the recording and reproduction area 2402. In this way, the S/N ratio when detecting the wobbles in the lead-in area 2401 and the lead-out area 2403 can be increased. Thus, the reliability of the disc management information in the lead-in area 2401 and the lead-out area 2403 can be enhanced.

In this example, the wobbles in the lead-in area 2401 and the lead-out area 2403 are of the same frequency, which is different from the frequency of the wobbles in the recording and reproduction area 2402. In the case where the disc management information is recorded only in the lead-in area 2401, the frequency of wobbles only in the lead-in area 2401 can be different from that of the recording and reproduction area 2402.

In this example, the optical disc medium 2400 includes the lead-in area 2401 and the lead-out area 2403. The optical disc medium 2400 can include only the lead-in area 2401 or only the lead-out area 2403, in addition to the recording and reproduction area 2402.

Example 16

FIGS. 27A and 27B show track grooves 2502 and 2731 of an optical disc medium according to Example 16 of the present invention.

The track groove 2502 shown in FIG. 27A is the same as the track groove 2502 described above with reference to FIG. 25A and is formed in the recording and reproduction area 2402 of the optical disc medium 2400 shown in FIG. 24. The track groove 2731 shown in FIG. 27B can be formed in the lead-in area 2401 and the lead-out area 2403.

The frame 2510 including the block mark 2520 has nine sine wave-shaped wobbles 2528' so as to indicate sub information "B". 52 frames 2511 following the block mark 2520 each have a total of 36 sawtooth-shaped wobbles 2526' and 2527' so as to indicate sub information "0" and sub information "1". In the case of the optical disc medium 2400 in this example of the CLV format, the physical frequency at which the wobbles 2526, 2527 and 2528 are formed is constant at fa from the innermost track to the outermost track (1 wobble: 124 channel bit). The wobble amplitude representing the wobbling amount of the wobble is constant at Ca.

The track grooves shown in FIGS. 27A and 27B are different in the wobble amplitude, which represents the wobbling amount of the wobbles, from those shown in FIGS. 25A and 25B. Whereas the wobble amplitude of the track groove 2502 in the recording and reproduction area 2402 in FIG. 27A is Ca, the wobble amplitude of the track groove 2731 in the lead-in area 2401 and the lead-out area 2403 in FIG. 27B is Cb, where Cb>Ca.

The wobble signal amplitude at the time of reproduction is in proportion to the wobbling amount. Therefore, when the wobble amplitude of the lead-in area 2401 and the lead-out area 2403 is larger than the wobble amplitude of the recording and reproduction area 2402, the S/N ratio when detecting the wobbles at the time of reproduction is improved. Thus, the reading reliability of the disc management information can be enhanced.

In this example, the optical disc medium 2400 includes the lead-in area 2401 and the lead-out area 2403. The optical disc medium 2400 can include only the lead-in area 2401 or only the lead-out area 2403, in addition to the recording and reproduction area 2402.

Example 17

Figure 28A:
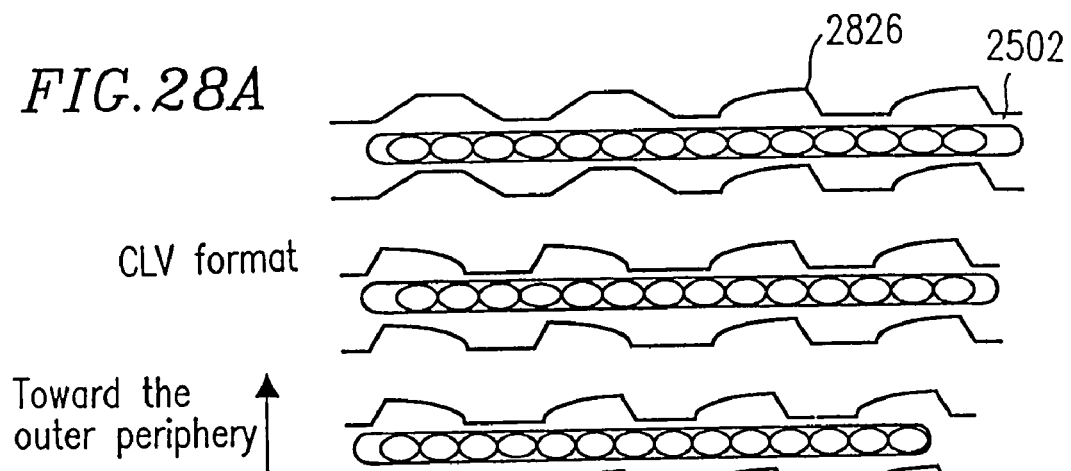
FIG. 28A shows a track groove in an optical disc medium in Example 17 according to the present invention.
Figure 28B:
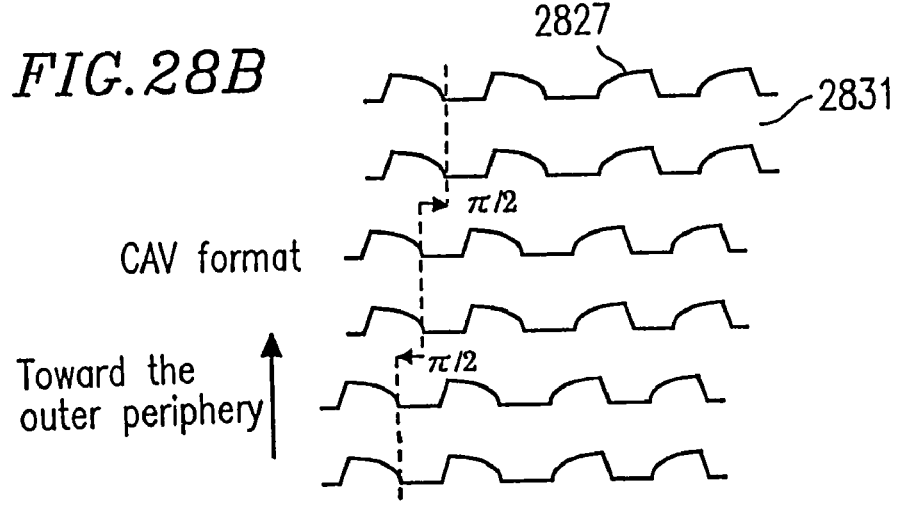
FIG. 28B shows a track groove in an optical disc medium in Example 17 according to the present invention.

FIGS. 28A and 28B show track grooves 2502 and 2831 of an optical disc medium according to Example 17 of the present invention.

In FIG. 28A, wobbles 2826 are formed by the CLV format, and the physical frequency of the wobbles 2826 are constant from the innermost track to the outermost track. Therefore, the phases of two adjacent wobbles 2826 are shifted in accordance with the track position and the radial position. At the time of reproduction, the influence of the interference by the adjacent track is made conspicuous by the phase difference, and the wobble signal amplitude detected by the reproduction signal varies in a periodical manner by the phase difference. In a wobble in which the varying wobble signal amplitude is minimum, the S/N ratio is reduced.

The track grooves shown in FIGS. 28A and 28B are different from those shown in FIGS. 25A and 25B in the following point. In the track grooves 2831, the wobbles 2827 are formed by the CAV format and thus the phase difference of the wobbles 2827 between two adjacent tracks is always π/2.

When the wobbles in the recording and reproduction area 2402, the lead-in area 2401 and the lead-out area 2403 are formed by the CAV format, the wobble signal amplitude at the time of reproduction is constant. Thus, the detection reliability of the wobbles can be enhanced.

In this example, the phase difference is π/2. Wobbles usually have a steep edge at the position of phase 0 at rising and at the position of phase π at falling. When the steep edges are made at the positions of π/2 and 3×π/2 with π/2× (2n+1) (n is an integer), the influence of the crosstalk from the adjacent track can be reduced. The phase difference is not limited to such values but can be any other constant value.

The wobbles in the recording and reproduction area 2402, the lead-in area 2401 and the lead-out area 2403 can be formed by the ZCLV format used in the DVD-RAM instead of the CAV format.

By forming the wobbles by the CAV format or the ZCLV format, instead of the CLV format, the reliability of the address information reproduced from the recording and reproduction area 2402 can be enhanced.

In this example, the optical disc medium 2400 includes the lead-in area 2401 and the lead-out area 2403. The optical disc medium 2400 can include only the lead-in area 2401 or only the lead-out area 2403, in addition to the recording and reproduction area 2402.

Example 18

Figure 29A:
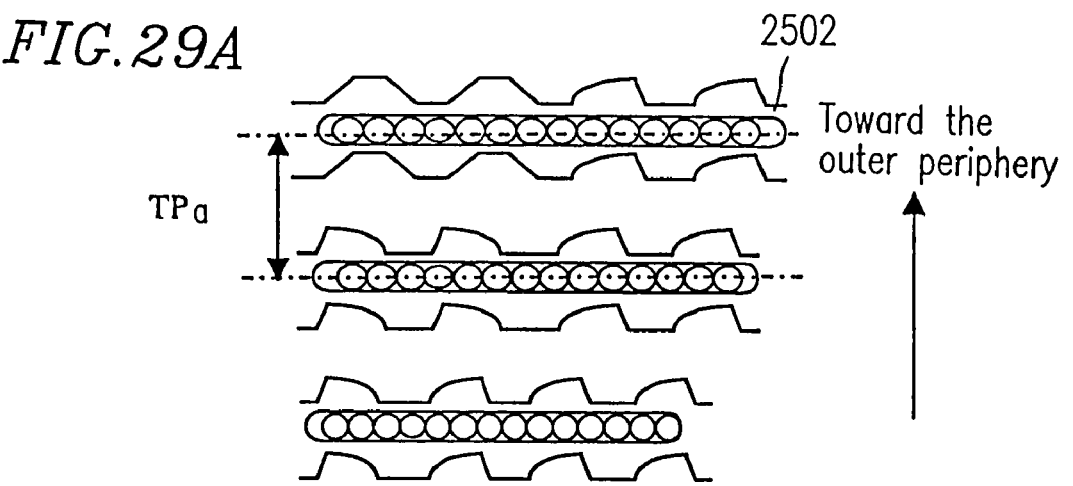
FIG. 29A shows a track groove in an optical disc medium in Example 18 according to the present invention.
Figure 29B:
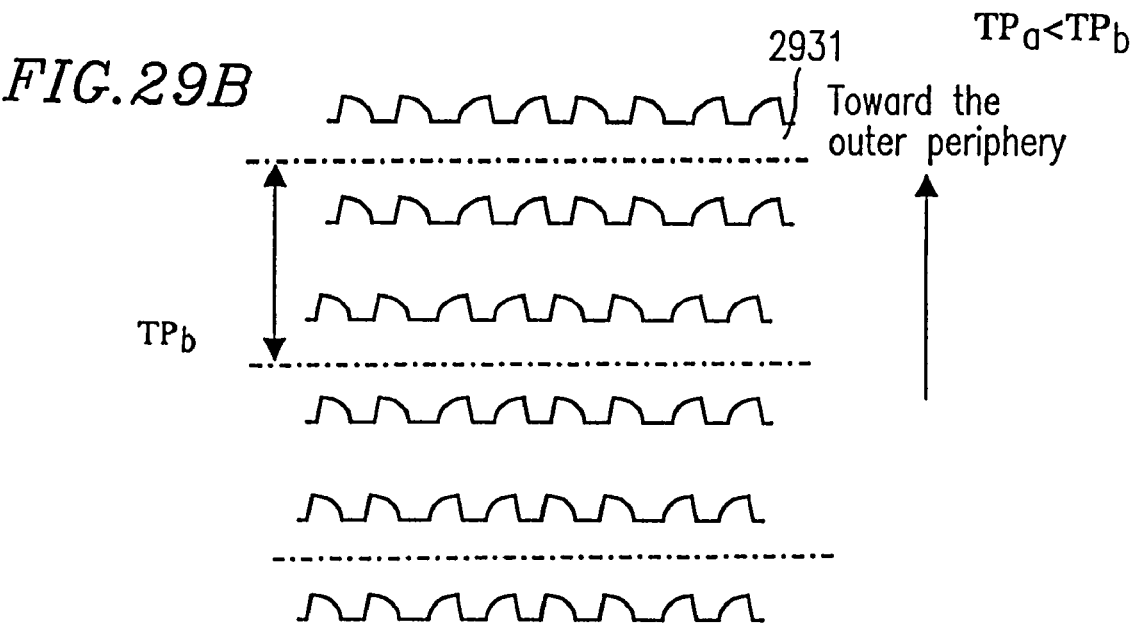
FIG. 29B shows a track groove in an optical disc medium in Example 18 according to the present invention.

FIGS. 29A and 29B show track grooves 2502 and 2931 of an optical disc medium according to Example 18 of the present invention.

The track groove 2502 shown in FIG. 29A is the same as the track groove 2502 described above with reference to FIG. 25A and is formed in the recording and reproduction area 2402 of the optical disc medium 2400 shown in FIG. 24. The track groove 2931 shown in FIG. 29B can be formed in the lead-in area 2401 and the lead-out area 2403.

The track groove 2502 shown in FIG. 29A has a track pitch (distance between two adjacent tracks) of TPa. The main information is recorded in the track groove 2502 by the groove recording system.

The track grooves shown in FIGS. 29A and 29B are different from those shown in FIGS. 25A and 25B in the track pitch. Whereas the track pitch of the track groove 2502 in the recording and reproduction area 2402 in FIG. 29A is TPa, the track pitch of the track groove 2931 in the lead-in area 2401 and the lead-out area 2403 in FIG. 29B is TPb, where TPb>TPa. When, for example, information recorded on the groove recording system optical disc medium having a track pitch TPa=0.32 µm (distance between two adjacent grooves) is reproduced using an optical spot with a wavelength of 405 nm and NA of 0.85 as optical constants, the amplitude of the tracking error signal obtained by the push-pull system is significantly small. When the track pitch is increased, the amplitude of the tracking error signal is increased accordingly. Where the wobbling amount of the wobble is constant, the wobble signal amplitude basically increases in proportion to the amplitude of the tracking error signal. Therefore, when the track pitch is increased, the wobble signal amplitude at the time of reproduction is increased.

Thus, by increasing the track pitch TPb in the lead-in area 2401 and the lead-out area 2403 as compared to the track pitch TPa in the recording and reproduction area 2402, the S/N ratio when detecting the wobbles can be enhanced.

Alternatively, when TPb<TPa, the wobbles indicating the disc management information can be efficiently recorded in the limited areas of the lead-in area 2401 and the lead-out area 2403.

In Examples 15 through 18, the frequency of the wobbles, the wobble amplitude, the phase difference of wobbles from those in an adjacent track, the track pitch and the like in the lead-in area 2401 and the lead-out area 2403 are different from those in the recording and reproduction area 2402. A plurality of these factors can be different between the lead-in and lead-out areas 2401 and 2403 and the recording and reproduction area 2402.

In the track in the disc management area of the lead-in area 2401 and the lead-out area 2403, no recording mark is formed. Thus, the S/N ratio of the reproduction signal of the disc management area can be increased, and as a result, the reading reliability of the disc management area can be enhanced.

In this example, the optical disc medium 2400 includes the lead-in area 2401 and the lead-out area 2403. The optical disc medium 2400 can include only the lead-in area 2401 or only the lead-out area 2403, in addition to the recording and reproduction area 2402.

Example 19

Figure 35:
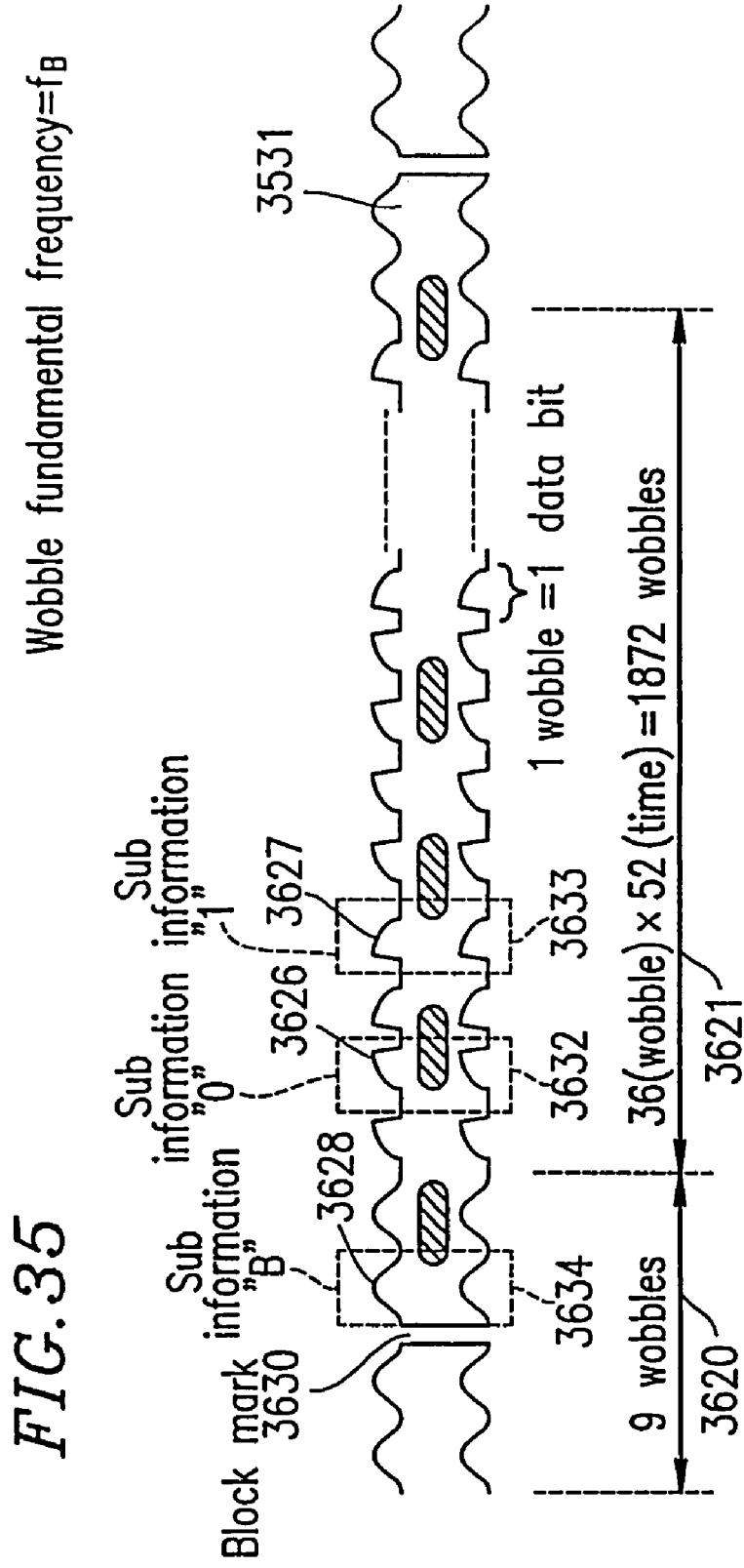
FIG. 35 shows a track groove in an optical disc medium in Example 19 according to the present invention.

FIG. 35 shows a track groove 3531 of an optical disc medium according to Example 19 of the present invention.

The track groove 3531 shown in FIG. 35 can be formed in the lead-in area 2401 and the lead-out area 2403 of the optical disc medium 2400 shown in FIG. 24.

The track groove 3531 shown in FIG. 35 is different from the track groove 3631 shown in FIG. 25B in that the track groove 3531 has a single frequency recording mark recorded in the lead-in area 2401 and the lead-out area 2403 (i.e., the track groove 3531) in a write once manner. For example, a recording mark having a recording channel bit length of 0.0771 μm is recorded by providing a signal having 8T recording marks and 8T spaces repeated in the track groove 3531 having the disc management information, in a write once manner. Thus, the information can be reproduced by a reproduction apparatus which does not allow for tracking of the push-pull system (apparatus of the DPD system tracking). The compatibility between apparatuses can be improved.

In this example, the optical disc medium 2400 includes the lead-in area 2401 and the lead-out area 2403. The optical disc medium 2400 can include only the lead-in area 2401 or only the lead-out area 2403, in addition to the recording and reproduction area 2402.

Example 20

Figure 31:
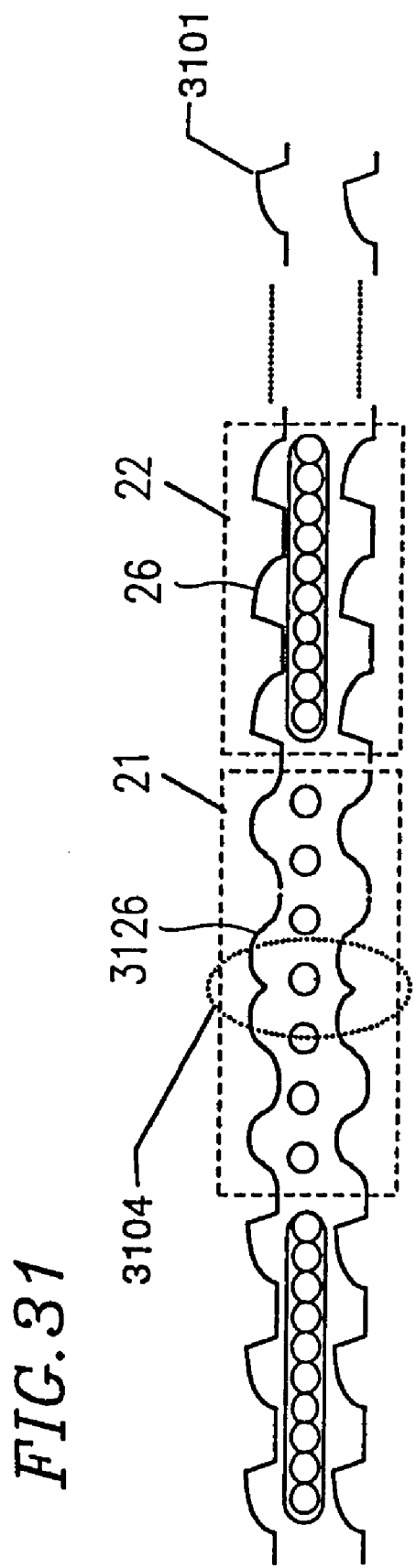
FIG. 31 shows a track groove in an optical disc medium in Example 20 according to the present invention.

FIG. 31 shows a track groove 3101 of an optical disc medium according to Example 20 of the present invention.

In Example 1, the block mark 210 is provided by cutting off the track groove 102. In this example, a block mark 3104 is formed by locally inverting the phase of wobbles 3126 in the track groove 3101. The block mark 3104 thus formed does not cut off the track groove 3101, and thus information can be recorded on the block mark 3104. As a result, overhead can be reduced.

Example 21

Figure 32:
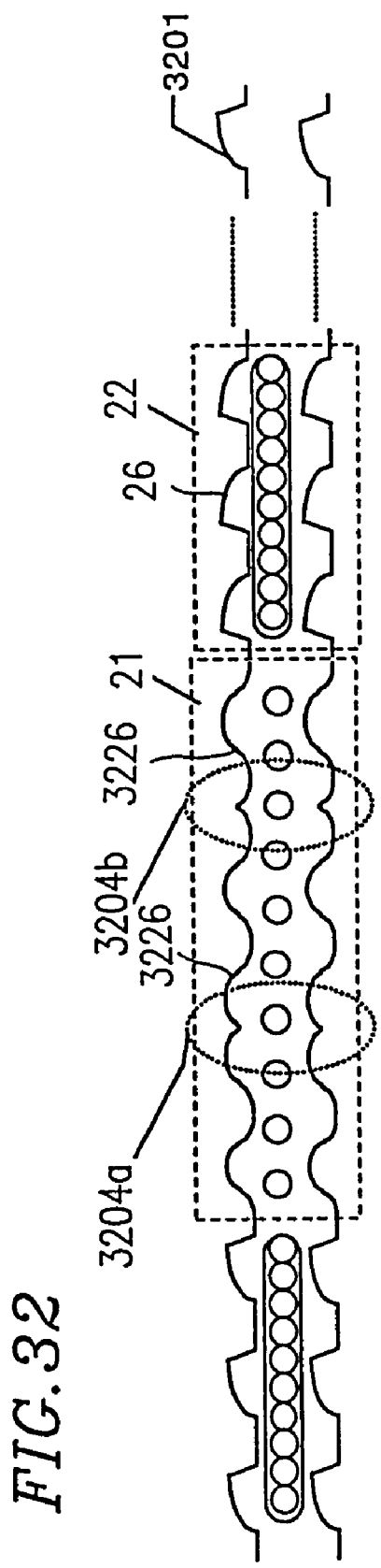
FIG. 32 shows a track groove in an optical disc medium in Example 21 according to the present invention.

FIG. 32 shows a track groove 3201 of an optical disc medium according to Example 21 of the present invention.

In Example 1, the block mark 210 is provided by cutting off the track groove 102. In this example, a plurality of block marks 3204a and 3204b are formed by locally inverting the phase of wobbles 3226 in the track groove 3201. The block marks 3204a and 3204b thus formed do not cut off the track groove 3201, and in addition, the continuity of the phases of the wobbles 3226 is kept except for the portion interposed between the block marks 3204a and 3204b. Therefore, reproduction can be performed without substantially varying the phase of the clock of the wobbles and without generating a phase difference in the PLL. Main information can be recorded on the block marks 3204a and 3204b. As a result, overhead can be reduced.

Example 22

Figure 33:
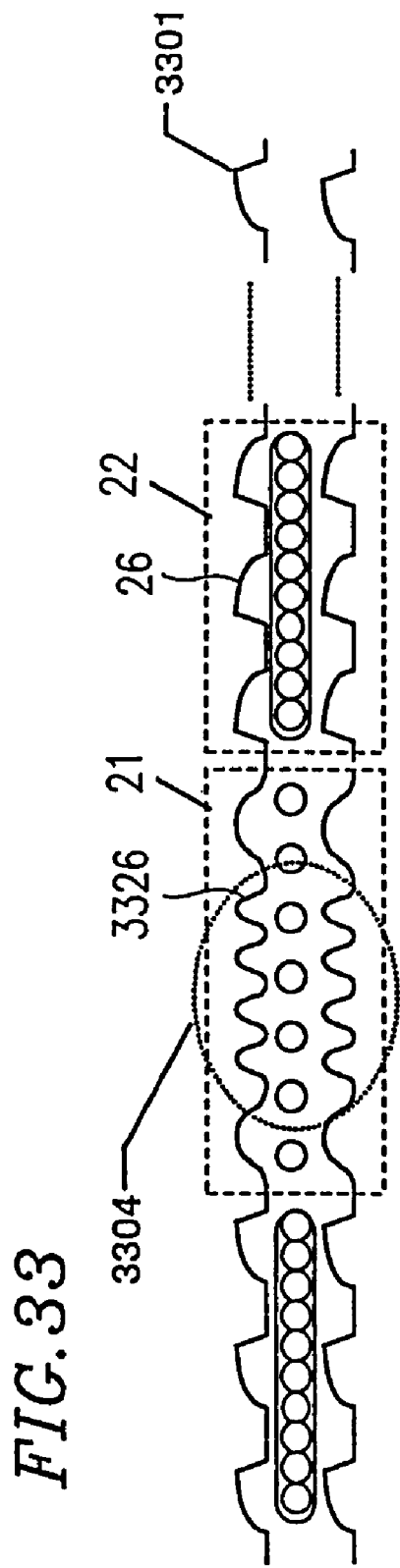
FIG. 33 shows a track groove in an optical disc medium in Example 22 according to the present invention.

FIG. 33 shows a track groove 3301 of an optical disc medium according to Example 22 of the present invention.

In Example 1, the block mark 210 is provided by cutting off the track groove 102. In this example, a block mark 3304 is formed of a wobble 3326 having a locally higher frequency than that of the wobbles 26. The block mark 3304 thus formed does not cut off the track groove 3301, and thus information can be recorded on the block mark 3304. As a result, overhead can be reduced.

In Examples 1, 4, 5, 7 through 12, 15, 16, and 19 through 22, the track groove having a block mark is disclosed. The track groove can be provided on an optical disc medium without having a block mark.

INDUSTRIAL APPLICABILITY

As described above, according to the present invention, a plurality of prescribed shapes of wobbles are formed in a track groove in which main information is recorded on a block-by-block basis. A wobble shows specific sub information described in a frame obtained by dividing the block by a prescribed number K. By forming the wobble indicating the sub information in a plurality of frames, i.e., a plurality of times, in the block, address information can be formed with no or little overhead. A single frequency wobble reproduction signal (i.e., synchronization signal) can be obtained. Thus, an optical disc medium suitable for high density recording can be provided.

Sub information as a portion of a sub information group indicates a sector number of an ID number. When the data is not continuously read, for example, after a seek operation, the sector number or ID number of the sector immediately after the seek operation can be read, instead of the block mark at the leading end of the block. Thus, the block ID can be read from an arbitrary sector. By finally determining the block ID by reading only a sector group including a plurality of sectors in the block, post-processing (data read, data recording, etc.) can be performed quickly.

The block ID is repeated a plurality of times in one block. Thus, the reading reliability of the block ID can be enhanced.

In a lead-in area and a lead-out area, the disc management information is indicated by sawtooth-shaped wobbles formed in advance. Thus, the same tracking system can be used for the entirety of the disc. The optical disc apparatus can be simplified.

The wobble frequency is made different between the lead-in and lead-out areas and a recording and reproduction area. The disc management area can be efficiently recorded in limited areas of the lead-in area in the inner portion and the lead-out area of the outer portion of the disc.

The invention claimed is:
1. An optical disc medium, comprising a recording/reproduction area and a disc management area, wherein:
the recording/reproduction area includes a first track groove;
the disc management area includes a second track groove provided in at least one of an inner area and an outer area of the optical disc medium;
the second track groove includes a plurality of prescribed shapes of wobbles indicating sub information;
management information of the optical disc medium is represented by a combination of the plurality of prescribed shapes of wobbles;
the first track groove includes a plurality of prescribed shapes of wobbles different from the plurality of prescribed shapes of wobbles of the second track groove;
address information of the recording/reproduction area is represented by a combination of the plurality of prescribed shapes of wobbles of the first track groove; and
the second track groove has a larger track pitch than that of the first track groove.

2. A method for reproducing an optical disc medium as claimed in claim 1, the method comprising:
reading the sub information indicated by the plurality of prescribed shapes of wobbles from the optical disc medium and generating a reproduction signal;
generating a TE signal from the reproduction signal; and
generating a sub information signal based on the TE signal.

3. A method for recording information on an optical disc medium as claimed in claim 1, the method comprising
reading the sub information indicated by the plurality of prescribed shapes of wobbles from the optical disc medium and generating a reproduction signal;
generating a TE signal from the reproduction signal;
generating a plurality of sub information signals based on the TE signal;
generating a management information signal indicating the management information based on at least one of the plurality of sub information signals; and
recording information on the optical disc in accordance with the management information signal.

4. A reproduction apparatus for reproducing an optical disc medium as claimed in claim 1, the reproduction apparatus comprising:
a reading section for reading information from the second track groove of the optical disc medium to generate a reproduction signal; and
a sub information signal generating section for generating a sub information signal indicating the sub information based on the reproduction signal.

5. A recording apparatus for recording information on an optical disc medium as claimed in claim 1, the recording apparatus comprising:
a reading section for reading information from the second track groove of the optical disc medium to generate a reproduction signal;
a sub information signal generating section for generating a sub information signal indicating the sub information based on the reproduction signal;
a management information signal generating section for generating a management information signal indicating the management information based on at least one of the plurality of sub information signals; and
a recording section for recording information on the optical disc medium in accordance with the management information signal.

* * * * *